United States Patent
Milman

(10) Patent No.: US 9,477,488 B2
(45) Date of Patent: Oct. 25, 2016

(54) SYSTEMS AND METHODS FOR MANAGING DISTRIBUTED SALES, SERVICE AND REPAIR OPERATIONS

(71) Applicant: David Milman, Jamesville, NY (US)

(72) Inventor: David Milman, Jamesville, NY (US)

(*) Notice: Subject to any disclaimer, the term of this patent is extended or adjusted under 35 U.S.C. 154(b) by 189 days.

(21) Appl. No.: 14/303,573

(22) Filed: Jun. 12, 2014

(65) Prior Publication Data
US 2015/0363211 A1    Dec. 17, 2015

(51) Int. Cl.
    *G06F 9/44*      (2006.01)
    *H04L 29/06*      (2006.01)
    *G06F 21/31*      (2013.01)
    *G06Q 10/00*      (2012.01)

(52) U.S. Cl.
CPC ............ *G06F 9/4416* (2013.01); *G06F 21/31* (2013.01); *G06Q 10/00* (2013.01); *H04L 63/083* (2013.01); *H04L 63/20* (2013.01)

(58) Field of Classification Search
CPC . H04L 41/0866; H04L 63/083; G06Q 10/20; G06Q 30/016; G06F 21/31; G06F 3/04817; G06F 9/4416
USPC .......................................................... 713/2
See application file for complete search history.

(56) References Cited

U.S. PATENT DOCUMENTS

| | | | | |
|---|---|---|---|---|
| 8,225,394 B2* | 7/2012 | Gassoway | ............... | G06F 21/51 713/188 |
| 8,471,708 B1* | 6/2013 | Diorio | ................ | G06K 7/10009 340/10.2 |
| 2007/0118646 A1* | 5/2007 | Gassoway | ............... | G06F 21/57 709/225 |
| 2009/0070574 A1* | 3/2009 | Rothman | ............ | G06F 11/0748 713/2 |
| 2009/0327463 A1* | 12/2009 | Saito | ...................... | G06F 21/575 709/222 |
| 2010/0205425 A1* | 8/2010 | Takacs | .................... | G06F 21/32 713/100 |
| 2011/0125996 A1* | 5/2011 | Gattegno | .............. | G06F 9/4401 713/2 |
| 2011/0154458 A1* | 6/2011 | Broyles | ................... | G06F 21/31 726/6 |
| 2012/0084560 A1* | 4/2012 | Jayaraman | ............ | G06F 9/4401 713/164 |
| 2013/0007224 A1* | 1/2013 | Yang | ....................... | H04L 67/08 709/219 |
| 2014/0289866 A1* | 9/2014 | Beck | ........................ | G06F 21/62 726/28 |
| 2015/0074796 A1* | 3/2015 | Meir | ........................ | G06F 21/32 726/19 |
| 2015/0101007 A1* | 4/2015 | Fujioka | ............... | G06F 21/6245 726/1 |

OTHER PUBLICATIONS

Safe Mode—Add to Desktop Context Menu in Windows.
ScreenConnect—Features and Functionality Reboot the Machine to Normal or Safe Mode.

* cited by examiner

*Primary Examiner* — Thomas Lee
*Assistant Examiner* — Santosh R Poudel
(74) *Attorney, Agent, or Firm* — James E. Schultz, Jr.

(57) ABSTRACT

The systems and methods of the present disclosure are generally related to managing distributed sales, service and repair operations. In particular, the systems and methods of the present disclosure relate to managing a distributed network of sales, service and/or repair operations that include automated features.

20 Claims, 38 Drawing Sheets

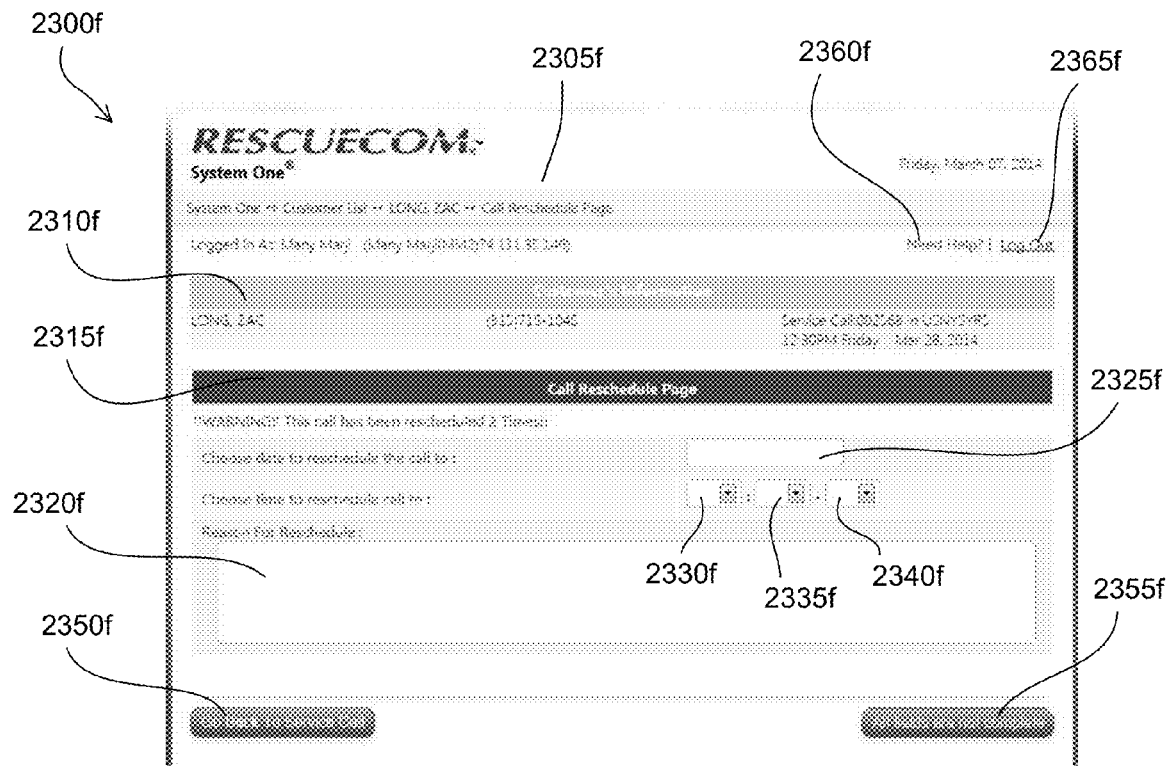
Fif. 23F
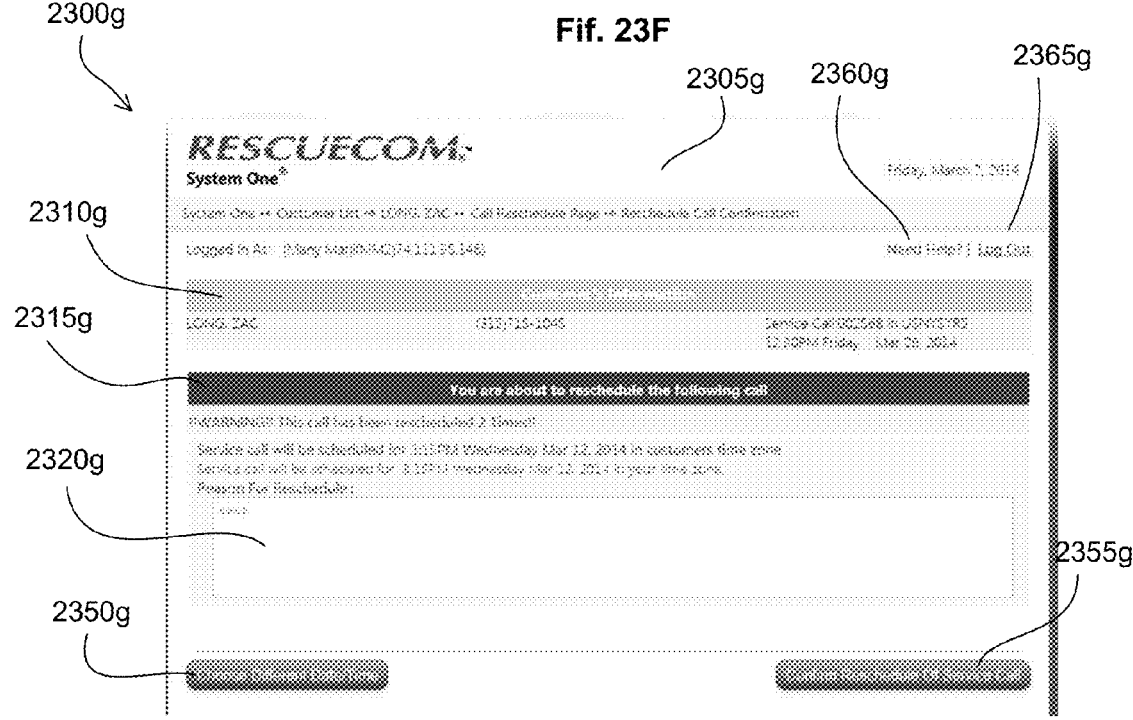
Fif. 23G

SYSTEMS AND METHODS FOR MANAGING DISTRIBUTED SALES, SERVICE AND REPAIR OPERATIONS

RELATED DISCLOSURES

The present disclosure is related to commonly owned U.S. Pat. No. 6,898,435, U.S. Patent Application Publication No. 20070192172 and U.S. Patent Application Publication No. 20070267859, the entire disclosures of which are incorporated herein by reference.

TECHNICAL FIELD

The systems and methods of the present disclosure are generally related to managing distributed sales, service and repair operations. In particular, the systems and methods of the present disclosure relate to managing a distributed network of sales, service and/or repair operations that include automated features.

BACKGROUND

In the past, devices, such as computers, printers, mobile telephones, appliances and the like, were purchased from a "bricks and mortar" retail store. When a device is purchased from a retail store, the buyer typically relies on the retail store to provide service and/or repair for the device.

More recently, retail stores are being displaced by on-line and telephone sales of devices. As a result of on-line and telephone sales of devices, in-store service and repair is often unavailable.

Thus, systems and methods are needed for managing distributed sales, service and repair operations. Furthermore, systems and methods are needed for providing on-site sales, service and repair of devices. Moreover, systems and methods are needed for providing remote sales, service and repair of devices that are geographically distributed.

SUMMARY

A computer implement method is provided for establishing a client account with a provider. The method may include receiving, at a processor of a computer system, client personal data, wherein the client personal data is representative of client personal information. The method may further include receiving, at a processor of a computer system, client device data, wherein the client device data is representative of a unique identifier of a particular client device. The method may also include generating, using a processor of the computer system, client subscription data, wherein the client subscription data is based, at least in part, on the client device data. The method may yet further include generating, using a processor of the computer system, client account data, wherein the client account data is based, at least in part, on the client personal data and the client subscription data.

In one embodiment, a computer system for generating and storing client account data is provided. The computer system may include a client personal data receiving module, stored on a memory of a central computer system, that, when executed by a processor of the central computer system, causes the processor of the central computer system to receive client personal data, wherein the client personal data is representative of client personal information. The computer system may further include a client device data receiving module, stored on the memory of the central computer system, that, when executed by the processor of the central computer system, causes the processor of the central computer system to receive client device data, wherein the client device data is representative of a unique identifier of a particular client device. The computer system may also include a client subscription data generation module, stored on the memory of the central computer system, that, when executed by the processor of the central computer system, causes the processor of the central computer system to generate client subscription data, wherein the client subscription data is based, at least in part, on the client device data. The computer system may yet further include a client account data generation module, stored on the memory of the central computer system, that, when executed by the processor of the central computer system, causes the processor of the central computer system to generate client account data, wherein the client account data is based, at least in part, on the client personal data and the client subscription data. The computer system may also include a client account data storage module, stored on the memory of the central computer system, that, when executed by the processor of the central computer system, causes the processor of the remote computer system to store the client account data in a client database.

In another embodiment, a non-transitory computer readable-medium storing instructions is provided that, when executed by a processor, cause the processor to establish a remote service session between a remote computer system and a client computer. The non-transitory computer readable-medium may include a client personal data receiving module that, when executed by a processor of the central computer system, causes the processor of the central computer system to receive client personal data, wherein the client personal data is representative of client personal information. The non-transitory computer readable-medium may further include a client device data receiving module that, when executed by the processor of the central computer system, causes the processor of the central computer system to receive client device data, wherein the client device data is representative of a unique identifier of a particular client device. The non-transitory computer readable-medium may also include a client subscription data generation module that, when executed by the processor of the central computer system, causes the processor of the central computer system to generate client subscription data, wherein the client subscription data is based, at least in part, on the client device data. The non-transitory computer readable-medium may yet further include a client account data generation module that, when executed by the processor of the central computer system, causes the processor of the central computer system to generate client account data, wherein the client account data is based, at least in part, on the client personal data and the client subscription data. The non-transitory computer readable-medium may also include a client account data storage module that, when executed by the processor of the central computer system, causes the processor of the remote computer system to store the client account data in a client database.

In a further embodiment, a computer implement method is provided to reboot a client device in a normal operating mode when the client device is currently operating in a safe operating mode and to reboot the client device to a safe operating mode when the client device is currently operating in a normal operating mode. The method may include receiving, at a processor, client device operating mode data, wherein the client device operating mode data is indicative of a current operating mode of the client device. The method may further include determining, using a processor, whether the client device is currently operating in a safe operating mode or a normal operating mode based on the client device operating mode data. The method may also include generating, using a processor, a mode icon on a display device, wherein the mode icon indicates whether the client device is determined to be currently operating in safe operating mode or normal operating mode. The method may yet further include activating, using a user interface device, the mode icon, wherein activating the mode icon causes the client device to reboot to safe mode when the client device is determined to be currently operating in normal operating mode and wherein activating the mode icon causes the client device to reboot to normal operating mode when the client device is determined to be currently operating in safe operating mode.

In yet another embodiment, a computer system to reboot a client device in a normal operating mode when the client device is currently operating in a safe operating mode and to reboot a client device in a safe operating mode when the client device is currently operating in a normal operating mode is provided. The computer system may include a client device operating mode determination module, stored on a memory, that, when executed by a processor, causes the processor to determine, based on client device operating mode data, whether the client computer is currently operating in a safe operating mode or a normal operating mode. The computer system may further include a client device mode icon module, stored on a memory, that, when executed by a processor, causes the processor to generate, based on the operating mode data, an operating mode icon on a display device, wherein the mode icon indicates whether the client device is determined to be currently operating in safe operating mode or normal operating mode. The computer system may also include a client device mode icon activation module, stored on a memory, that, when executed by a processor, causes the processor to receive user interface data, wherein the user interface data is indicative of a user selecting the operating mode icon. The computer system may yet further include a mode reboot module, stored in a memory, that, when executed by a processor, causes the processor to, in response to receiving the user interface data, reboot the client device to the safe operating mode when the client device is determined to currently be operating in the normal operating mode or causes the processor to reboot the client device to the normal operating mode when the client device is determined to currently be operating in the safe operating mode.

In yet a further embodiment, a non-transitory computer-readable medium having instructions stored thereon is provided that, when executed by a processor, cause the processor to reboot a client device to a normal operating mode from a safe operating mode and to reboot the client device to a safe operating mode from a normal operating mode. The non-transitory computer-readable medium may include a client device operating mode determination module that, when executed by a processor, causes the processor to determine, based on client device operating mode data, whether the client computer is currently operating in a safe operating mode or a normal operating mode. The non-transitory computer-readable medium may further include a client device mode icon module that, when executed by a processor, causes the processor to generate, based on the operating mode data, an operating mode icon on a display device, wherein the mode icon indicates whether the client device is determined to be currently operating in safe operating mode or normal operating mode. The non-transitory computer-readable medium may also include a client device mode icon activation module that, when executed by a processor, causes the processor to receive user interface data, wherein the user interface data is indicative of a user selecting the operating mode icon. The non-transitory computer-readable medium may yet further include a mode reboot module that, when executed by a processor, causes the processor to, in response to receiving the user interface data, reboot the client device to the safe operating mode when the client device is determined to currently be operating in the normal operating mode or causes the processor to reboot the client device to the normal operating mode when the client device is determined to currently be operating in the safe operating mode.

In even another embodiment, a computer implement method is provided to establish a remote service session between a client device and a remote computer system. The method may include storing, in a memory of the client device, a remote service session establishment module that, when executed by a processor, causes the processor to initiate a remote service session request between the client device and the remote computer. The method may further include activating, via a user interface associated with the client device, the remote service session establishment module. The method may also include retrieving, at a processor of a computer device, a unique identification of the client device. The method may yet further include determining, using a processor of a computer device, whether the unique identification of the client device matches an entry stored in a memory. The method may even further include establishing a remote service session between the remote computer system and the client device only when the unique identification of the client device is determined to match the entry stored in the memory. The method may even yet further include determining a client account associated with the client device when a remote service session is established.

In even a further embodiment, a computer system is provided that may facilitate a remote service session between a client device and a remote computer. The computer system may include a remote service session initiation module stored on a memory of the client device that, when executed by a processor of the client device, causes the processor to initiate a remote service session request between the client device and the remote computer. The computer system may further include a client device identification module stored on a memory that, when executed by a processor, causes the processor to retrieve a unique identification of the client device when the remote service session initiation module is executed. The computer system may also include a client device verification module stored on a memory that, when executed by a processor, causes the processor to determine whether the unique identification of the client device matches an entry stored in a memory. The computer system may even further include a remote service session establishment module stored on a memory that, when executed by a processor, causes the processor to establish a remote service session between the remote computer system and the client device only when the unique identification of the client device is determined to match the entry stored in the memory.

In even yet another embodiment, a non-transitory computer-readable medium is provided having instructions stored thereon that, when executed by a processor, cause the processor to facilitate a remote service session between a client device and a remote computer. The non-transitory computer-readable medium may include a remote service session initiation module that, when executed by a processor of the client device, causes the processor to initiate a remote service session request between the client device and the remote computer. The non-transitory computer-readable medium may further include a client device identification module that, when executed by a processor, causes the processor to retrieve a unique identification of the client device when the remote service session initiation module is executed. The non-transitory computer-readable medium may also include a client device verification module that, when executed by a processor, causes the processor to determine whether the unique identification of the client device matches an entry stored in a memory. The non-transitory computer-readable medium may yet further include a remote service session establishment module that, when executed by a processor, causes the processor to establish a remote service session between the remote computer system and the client device only when the unique identification of the client device is determined to match the entry stored in the memory.

In another embodiment, a computer implement method for a technician to remotely service a client device is provided. The method may include storing, in a memory of the client device, a remote service module that, when executed by a processor of the client device, causes the processor of the client device to transmit client service request data to a remote computer device, wherein the client service request data is representative of a client request for service. The method may further include transmitting, using the processor of the client device, the client service request data, from the client device to a remote computing device, in response to a client activating a user interface connected to the client device. The method may also include receiving, at a processor of a remote computing device, the client service request data. The method may yet further include generating, user the processor of the remote computing device, a display of user interface on a display device of the remote computing device, wherein the user interface includes a customer selection feature. The method may further include receiving, at the processor of the remote computing device, client selection data, wherein the client selection data is indicative of a technician selecting the customer selection feature of the user interface. The method may also include transmitting, using the processor of the remote computing device, client selection data, from the remote computing device to the client device, wherein the client selection data is indicative of the technician selecting the customer selection feature. The method may yet further include receiving, at the processor of the remote computing device, client acknowledgment data in response to a client acknowledging that the technician has selected the customer selection feature, where in the client acknowledgment data is indicative of approval by the client to allow the technician to remotely service the client device.

In yet another embodiment, a computer system for a technician to remotely service a client device is provided. The computer system may include a remote service module, stored on a memory, that, when executed by a processor, causes the processor to communicate client service request data, wherein the client service request data is representative of a client request for service. The computer system may further include a client service request user interface generation module, stored on a memory, that, when executed by a processor, causes the processor to generate a display of user interface on a display device of the remote computing device, wherein the user interface includes a customer selection feature. The computer system may yet further include a client selection module, stored on a memory, that, when executed by a processor, causes the processor to client selection data, wherein the client selection data is indicative of a technician selecting the customer selection feature. The computer system may also include further execution of the remote service module initiates remote service of the client device by a technician.

In yet a further embodiment, a non-transitory computer-readable medium having instructions stored thereon that, when executed by a processor, cause the processor to facilitate a remote service session for a technician to remotely service a client device is provided. The non-transitory computer-readable medium may include a remote service module that, when executed by a processor, causes the processor to communicate client service request data, wherein the client service request data is representative of a client request for service. The non-transitory computer-readable medium may further include a client service request user interface generation module that, when executed by a processor, causes the processor to generate a display of user interface on a display device of the remote computing device, wherein the user interface includes a customer selection feature. The non-transitory computer-readable medium may yet further include a client selection module that, when executed by a processor, causes the processor to client selection data, wherein the client selection data is indicative of a technician selecting the customer selection feature. The non-transitory computer-readable medium may also include further execution of the remote service module initiates remote service of the client device by a technician.

In even yet another embodiment, a computer implement method to reboot a client device in a normal operating mode when the client device is currently operating in a safe operating mode and/or to reboot the client device to a safe operating mode when the client device is currently operating in a normal operating mode is provided. The method may include receiving, at a processor, client device operating mode data, wherein the client device operating mode data is indicative of a current operating mode of the client device and determining, using a processor, whether the client device is currently operating in a safe operating mode or a normal operating mode based on the client device operating mode data. The method may also include receiving, at a processor, password data, wherein the password data is representative of user information indicative of whether the user is authorized to reboot the client device in the normal operating mode when the client device is currently operating in the safe operating mode or to reboot the client device to the safe operating mode when the client device is currently operating in the normal operating mode. The method may further include causing, using a processor, the client device to reboot to safe mode when the client device is determined to be currently operating in normal operating mode or causing the client device to reboot to normal operating mode when the client device is determined to be currently operating in safe operating mode in response to receiving the password data.

In even yet another embodiment, a computer implement method to reboot a client device in a normal operating mode when the client device is currently operating in a safe operating mode and/or to reboot the client device to a safe operating mode when the client device is currently operating in a normal operating mode is provided. The method may include receiving, at a processor, client device operating mode data, wherein the client device operating mode data is indicative of a current operating mode of the client device and determining, using a processor, whether the client device is currently operating in a safe operating mode or a normal operating mode based on the client device operating mode data. The method may also include receiving, at a processor, password data, wherein the password data is representative of user information indicative of whether the user is authorized to reboot the client device in the normal operating mode when the client device is currently operating in the safe operating mode or to reboot the client device to the safe operating mode when the client device is currently operating in the normal operating mode. The method may further include causing, using a processor, the client device to reboot to safe mode when the client device is determined to be currently operating in normal operating mode or causing the client device to reboot to normal operating mode when the client device is determined to be currently operating in safe operating mode in response to receiving the password data.

In another embodiment, a non-transitory computer-readable medium having instructions stored thereon that, when executed by a processor, cause the processor to reboot a client device to a normal operating mode from a safe operating mode and to reboot the client device to a safe operating mode from a normal operating mode is provided. The non-transitory computer-readable medium may include a client device operating mode determination module that, when executed by a processor, causes the processor to determine, based on client device operating mode data, whether the client computer is currently operating in a safe operating mode or a normal operating mode. The non-transitory computer-readable medium may also include a password data receiving module that, when executed by a processor, causes the processor to receive password data, wherein the password data is representative of user information indicative of whether the user is authorized to reboot the client device in the normal operating mode when the client device is currently operating in the safe operating mode or to reboot the client device to the safe operating mode when the client device is currently operating in the normal operating mode. The non-transitory computer-readable medium may further include a mode reboot module that, when executed by a processor, causes the processor to reboot the client device to safe mode when the client device is determined to be currently operating in normal operating mode or causes the processor to reboot the client device to normal operating mode when the client device is determined to be currently operating in safe operating mode in response to receiving the password data.

In yet another embodiment, a computer implement method for automatically generating contact information for at least one potential client is provided. The method may include generating, using a processor, a user interface on a display device of a client device, wherein the user interface has at least one data entry field for receiving information entered by a potential client and generating, using a processor, potential client data in response to the potential client entering the information within the at least one data entry field. The method may also include transmitting, using a processor, the potential client data from the client device to a remote computer in response to the potential client entering the information within the at least one data entry field. The method may further include generating, using a processor, potential client contact data based on the potential client data, wherein the potential client contact data is representative of contact information for a potential client.

In yet a further embodiment, a client device for automatically obtaining contact information for at least one potential client is provided. The computer device may include a user interface generation module, stored on a memory, that, when executed by a processor, causes the processor to generate a user interface on a display device of a client device, wherein the user interface has at least one data entry field for receiving information entered by a potential client. The computer device may also include a potential client data generation module, stored on a memory, that, when executed by a processor, causes the processor to generate potential client data in response to the potential client entering the information within the at least one data entry field. The computer device may further include a potential client data transmission module, stored on a memory, that, when executed by a processor, causes the processor to transmit the potential client data from the client device to a remote computer in response to the potential client entering the information within the at least one data entry field.

In even yet another embodiment, a non-transitory computer readable-medium storing instructions that, when executed by a processor, cause the processor to automatically generate contact information for at least one potential client is provided. The non-transitory computer readable-medium may include a user interface generation module that, when executed by a processor, causes the processor to generate a user interface on a display device of a client device, wherein the user interface has at least one data entry field for receiving information entered by a potential client. The non-transitory computer readable-medium may also include a potential client data generation module that, when executed by a processor, causes the processor to generate potential client data in response to the potential client entering the information within the at least one data entry field. The non-transitory computer readable-medium may further include a potential client data transmission module that, when executed by a processor, causes the processor to transmit the potential client data from the client device to a remote computer in response to the potential client entering the information within the at least one data entry field.

BRIEF DESCRIPTION OF THE DRAWINGS

The figures described below depict various aspects of the systems and methods disclosed herein. It should be understood that each figure depicts an embodiment of a particular aspect of the disclosed systems and methods, and that each of the figures is intended to accord with a possible embodiment thereof. Wherever possible, the following description refers to the reference numerals included in the following figures, in which features depicted in multiple figures are designated with consistent reference numerals.

FIGS. 23A-23G and 24-27 depict various example user interfaces related to documenting a provider dialog with a client;

DETAIL DESCRIPTION

Systems and methods are provided for managing supply, service and repair operations. For example, an individual (i.e., a client) may own a device (e.g., a computer, a printer, a mobile telephone, a television, a computer gaming device, a DVD player, a cable television device, a computer router, a computer network, a home security system, a data storage device, a stereo system, a theater system, an appliance, a piece of equipment, etc.) and may seek supplies, services and/or repairs related to the device. Generally, the systems and methods of the present disclosure may enable a client to initiate an inquiry with a provider for supplies, services and/or repair of a client device; enable the client to establish an account with the provider; facilitate automatic association of a client device, or devices, with an account; facilitate automatic authentication of a client device associated with an account; facilitate provider supply, service and/or repair of the client device; facilitate documentation of activity related to an account; and/or facilitate invoicing for supplies, services and/or repairs.

As a specific example of an implementation of the systems and methods of the present disclosure, an individual (i.e., client) may own a computer that is not operating properly. The client may connect to the internet and navigate to a provider site. The client may initiate a request for assistance by simply clicking on an icon displayed within a user interface (i.e., webpage) associated with the provider site. In response to the client clicking on the icon, a provider computer may automatically establish a remote connection with the client computer. Alternatively, a provider computer may automatically generate a display on a display device of the client computer asking whether the client wishes to establish a connection with a provider computer. In any event, the provider computer may automatically generate a display of a user interface on the display device of the client computer that allows the client to establish an account (e.g., a credit card transaction) with the provider. In response to the client establishing an account, the provider computer may automatically uniquely identify the client computer and associate the unique client computer with the account. In response to uniquely identifying the client computer, the provider computer may automatically correct operation of the client computer.

Alternatively, the provider computer may automatically invoke a technician to correct operation of the client computer. The technician may either remotely correct operation of the client computer or may correct operation of the client computer at the client site.

Figure 1:
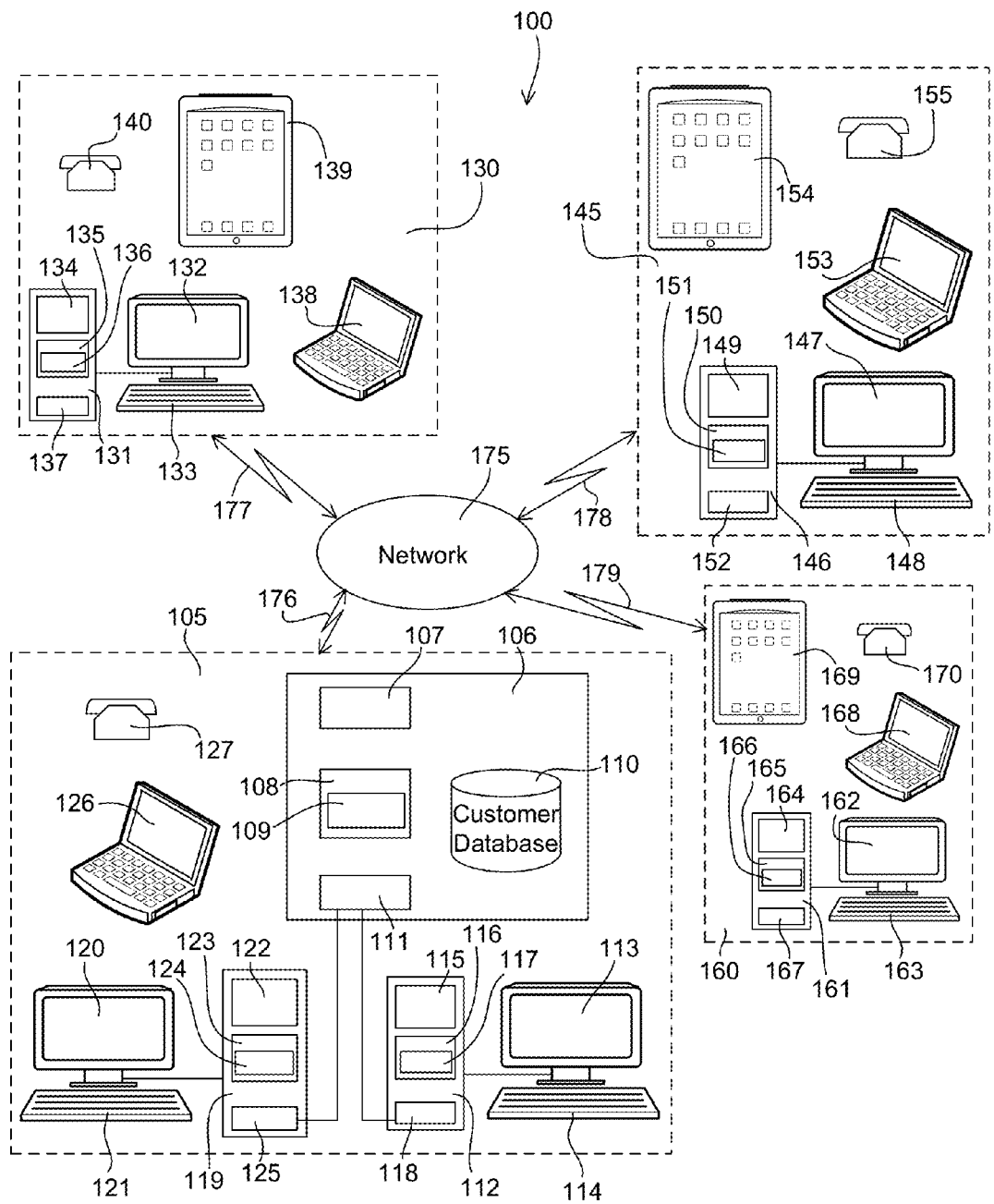
FIG. 1 depicts a high-level block diagram of an example computer system for managing distributed sales, service and repair operations.

Turning to FIG. 1, a high-level block diagram of an example computer system 100 for managing distributed sales, service and repair operations is depicted. The computer system 100 may include a central operations center 105 and a client site 130 communicatively couple via a communications network 175. The computer system 100 may also include a technician site 145 and a supplier site 160. While, for convenience of illustration, only a single central operations center 105 is depicted within the computer system 100 of FIG. 1, any number of central operations centers 105 may be included within the computer system 100. While, for convenience of illustration, only a single customer site 130 is depicted within the computer system 100 of FIG. 1, any number of customer sites 130 may be included may be included within the computer system 100. Indeed, the computer system 100 may accommodate thousands of customer sites 130. While, for convenience of illustration, only a single technician site 145 is depicted within the computer system 100 of FIG. 1, any number of technician sites 145 may be included within the computer system 100. Any given technician site 145 may be a mobile site. While, for convenience of illustration, only a single supplier site 160 is depicted within the computer system 100 of FIG. 1, any number of supplier sites 160 may be included within the computer system 100.

The communications network 175, any one of the network adapters 111, 118, 125, 137, 152, 167 and any one of the network connections 176, 177, 178, 179 may include a hardwired section, a fiber-optic section, a coaxial section, a wireless section, any sub-combination thereof or any combination thereof, including for example a wireless LAN, MAN or WAN, WiFi, WiMax, the Internet, a Bluetooth connection, or any combination thereof. Moreover, a central operations center 105, a client site 130, a technician site 145 and/or a supplier site may be communicatively connected via any suitable communication system, such as via any publicly available or privately owned communication network, including those that use wireless communication structures, such as wireless communication networks, including for example, wireless LANs and WANs, satellite and cellular telephone communication systems, etc.

Any given central operations center 105 may include a mainframe, or central server, system 106, a server terminal 112, a desktop computer 119, a laptop computer 126 and a telephone 127. While the central operations center 105 of FIG. 1 is shown to include only one mainframe, or central server, system 106, only one server terminal 112, only one desktop computer 119, only one laptop computer 126 and only one telephone 127, any given central operations center 105 may include any number of mainframe, or central server, systems 106, server terminals 112, desktop terminals 119, laptop computers 126 and telephones 127. Any given telephone 127 may be, for example, a land-line connected telephone, a computer configured with voice over internet protocol (VOIP), or a mobile telephone (e.g., a smartphone). Any given server terminal 112 may include a processor 115, a memory 116 having at least on set of computer-readable instructions stored thereon and associated with managing distributed sales, service and repair operations 117, a network adapter 118 a display 113 and a keyboard 114. Any given desktop computer 119 may include a processor 122, a memory 123 having at least on set of computer-readable instructions stored thereon and associated with managing distributed sales, service and repair operations 124, a network adapter 125 a display 120 and a keyboard 121. Any given mainframe, or central server, system 106 may include a processor 107, a memory 1108 having at least on set of computer-readable instructions stored thereon and associated with managing distributed sales, service and repair operations 109, a network adapter 111 and a customer (or client) database 110. Any given lap top computer 126 may include a processor, a memory having at least on set of computer-readable instructions stored thereon and associated with managing distributed sales, service and repair operations, a network adapter, a display and a keyboard. Any given telephone 127 may include a processor, a memory having at least on set of computer-readable instructions stored thereon and associated with managing distributed sales, service and repair operations, a network adapter, a display and a keyboard.

Any given client site 130 may include a desktop computer 131, a lap top computer 138, a tablet computer 139 and a telephone 140. While only one desktop computer 131, only one lap top computer 138, only one tablet computer 139 and only one telephone 140 is depicted in FIG. 1, any number of desktop computers 131, lap top computers 138, tablet computers 139 and/or telephones 140 may be included at any given customer site 130. Any given telephone 140 may be a land-line connected telephone or a mobile telephone (e.g., smartphone). Any given desktop computer 131 may include a processor 134, a memory 135 having at least on set of computer-readable instructions stored thereon and associated with managing distributed sales, service and repair operations 136, a network adapter 137 a display 132 and a keyboard 133. Any given lap top computer 138 may include a processor, a memory having at least on set of computer-readable instructions stored thereon and associated with managing distributed sales, service and repair operations, a network adapter, a display and a keyboard. Any given tablet computer 139 may include a processor, a memory having at least on set of computer-readable instructions stored thereon and associated with managing distributed sales, service and repair operations, a network adapter, a display and a keyboard. Any given telephone 140 may include a processor, a memory having at least on set of computer-readable instructions stored thereon and associated with managing distributed sales, service and repair operations, a network adapter, a display and a keyboard.

Any given technician site 145 may include a desktop computer 146, a lap top computer 153, a tablet computer 154 and a telephone 155. While only one desktop computer 146, only one lap top computer 153, only one tablet computer 154 and only one telephone 155 is depicted in FIG. 1, any number of desktop computers 146, lap top computers 153, tablet computers 154 and/or telephones 155 may be included at any given technician site 145. Any given telephone 155 may be a land-line connected telephone or a mobile telephone (e.g., smartphone). Any given desktop computer 146 may include a processor 149, a memory 150 having at least on set of computer-readable instructions stored thereon and associated with managing distributed sales, service and repair operations 151, a network adapter 152 a display 147 and a keyboard 148. Any given lap top computer 153 may include a processor, a memory having at least on set of computer-readable instructions stored thereon and associated with managing distributed sales, service and repair operations, a network adapter, a display and a keyboard. Any given tablet computer 154 may include a processor, a memory having at least on set of computer-readable instructions stored thereon and associated with managing distributed sales, service and repair operations, a network adapter, a display and a keyboard. Any given telephone 155 may include a processor, a memory having at least on set of computer-readable instructions stored thereon and associated with managing distributed sales, service and repair operations, a network adapter, a display and a keyboard.

Any given supplier site 160 may include a desktop computer 161, a lap top computer 168, a tablet computer 169 and a telephone 170. While only one desktop computer 161, only one lap top computer 168, only one tablet computer 169 and only one telephone 170 is depicted in FIG. 1, any number of desktop computers 161, lap top computers 168, tablet computers 169 and/or telephones 170 may be included at any given supplier site 160. Any given telephone 170 may be a land-line connected telephone or a mobile telephone (e.g., smartphone). Any given desktop computer 161 may include a processor 164, a memory 165 having at least on set of computer-readable instructions stored thereon and associated with managing distributed sales, service and repair operations 166, a network adapter 1167 a display 162 and a keyboard 163. Any given lap top computer 168 may include a processor, a memory having at least on set of computer-readable instructions stored thereon and associated with managing distributed sales, service and repair operations, a network adapter, a display and a keyboard. Any given tablet computer 169 may include a processor, a memory having at least on set of computer-readable instructions stored thereon and associated with managing distributed sales, service and repair operations, a network adapter, a display and a keyboard. Any given telephone 170 may include a processor, a memory having at least on set of computer-readable instructions stored thereon and associated with managing distributed sales, service and repair operations, a network adapter, a display and a keyboard.

Figure 2:
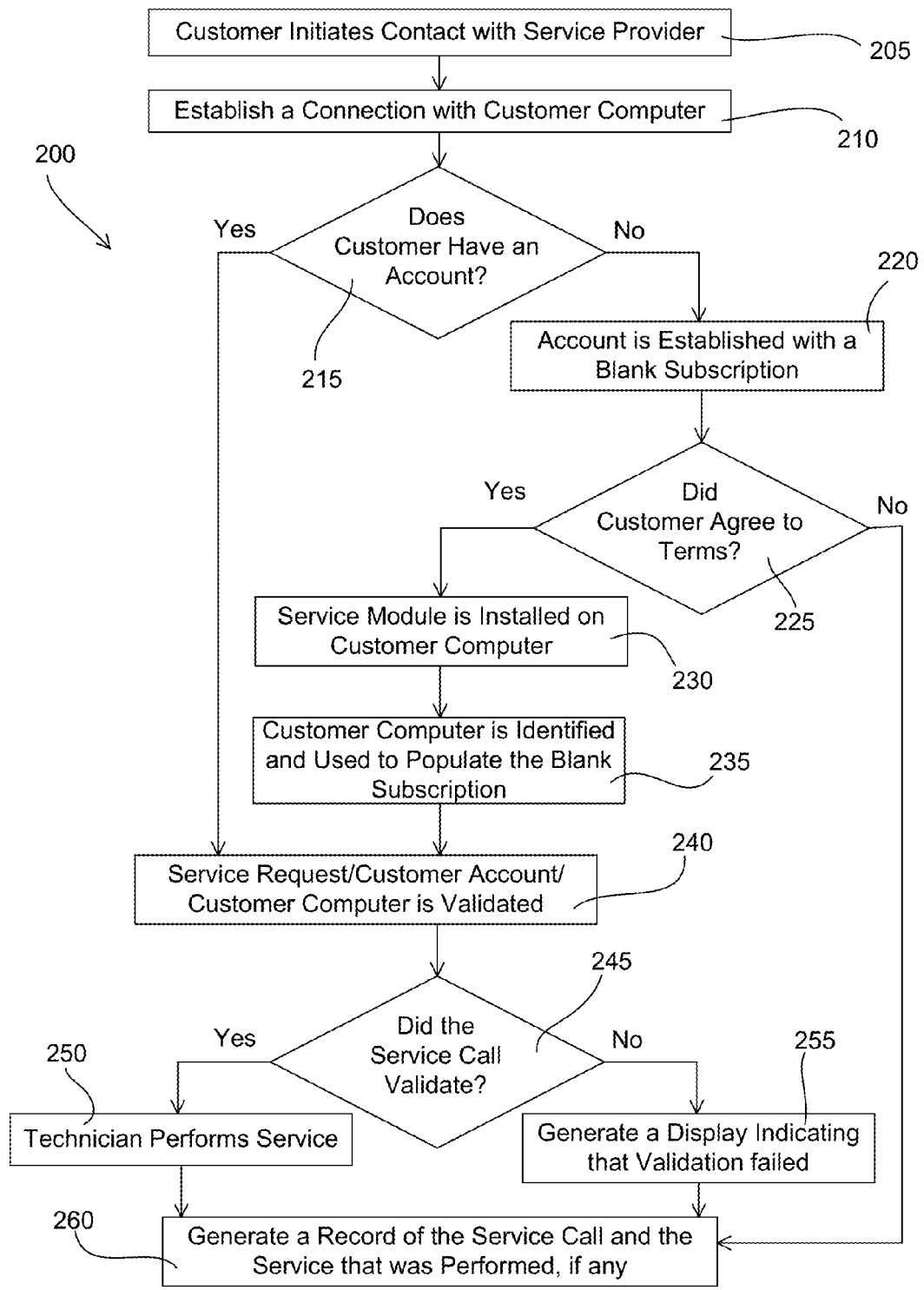
FIG. 2 depicts a flow diagram of an example method for remotely establishing a dialog between a provider and a client.

With reference to FIG. 2, a flow diagram of an example method for remotely establishing a dialog between a provider and a client 200 is depicted. While the method 200 may be implemented, at least in part, by any one of the processors 107, 115, 122, 134, 149, executing a respective set of computer-readable instructions stored thereon and associated with managing distributed sales, service and repair operations 109, 117, 124, 136, 151, the method 200 will be described as being implemented by processors 107, 134, executing the respective set of computer-readable instructions stored thereon and associated with managing distributed sales, service and repair operations 109, 136. The processor 134, executing the module 136, may initiate contact between a customer (e.g., a client site 130) and a service provider (e.g., a central operations center 105, a technician site 145 and/or a supplier site 160) in response to a client initiating contact (block 205). Alternatively, a client may initiate contact with a technician, for example, by using telephone 140 to call either telephone 127 or 155 (block 205). The processor 134, executing the module 136, may establish a connection with the processor 107, executing the module 109 (block 210).

The processor 107, executing the module 109, may determine whether the customer (or client) has an account (block 215). If the processor 107 determines that the client has an account (block 215), the processor 107, further executing the module 109, may attempt to validate the service request/customer (or client) account/customer (or client) computer in response to a technician, for example, initiating validation (block 240).

If the processor 107 determines that the client does not have an account (block 215), the processor 107, further executing the module 109, may establish an account with a blank subscription in response to the processor 134, executing the module 136, sending data representative of information entered by a customer (or client) (e.g., personal information, credit card information, etc.) (block 220). The processor 107, further executing the module 109, may determine whether the customer (or client) agreed to related terms (block 225). If the processor 107 determines that the customer (or client) agreed to related terms (block 225), the processor 107, further executing the module 109, may install a service module on the customer (or client) computer (block 230). The processor 107, further executing the module 109, may identify the customer computer and use the identification of the customer computer to populate the blank subscription (block 235). The processor 107 may identify the customer computer based on, for example, a customer computer (or device) mother board model number, a customer computer (or device) processor ID, a customer computer (or device) media access code (MAC) address, a customer computer (or device) hard-drive serial number, a customer computer (or device) mother-board serial number, any sub-combination thereof or a combination thereof (block 235).

The processor 107, further executing the module 109, may determine whether the service request/customer (or client) account/customer (or client) computer was validated (block 245). If the processor 107 determines that the service request/customer (or client) account/customer (or client) computer was validated (block 245), a technician, for example, may perform service on the client computer (block 250). If the processor 107 determines that the service request/customer (or client) account/customer (or client) computer was not validated (block 245), the processor 107 may generate a display indicating that validation failed (block 255).

If the processor 107 determines that the customer (or client) did not agree to the related terms (block 225), or in any event, the processor 107, further executing the module 109, may generate a record of the service call and the service that was performed, if any (block 260).

Figure 3:
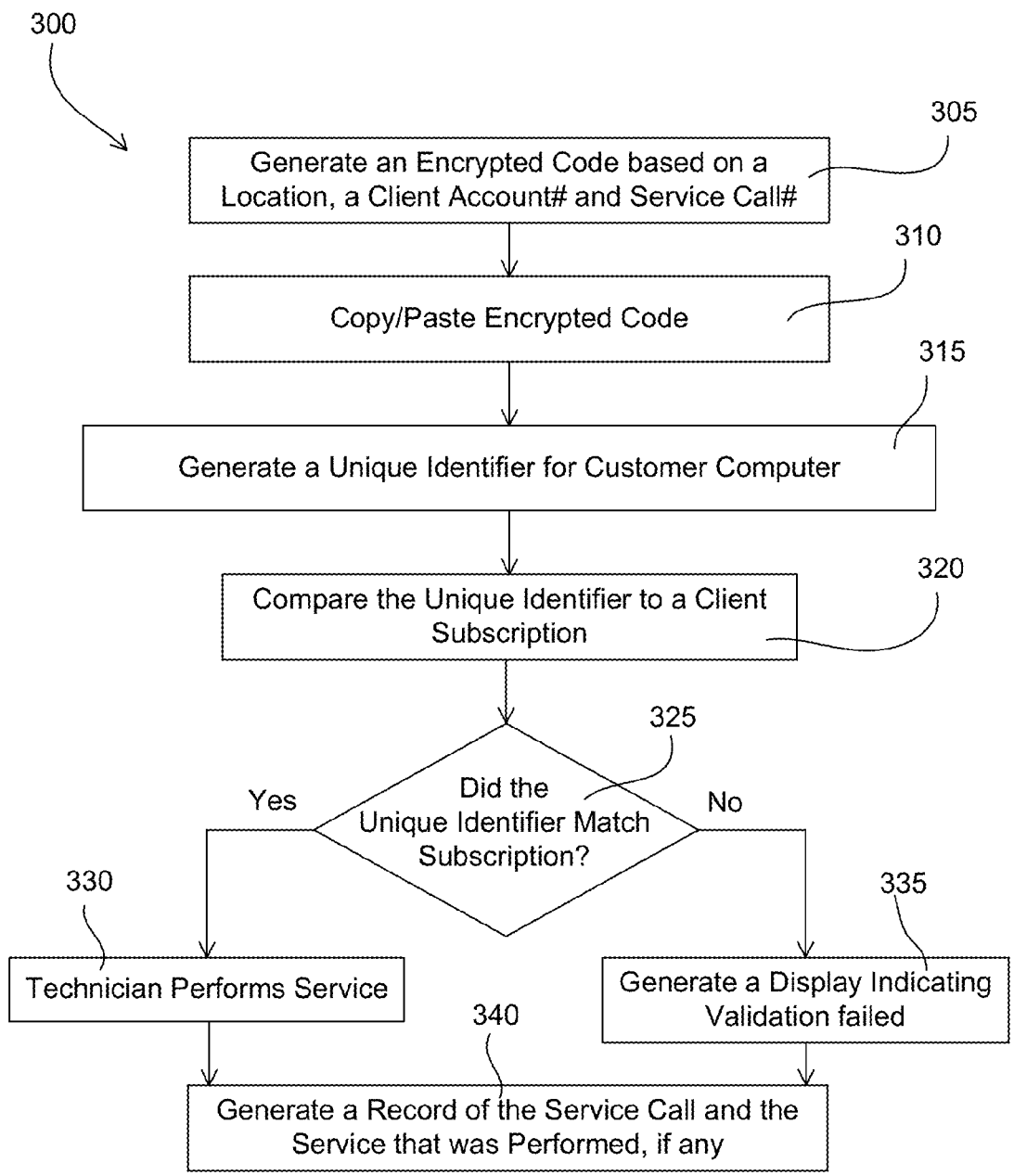
FIG. 3 depicts a flow diagram of an example method for remotely authenticating an identity of a client device.

Turning to FIG. 3, a flow diagram of an example method for remotely authenticating an identity of a client device 300 is depicted. While the method 300 may be implemented, at least in part, by any one of the processors 107, 115, 122, 134, 149, executing a respective set of computer-readable instructions stored thereon and associated with managing distributed sales, service and repair operations 109, 117, 124, 136, 151, the method 300 will be described as being implemented by processors 107, 134, executing the respective set of computer-readable instructions stored thereon and associated with managing distributed sales, service and repair operations 109, 136. The processor 107, executing the module 109, may generate an encrypted code based, for example, on a location (e.g., a geographic location or client location), a client account number, a service call number, a sub-combination thereof or a combination thereof (block 305). The processor 107, further executing the module 109, may copy and paste the encrypted code into a data entry area in response to a technician, for example, initiating the copy/paste procedure (block 310). Alternatively, the processor 107 may automatically copy/paste the encrypted code (block 310). The processor 107, further executing the module 109, may generate a unique client computer (or device) identification based on, for example, a customer computer (or device) mother board model number, a customer computer (or device) processor ID, a customer computer (or device) media access code (MAC) address, a customer computer (or device) hard-drive serial number, a customer computer (or device) mother-board serial number, any sub-combination thereof or a combination thereof (block 315). The processor 107, further executing the module 109, may compare the unique client computer (or device) identification to a client subscription (e.g., client subscription generated in block 235 of FIG. 2) (block 320). The processor 107, further executing the module 109, may determine whether the unique client computer (or device) identification matches a client subscription (block 325). If the processor 107 determines that the unique client computer (or device) identification matches a client subscription (block 325), a technician, for example, may perform service and/or repair on the client computer (or device) (block 330). Alternatively, or additionally, the processor 107, further executing the module 109, may automatically perform service and/or repair on the client computer (or device) (block 330). If the processor 107 determines that the unique client computer (or device) identification does not match a client subscription (block 325), the processor 107, further executing the module 109, may generate a display indicating that validation failed (block 335). In any event, the processor 107, further executing the module 109, may generate a record of the service call and the service and/or repair that was performed, if any (block 340).

Figure 4:
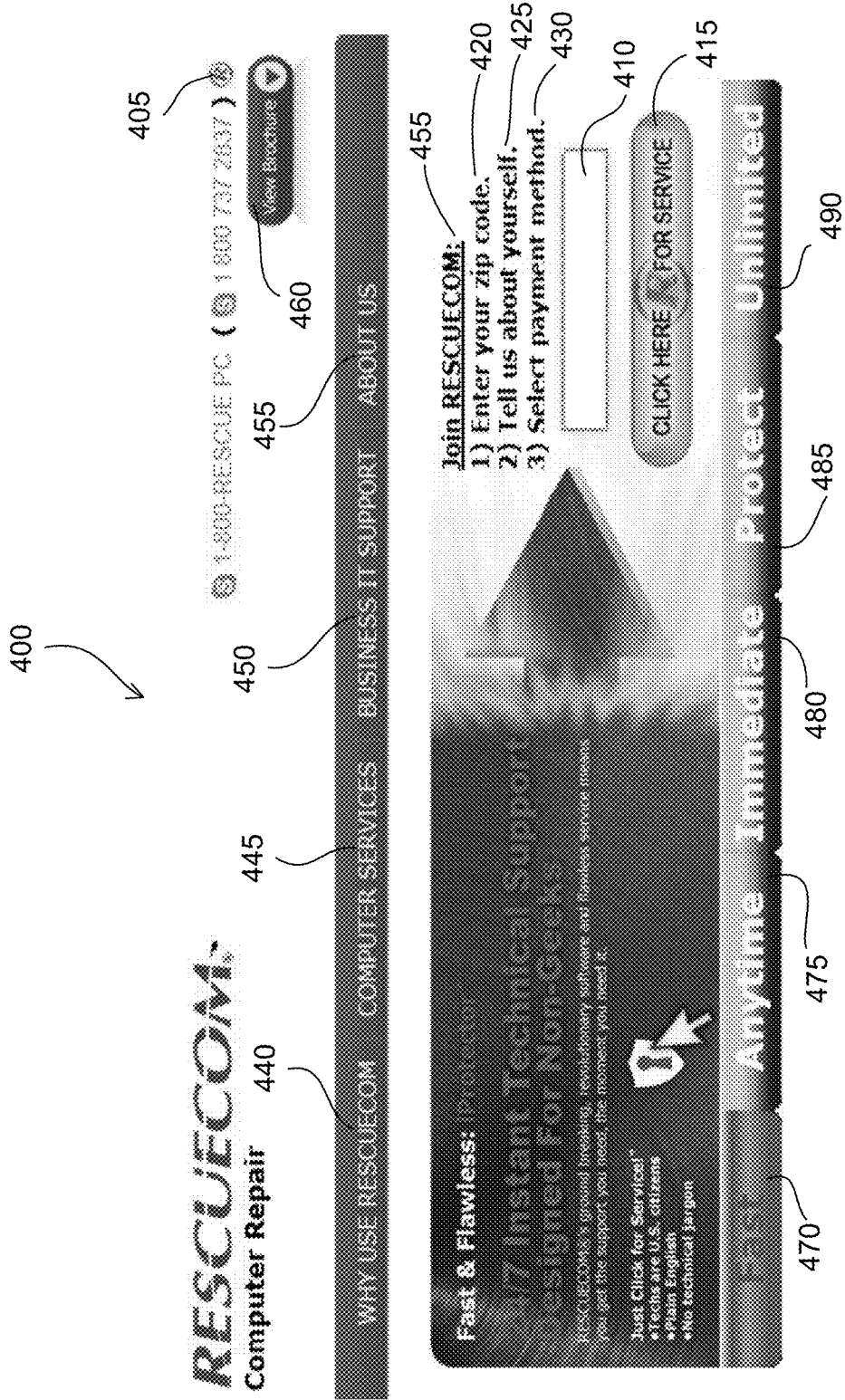
FIG. 4 depicts an example user interface for initiating a dialog between a provider and a client.

With reference now to FIG. 4, an example user interface for initiating a dialog between a provider and a client 400 is depicted. The user interface 400 may, for example, be used in conjunction with block 205 of FIG. 2. The user interface 400 may be, for example, associated with a provider website. The processor 134, executing module 136, may generate a display of user interface 400 on a display (e.g., display 132 of FIG. 1) of a client device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.). In any event, the user interface 400 may include an icon 405. When a user selects the icon 405 by, for example, using a button on a mouse or touching a touch-screen display, a second user interface (e.g., user interface 600a of FIG. 6A) may be displayed on the client device. Alternatively, a processor (e.g., processor 107 of FIG. 1), executing a module (e.g., module 109 of FIG. 1) may automatically establish a remote connection with a client device in response to a client selecting the icon 405. The user interface 400 may also include a zip-code entry area 410 and a "click here for service" icon 415 that may allow a client to initiate service and/or repair. The processor 107 may generate another user interface (e.g., user interface 500 of FIG. 5) in response to the client selecting the icon 415. The client may be prompted to join a provider network (e.g., Rescuecom) 455, enter a zip-code 420, enter personal information 425 and select a payment method 430. The user interface 400 may further include information access icons, such as view a brochure icon 460, a why use provider (e.g., Rescuecom) icon 440, a customer service icon 445, a business IT support icon 450, an about us icon 455, a fast icon 470, an anytime 475 icon, an immediate icon 480, a protect icon 485 and/or an unlimited icon 490. The processor 107 may generate a different user interface display on a client device display in response to a client selecting any one of the information icons 445-490.

Figure 5A:
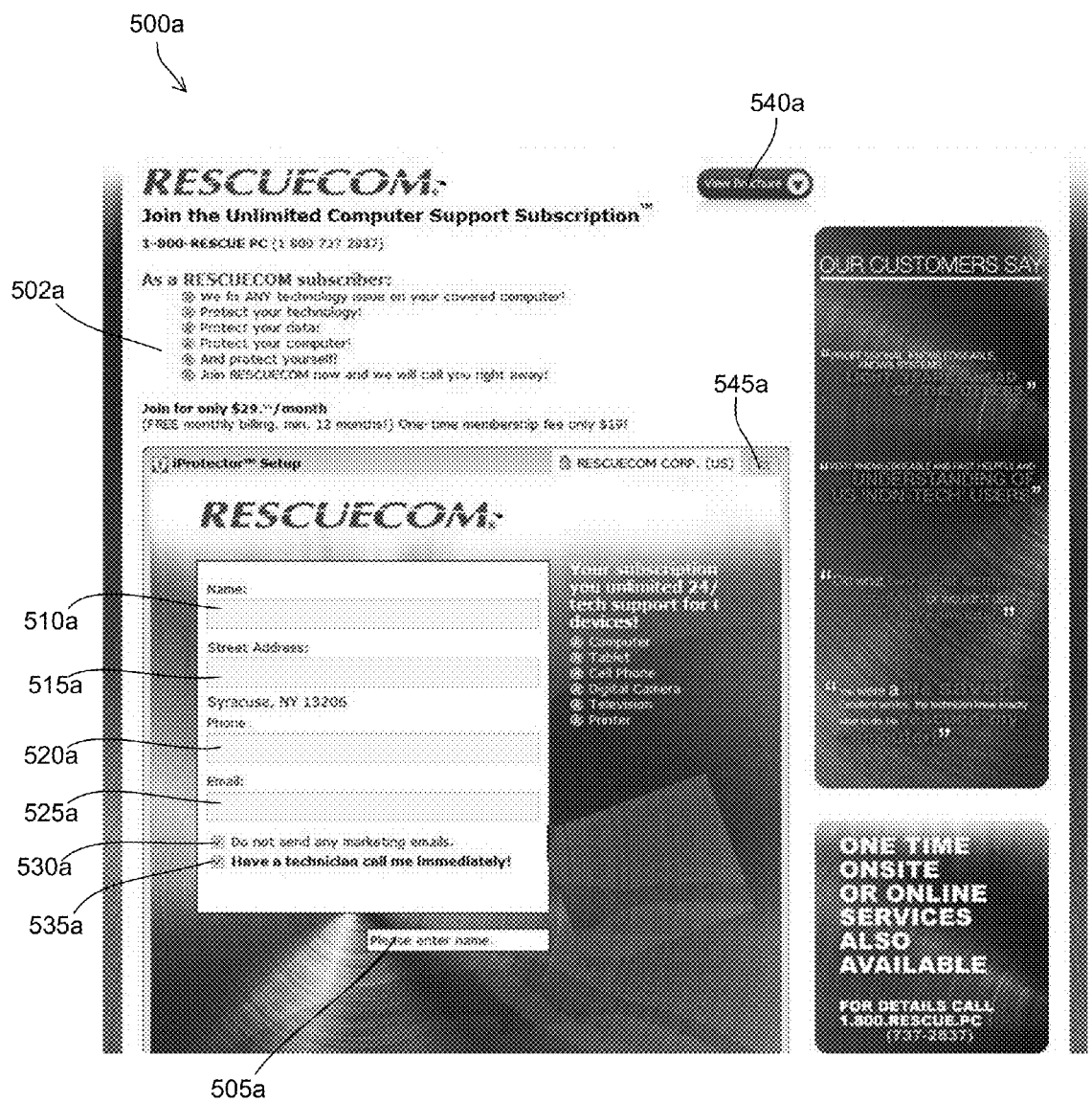
FIGS. 5A and 5B depict example user interfaces for establishing a client account with a provider.
Figure 5B:
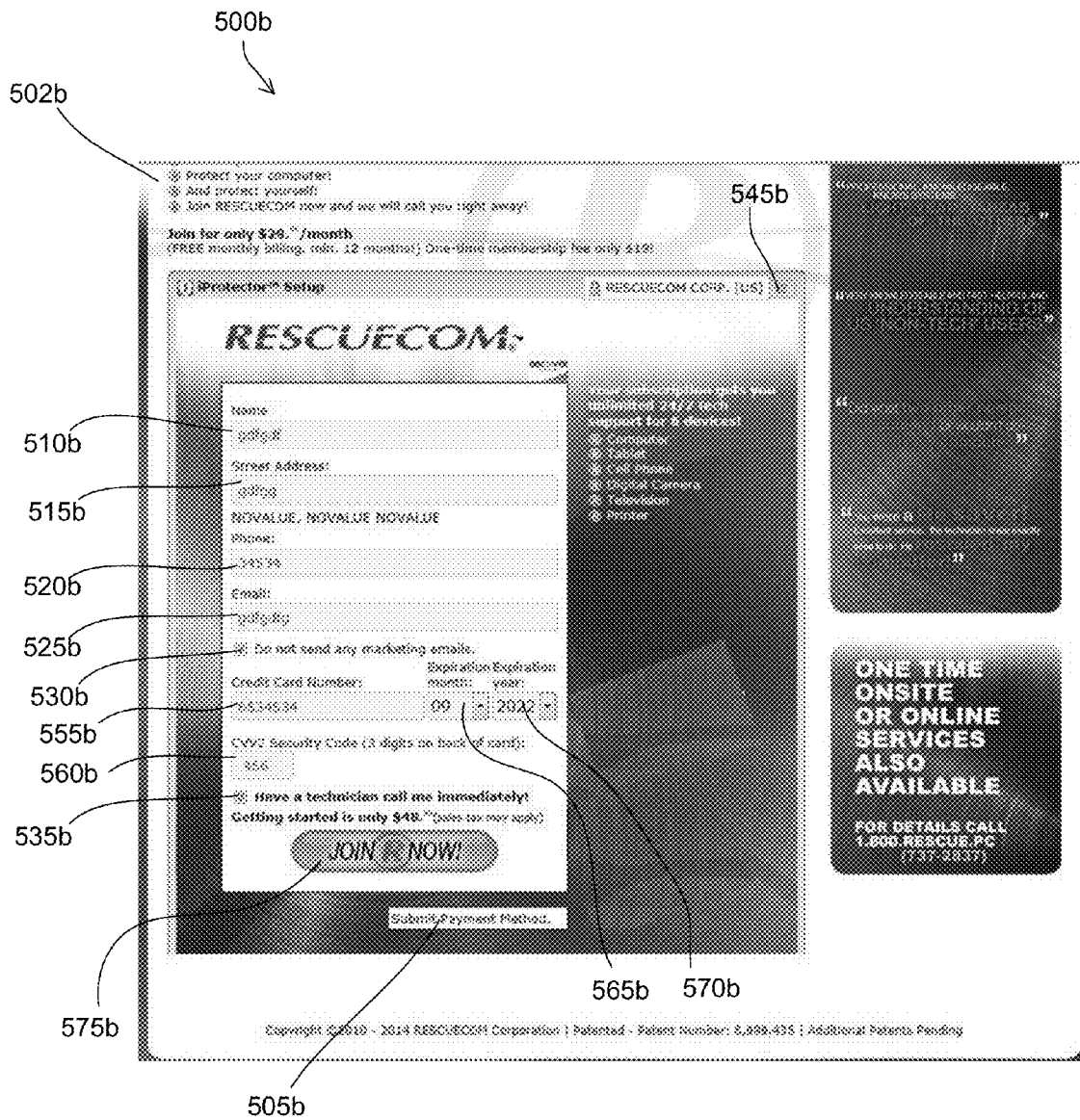

Turning to FIGS. 5A and 5B, example user interfaces for establishing a client account with a provider 500a, 500b are depicted. The processor 134, executing the module 136, may generate a display of user interface 500a on a client device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.) display (e.g., display 132 of FIG. 1) in response to, for example, a client selecting icon 415. The user interface 500a may include an information icon 502a that allows a client to view details related to an unlimited computer (or device) support subscription. The user interface 500a may also include an instruction display area 505a, a client name entry field 510a, a client street address entry field 515a, a client telephone number entry field 520a, a client email entry field 525a, a marketing email selection check box 530a, a have a technician call me immediately check box 535a, a view brochure icon 540a and an exit icon 545a.

The processor 134, further executing the module 136, may generate a display of user interface 500b on a client device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.) display (e.g., display 132 of FIG. 1) in response to, for example, a client entering her personal information within user interface 500a. The user interface 500b may include an information icon 502a that allows a client to view details related to an unlimited computer (or device) support subscription. The user interface 500b may also include an instruction display area 505b, a client name entry field 510b, a client street address entry field 515b, a client telephone number entry field 520b, a client email entry field 525b, a marketing email selection check box 530b, a have a technician call me immediately check box 535b, an exit icon 545b, a credit card number entry field 555b, a credit card security code entry field 560b, a credit card expiration month selection menu 565b and a credit card expiration year selection menu 570b. The user interface 500b may include a join now icon 575b that, when selected by a client, causes the processor 107, executing the module 109, to establish a client account (e.g., block 220 of FIG. 2). The processor 107, executing the module 109, may automatically transmit any/all information, that is entered by a user, to a remote server (e.g., remote server 106 of FIG. 1) while a user enters the information in response to the user merely entering the information within any one of the data entry fields. Alternatively, the processor 107, executing the module 109, may automatically transmit any/all information, that is entered by a user, to a remote server (e.g., remote server 106 of FIG. 1) in response to the user entering the information and exits the field by, for example, clicking on a different field, hitting a tab key, hitting an enter key or touching a touch screen outside the field.

Figure 6A:
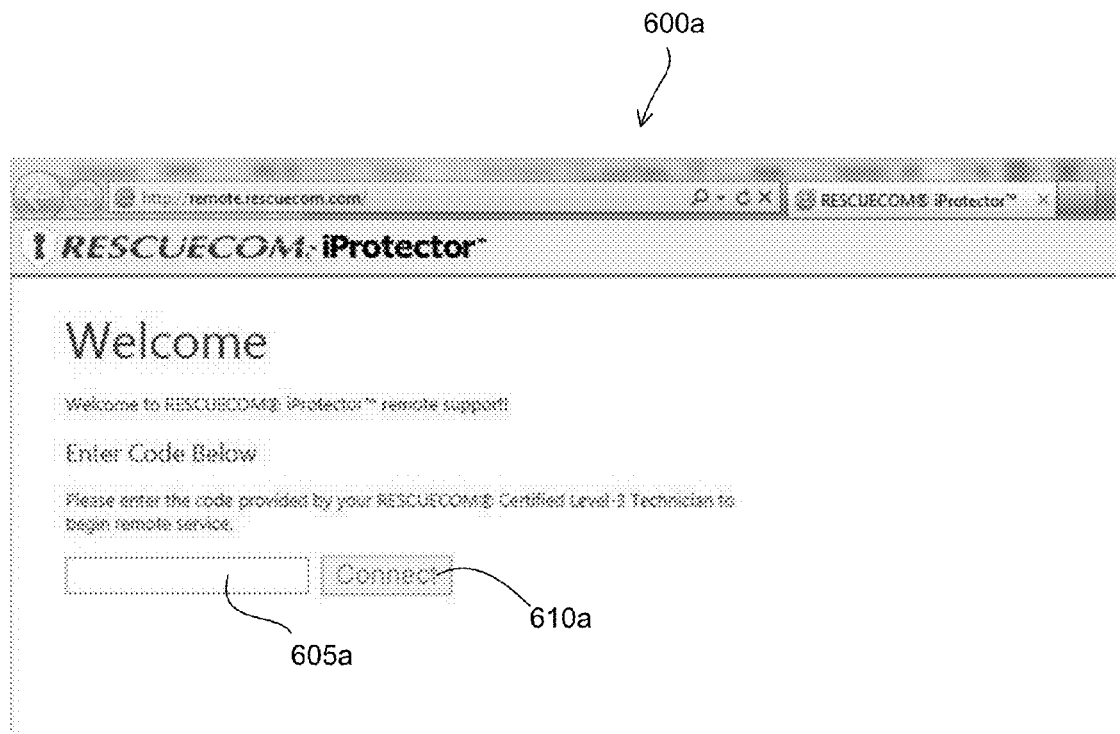
FIGS. 6A and 6B depict example user interfaces associated with establishing a remote communication connection between a provider and a client.
Figure 6B:
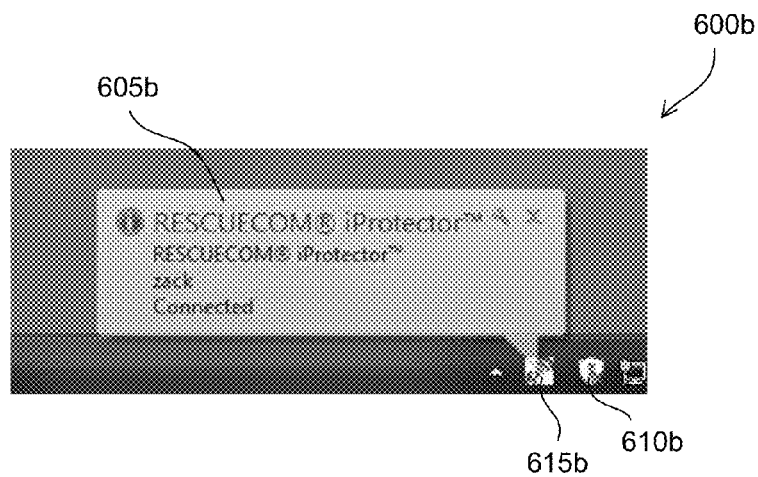
Figure 7:
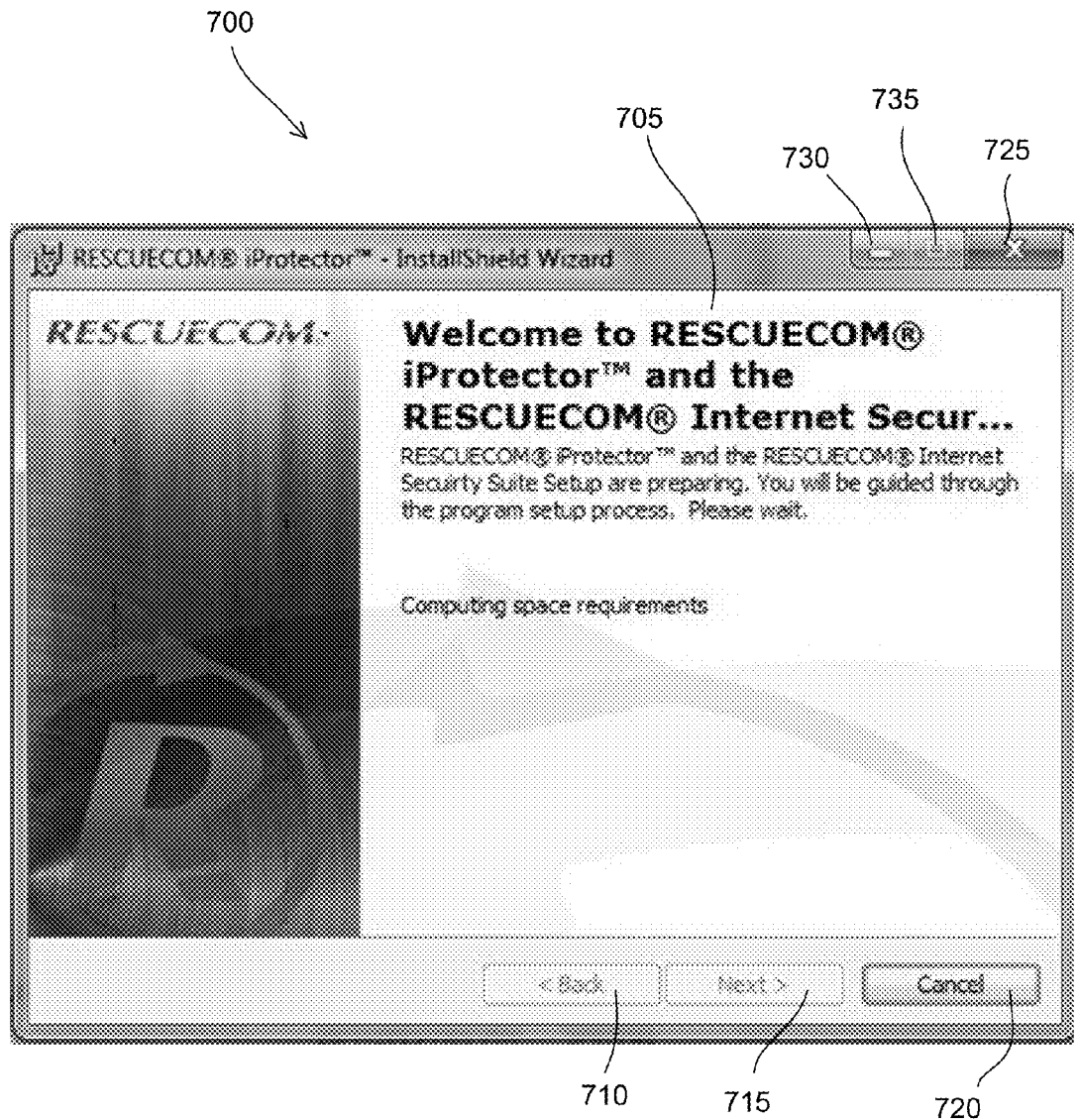
FIGS. 7-13 depict various example user interfaces associated with installation of an application on a client device.
Figure 8:
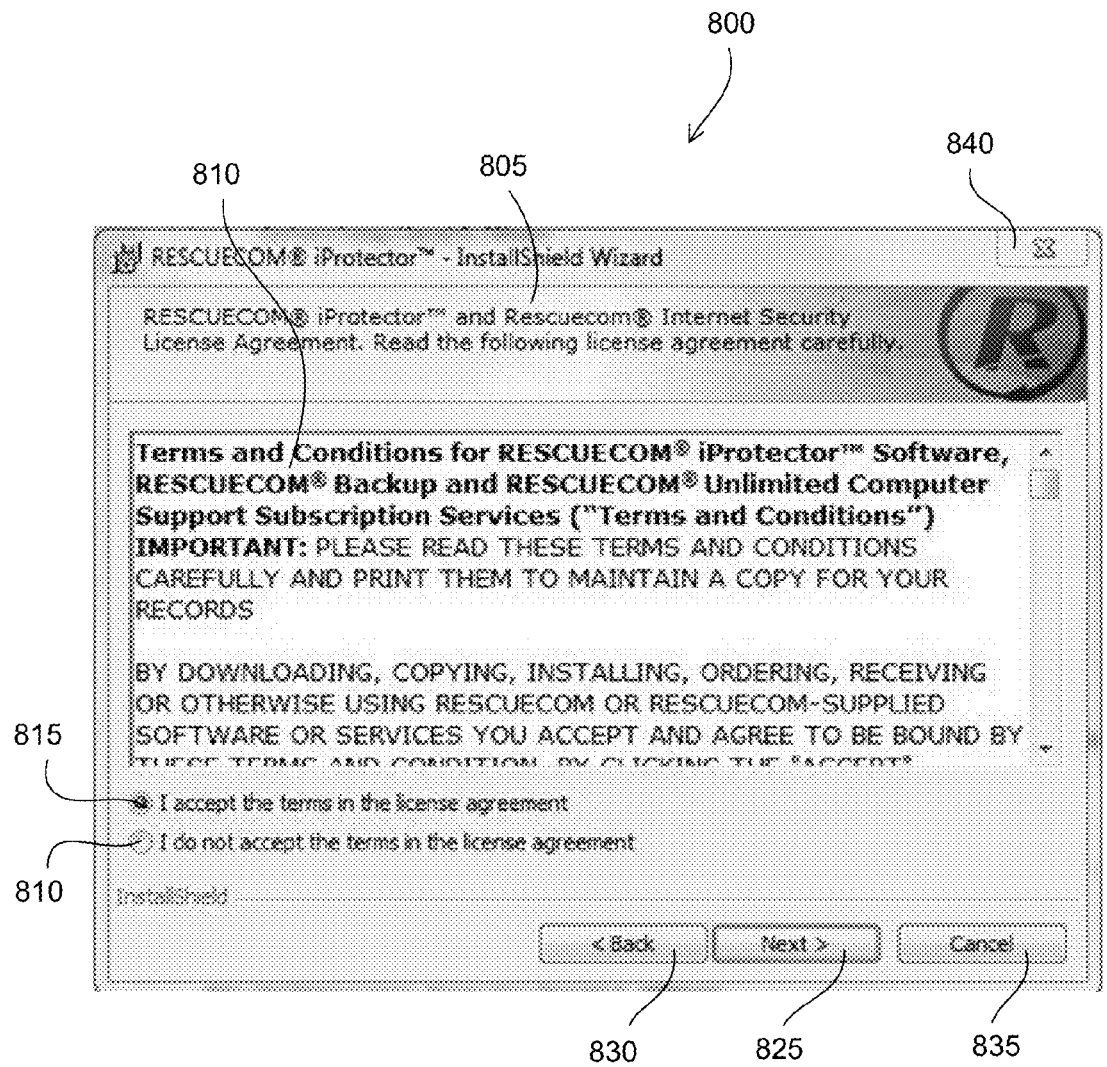
Figure 9:
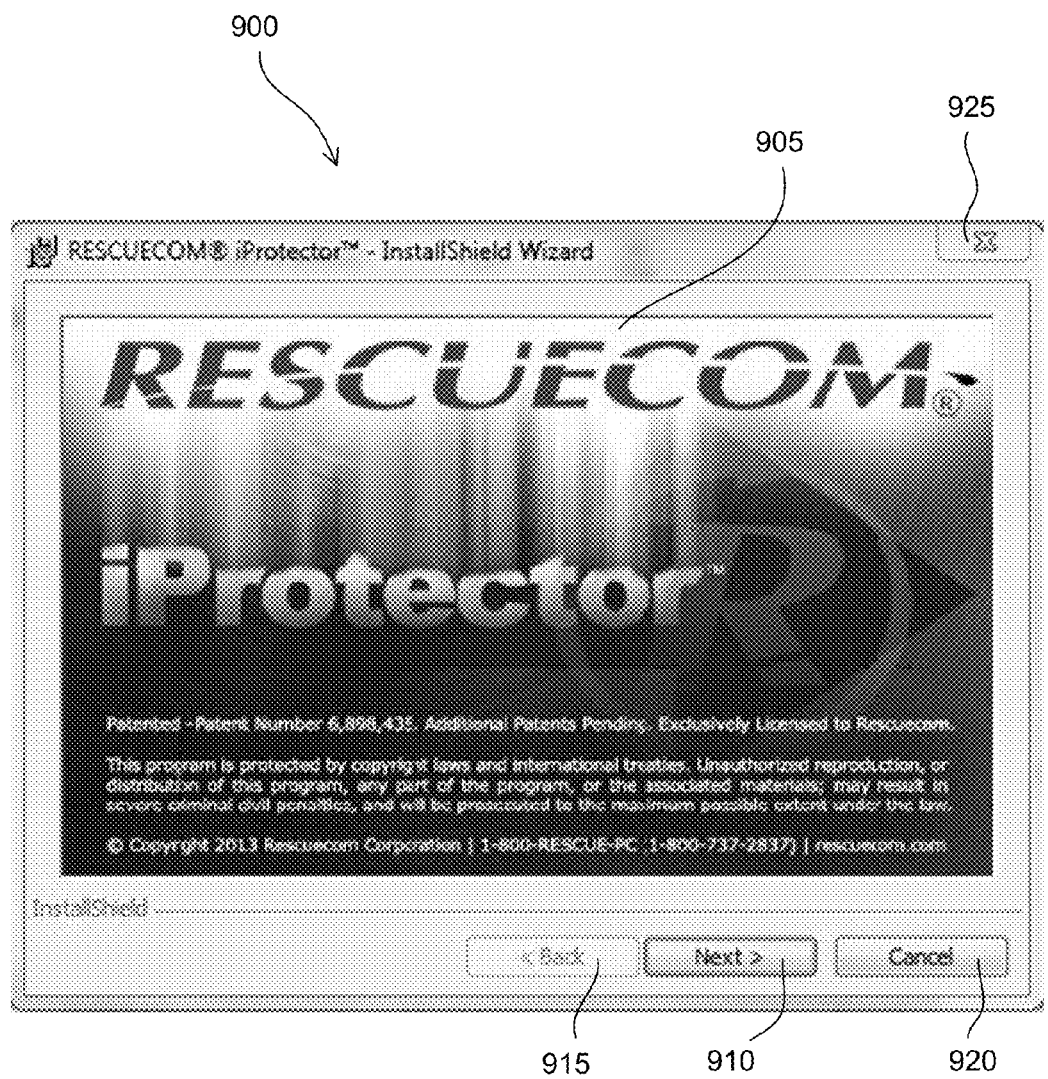
Figure 10:
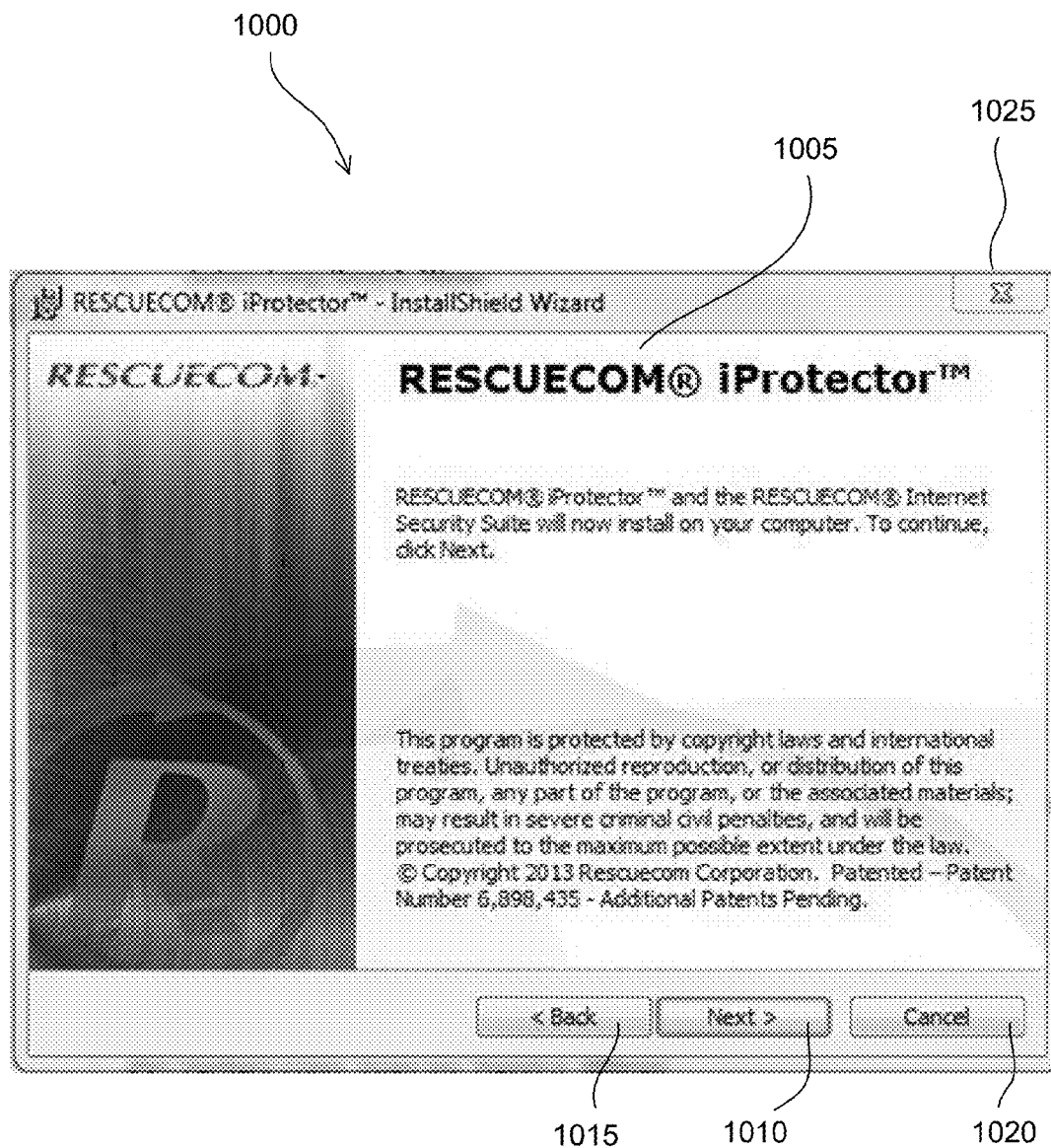
Figure 11:
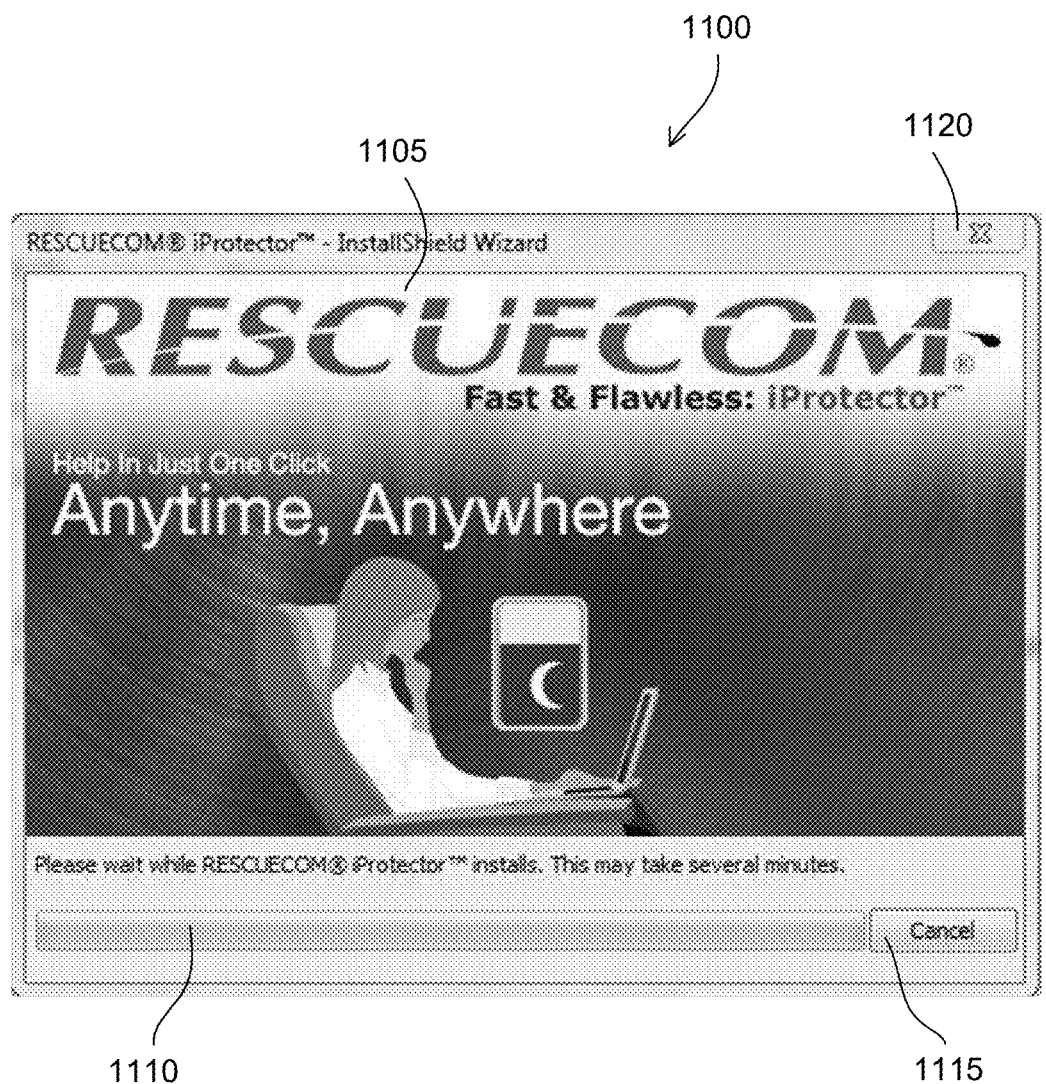
Figure 12:
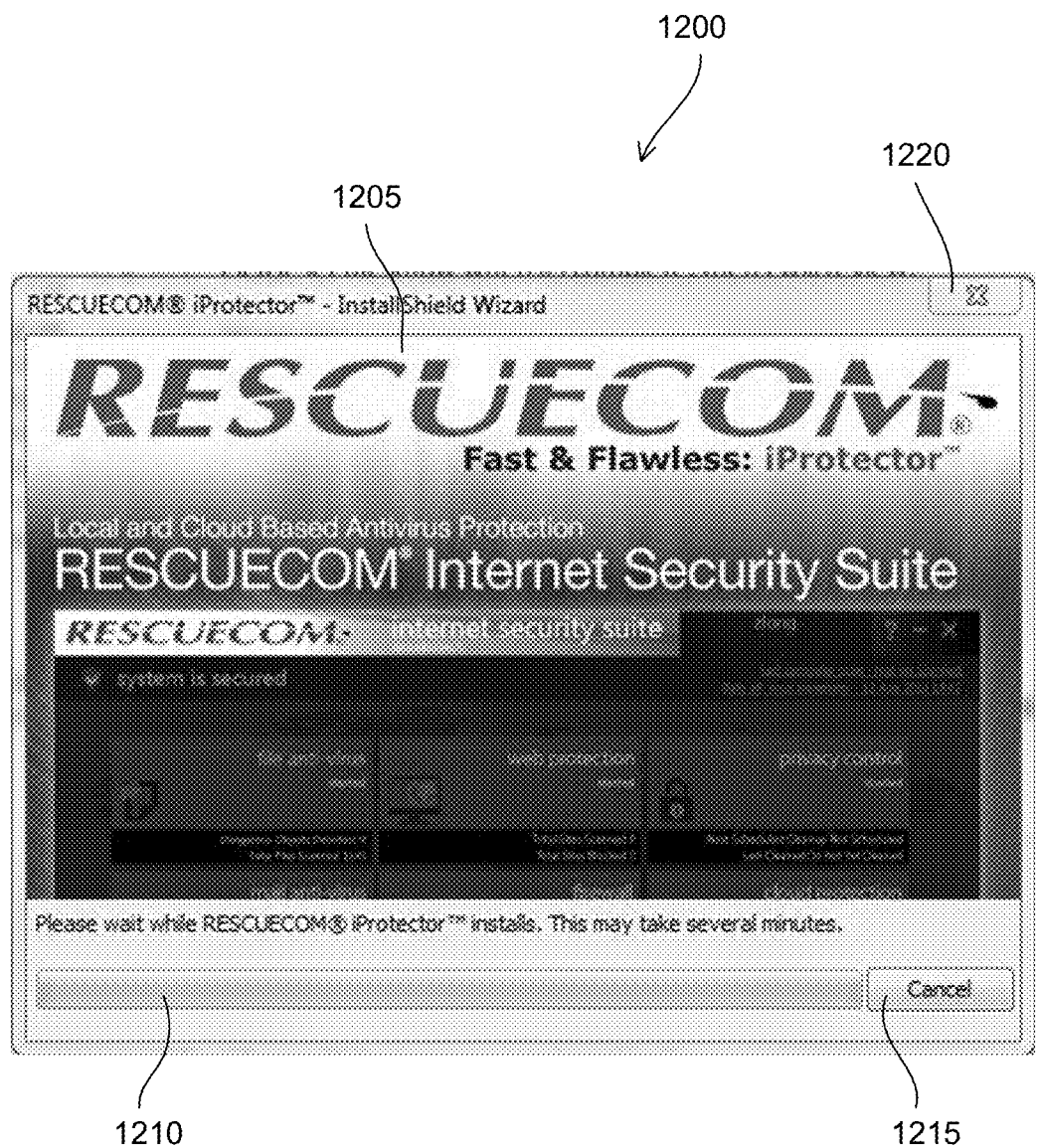
Figure 13:
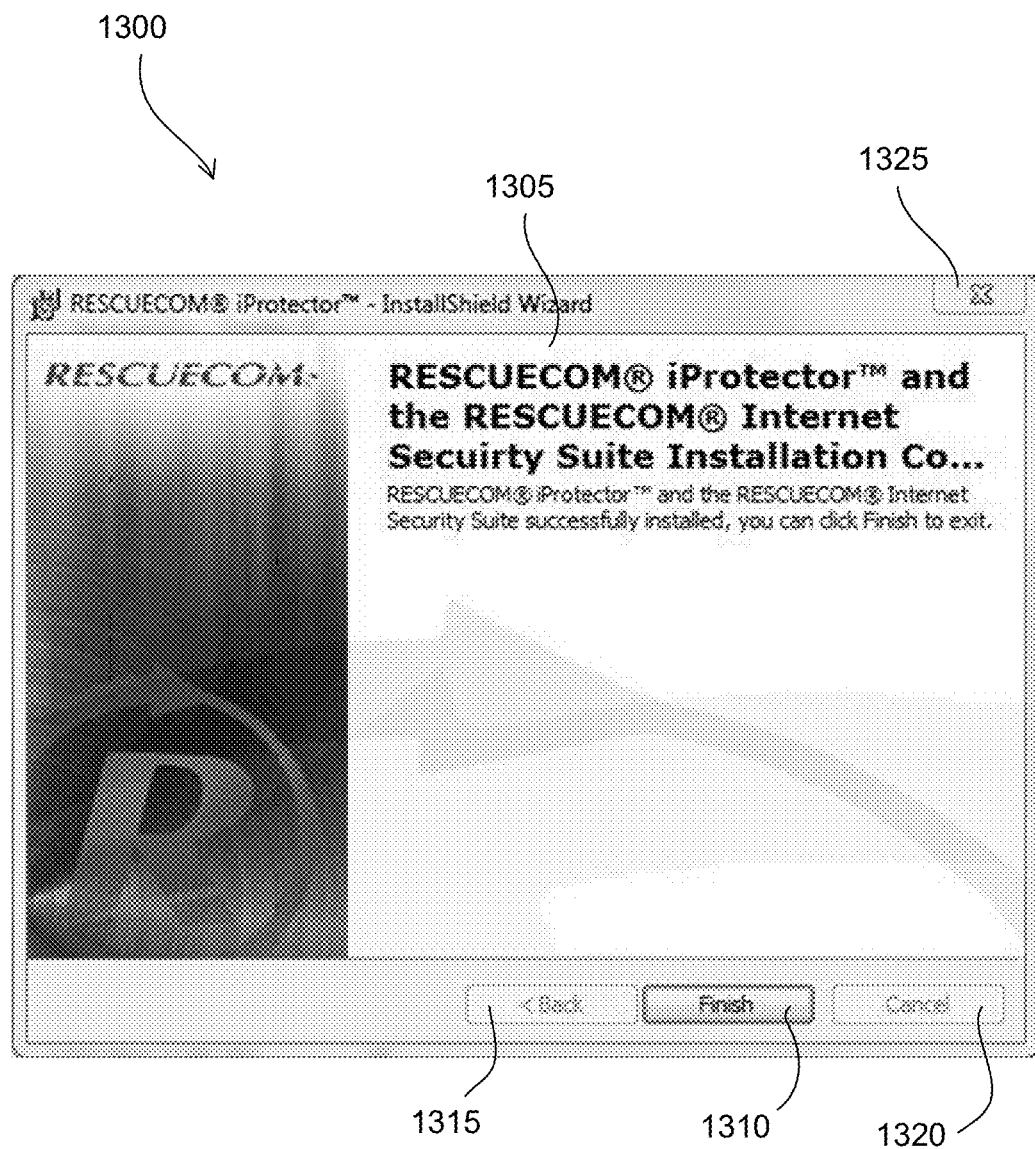

With reference to FIGS. 6A and 6B, an example user interface, associated with establishing a remote communication connection between a provider and a client, 600a is depicted along with a message banner 600b that indicates when a connection has been established. The processor 134, executing the module 136, may generate a display of user interface 600a on a display (e.g., display 132 of FIG. 2) of a client device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.) in response to a user selecting an icon (e.g., icon 405 of FIG. 4 or icon 550 of FIG. 5). The user interface 600a may include a data entry area 605a to facilitate client entry of a code. The code may, for example, be provided to the client by a technician. The processor 107, executing the module 109, may establish a remote connection between a provider device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.) in response to the client entering the code in data entry area 605a and subsequently selecting the connect icon 610a. Alternatively, the processor 107, executing the module 109, may automatically establish a remote communication connection between a provider device (e.g., desktop computer 146 of FIG. 1) and a client device (e.g., desktop computer 131 of FIG. 1) in response to in response to a user selecting an icon (e.g., icon 405 of FIG. 4 or icon 550 of FIG. 5). In any event, the processor 134, executing the module 136, may generate a display of banner 605b on the display 132. The message banner 600b may further include a connection status icon 615b and a provider dialog icon 610b.

Turning to FIGS. 7-13, various example user interfaces associated with installation of a distributed sales, service and repair management module on a client device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.) 700, 800, 900, 1000, 1100, 1200, 1300 are depicted. The processor 134, executing module 136, may, for example, generate a display of any one of the user interfaces 700, 800, 900, 1000, 1100, 1200, 1300 on a display (e.g., display 132) of a client device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.) in conjunction with block 230 of FIG. 2, for example. The user interface 700 may include an information area 705 that may indicate computer (or device) memory space requirements needed to install the module 136. The user interface 700 may further include a back icon 710, a next icon 715, a cancel icon 720, a minimize icon 730, a full-screen icon 735 and/or an exit icon 725. The processor 134 may perform functions that are known in the art in response to a client selecting any one of the back icon 710, the next icon 715, the cancel icon 720, the minimize icon 730, the full-screen icon 735 or the exit icon 725.

The user interface 800 may include a notification regarding a module license agreement 805 along with terms of the licensing agreement 810. The user interface 800 may further include a selection area indicative that a client does not accept the licensing agreement terms 810 and a selection area indicative that the client does accept the licensing agreement terms 815 that may be used in conjunction with block 225 of FIG. 2. The user interface 800 may further include a back icon 830, a next icon 825, a cancel icon 835 and an exit icon 840. The processor 134 may perform functions that are known in the art in response to a client selecting any one of the back icon 830, the next icon 825, the cancel icon 835 or the exit icon 840.

The user interface 900 may include an information area 905 related to features of the module 136. The user interface 900 may further include a back icon 915, a next icon 910, a cancel icon 920 and an exit icon 925. The processor 134 may perform functions that are known in the art in response to a client selecting any one of the back icon 915, the next icon 910, the cancel icon 920 or the exit icon 925.

The user interface 1000 may include an information area 1005 related to features of the module 136. The user interface 1000 may further include a back icon 1015, a next icon 1010, a cancel icon 1020 and an exit icon 1025. The processor 134 may perform functions that are known in the art in response to a client selecting any one of the back icon 1015, the next icon 1010, the cancel icon 1020 or the exit icon 1025.

The user interface 1100 may include an information area 1105 related to features of the module 136 and a status bar 1110 that may indicate an estimate of the amount of the module 136 that is currently installed on the client device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.). The user interface 1100 may further include a cancel icon 1115 and an exit icon 1120. The processor 134 may perform functions that are known in the art in response to a client selecting any one of the cancel icon 1115 or the exit icon 1120.

The user interface 1200 may include an information area 1205 related to features of the module 136 and a status bar 1210 that may indicate an estimate of the amount of the module 136 that is currently installed on the client device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.). The user interface 1200 may further include a cancel icon 1215 and an exit icon 1220. The processor 134 may perform functions that are known in the art in response to a client selecting any one of the cancel icon 1215 or the exit icon 1220.

The user interface 1300 may include an information area 1305 related to features of the module 136. The user interface 1300 may further include a back icon 1315, a finish icon 1310, a cancel icon 1320 and an exit icon 1325. The processor 134 may perform functions that are known in the art in response to a client selecting any one of the back icon 1315, the finish icon 1310, the cancel icon 1320 or the exit icon 1325.

Figure 14A:
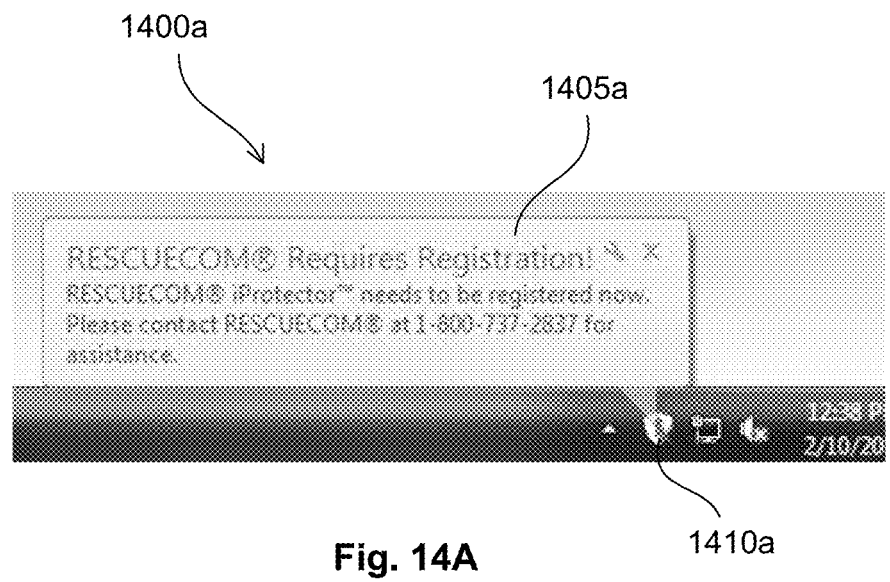
FIGS. 14A and 14B depict example user interfaces associated with registering an application.
Figure 14B:
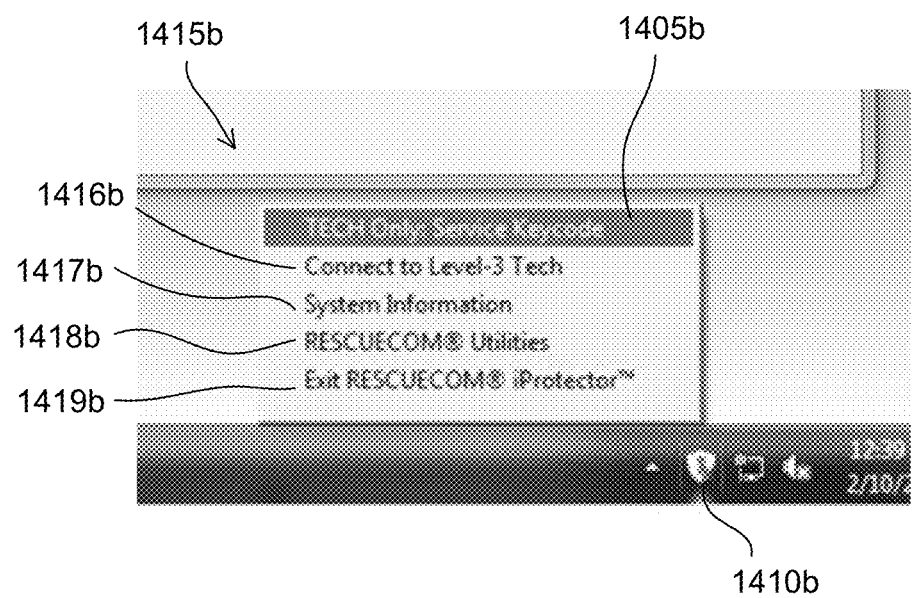
Figure 15A:
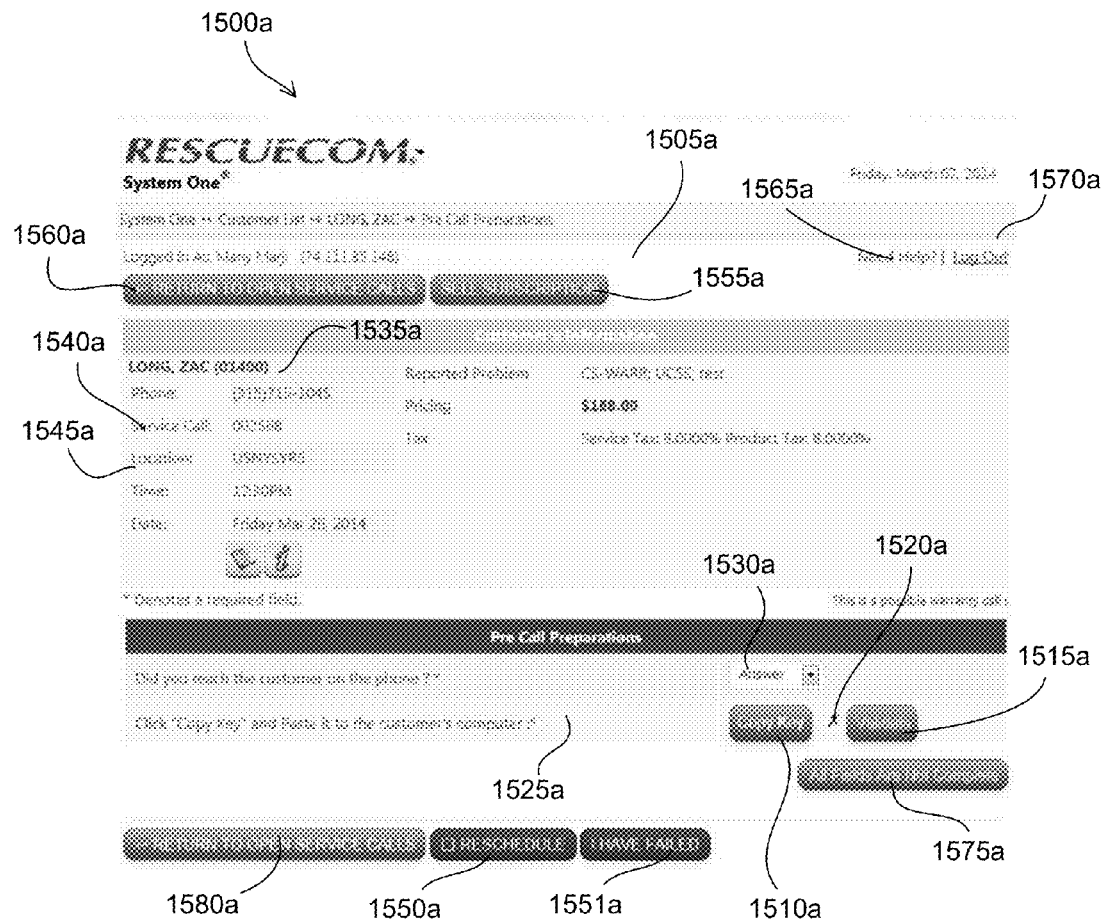
FIGS. 15A-15F depict example user interfaces associated with the remote client device identity authentication method of FIG. 3.
Figure 15B:
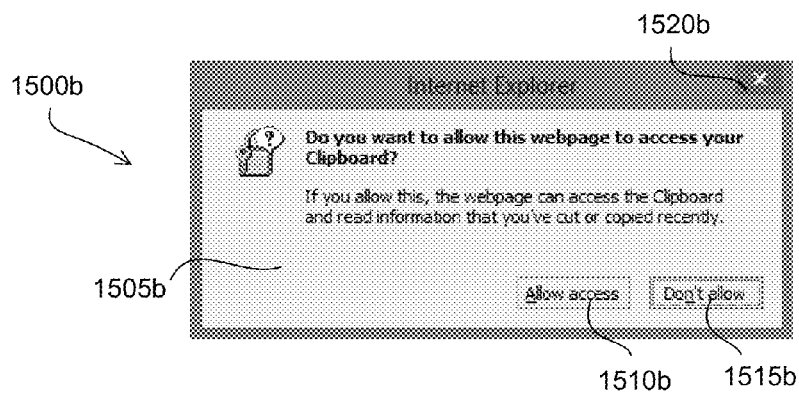
Figure 15C:
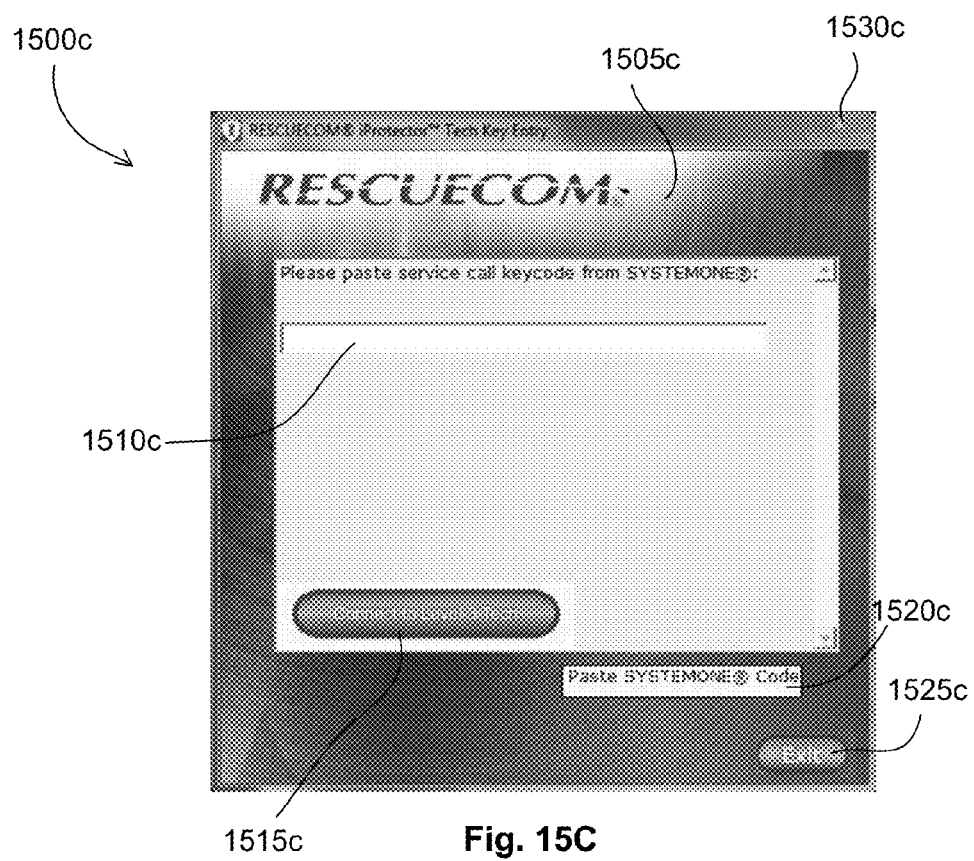
Figure 15D:
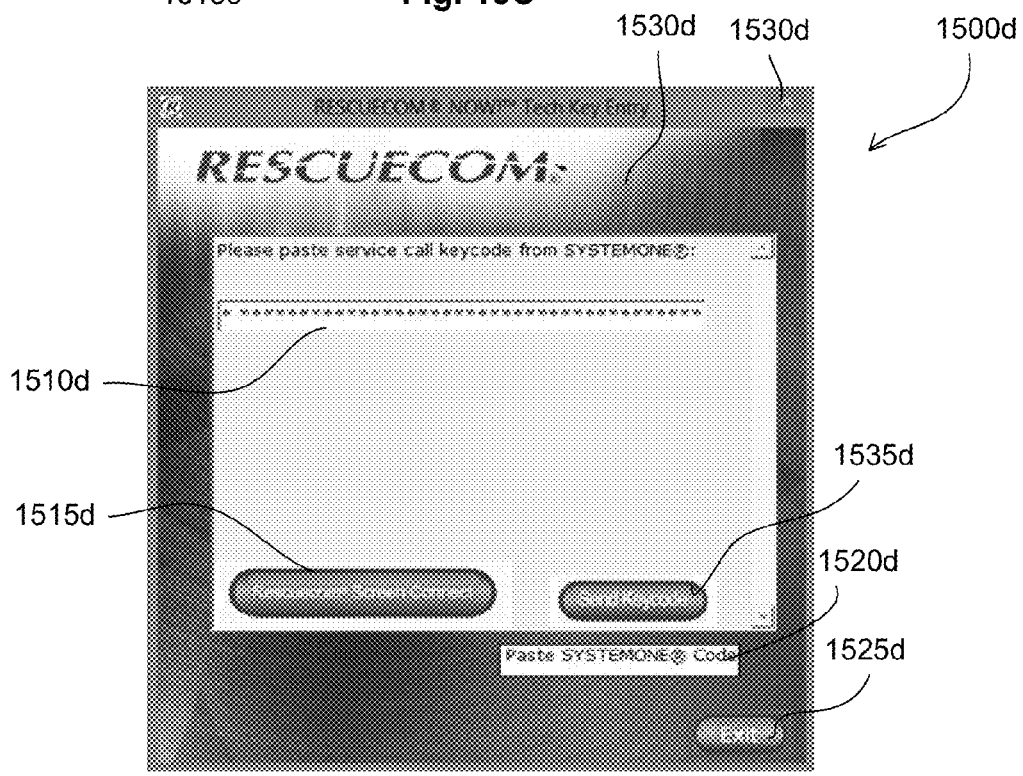
Figure 15E:
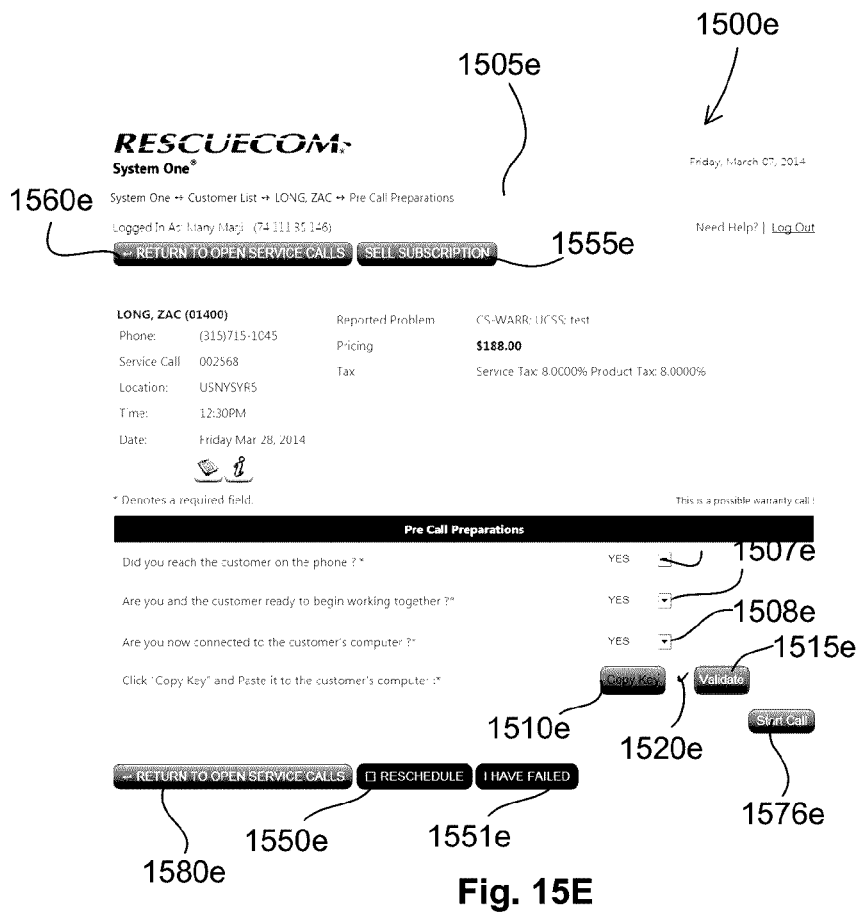
Figure 15F:
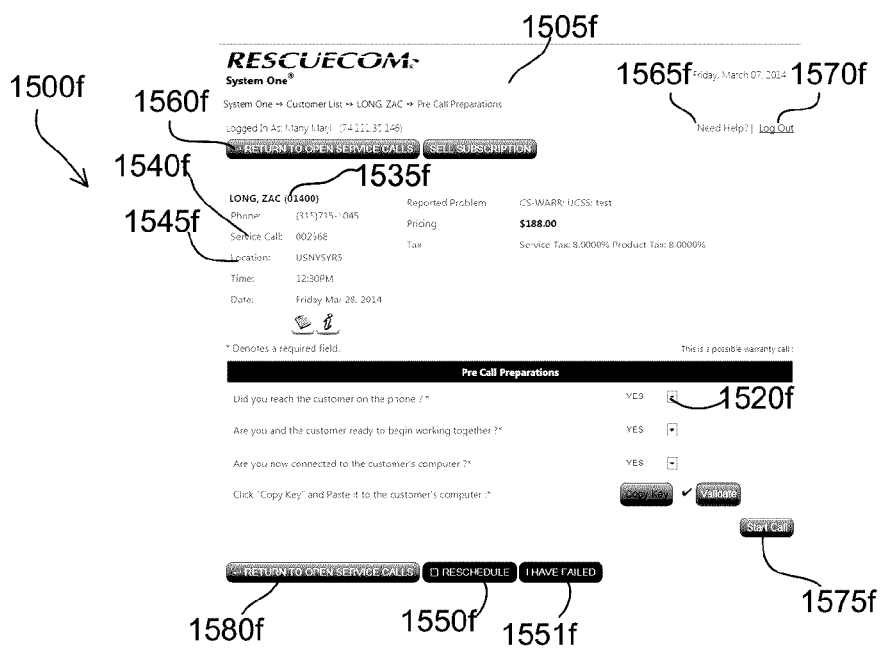

With reference to FIGS. 14A and 14B, example user interfaces associated with registering an application 1400a, 1415b are depicted. The processor 134, executing module 136, may, for example, generate a display of either one of the user interfaces 1400a 1415b on a display (e.g., display 132) of a client device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.) in conjunction with block 230 of FIG. 2. The user interface 1400a may include an information banner 1405a, that may include information related to registering the module 136, and a registration icon 1410a. The processor 134, executing the module 136, may generate a display of user interface 1415b, on a display (e.g., display 132) of a client device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.), in response to a client selecting the icon 1410a, for example. The user interface 1415b may further include a tech only; service key code menu item 1405b, a connect to level-3 tech menu item 1416b, a system information menu item 1417b, a utilities menu item 1418b, an exit module menu item 1419b and a menu icon 1410b.

Turning to FIGS. 15A-15F, example user interfaces, associated with the remote client device identity authentication method of FIG. 3, 1500a-1500f are depicted. The processor 149, executing module 151, may, for example, generate a display of any one of the user interfaces 1500a-1500f on a display (e.g., display 147) of a technician device e.g., desktop computer 146) in conjunction with the method 300 of FIG. 3. The user interface 1500a may include an information area 1505a, a customer account identification 1535a, a service call number 1540a, a location (e.g., geographic location) 1545a, a reschedule icon 1550a, an I have failed icon 1551a, a sell subscription icon 1555a, a return to open service calls icon 1560a, a need help icon 1565a, a log out icon 1570a, a click "Copy Key" and Paste it to the customer's computer display 1525a, a did you reach the customer on the phone question selection menu 1530a, validation indication 1520a, a return to open service calls icon 1580a and an all fields are not complete icon 1575a. The processor 149 may, for example, copy an encrypted key (e.g., encrypted code as generated in block 305 of the method of FIG. 3) in conjunction with block 310 of the method 300 in response to a technician selecting a copy key icon 1510a of the user interface 1500a. The processor 149 may generate a display of the user interface 1500b in response to the technician selecting the copy key icon 1510a. The user interface 1500b may include an information area 1505b, an allow access icon 1510b, a don't allow access icon 1515b and an exit icon 1520b. The processor 149 may copy the encrypted key and generate a display of the user interface 1500c in response to the technician selecting the allow access icon 1510b. The processor 149 may paste the encrypted key into the data entry area 1510c in response to the technician selecting the paste code icon 1520c. The user interface 1500c may also include an information area 1505c, a screen connect icon 1515c, an exit icon 1525c and a cancel icon 1530c.

The processor 149 may generate a display of the user interface 1500d, with a "masked" version of the encrypted code depicted within the data entry area 1510d, in response to the technician selecting the paste code icon 1520c. The user interface 1500d may include an information area 1530d, a screen connect icon 1515d, a paste code icon

1520*d*, an exit icon 1525*d* and a cancel icon 1530*d*. Subsequent to copying/pasting the encrypted code into the data entry area 1510*d*, the processor 149 may generate a display of the user interface 1500*e* in response to the technician selecting the validate icon 1515*a* and the service call is validated via, for example, the method 300 of FIG. 3. As can be seen by comparing the user interface 1500*a* with the user interface 1500*e*, the validation indication 1520*a* (e.g., an "X") changes to validation indication 1520*e* (e.g., a "√") once the service call is validated per, for example, the method 300 of FIG. 3.

The user interface 1500*e* may include an information area 1505*e*, a did you reach the customer by phone selection menu 1506*e*, an are you and the customer ready to begin working together selection menu 1507*e*, an are you now connected to the customer computer (or device) selection menu 1508*e*, a return to open service calls icon 1580*e*, a reschedule icon 1550*e*, an I have failed icon 1551*e* and a copy key icon 1510*e*. The processor 149 may generate a display of the user interface 1500*f* in response to the technician selecting the start call icon 1576*e*. The user interface 1500*f* may include an information area 1505*f*, did you reach the customer by phone selection menu 1520*f*, a customer account identification 1535*f*, a service call number 1540*f*, a location (e.g., geographic location) 1545*f*, a reschedule icon 1550*f*, an I have failed icon 1551*f*, a return to open service calls icon 1560*f*, a need help icon 1565*f*, a logout icon 1570*f*, a return to open service calls icon 1580*f* and a send call icon 1575*f*.

Figure 16:
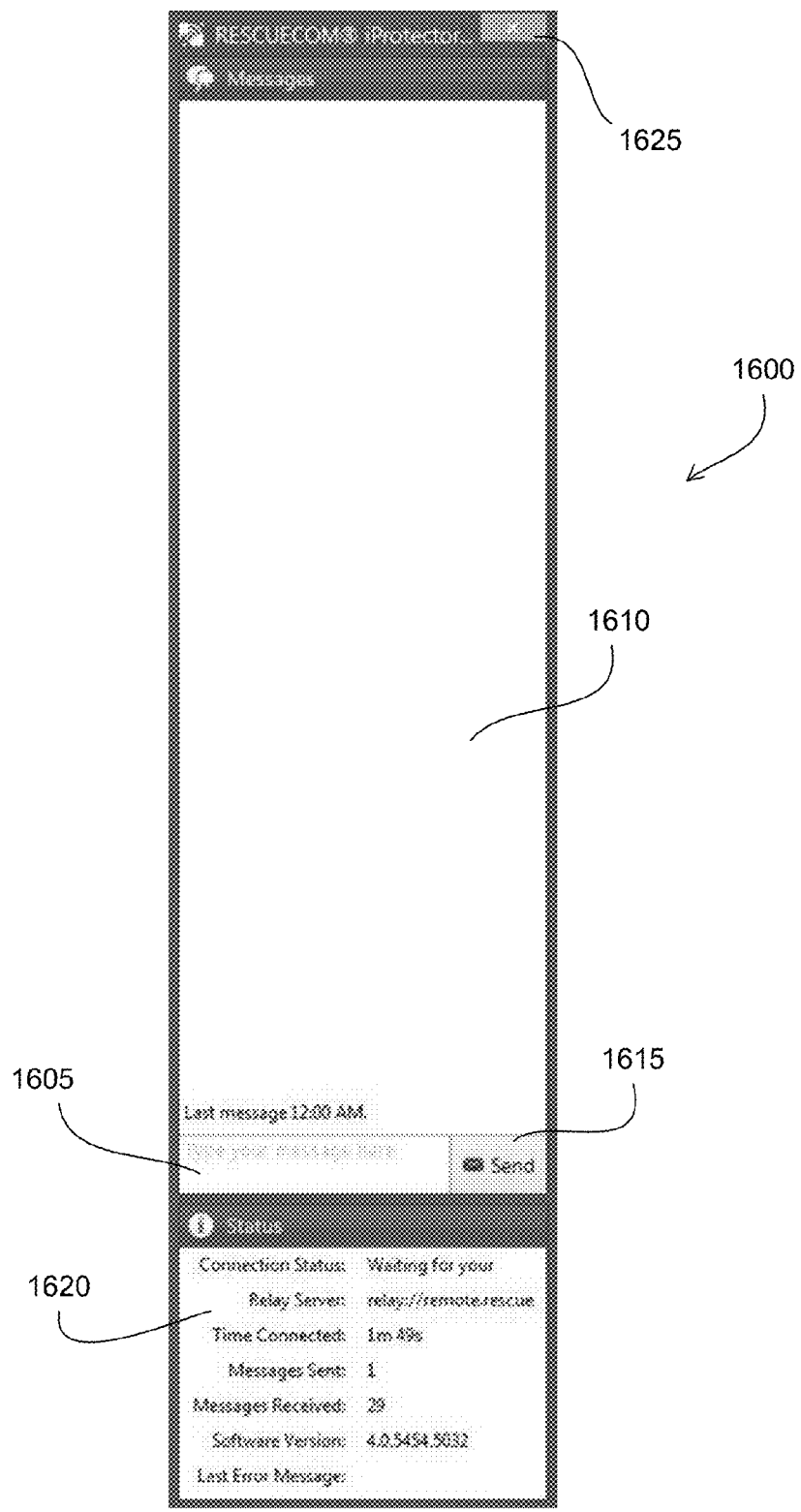
FIG. 16 depicts an example dialog interface for communication between a provider and a client.

With reference to FIG. 16, an example dialog user interface for communication between a provider and a client 1600 is depicted. Any one of the processors 107, 115, 122, 134, 149, 164 may generate a display of the user interface 1600 on a corresponding display. The user interface 1600 may include a message entry area 1605, a message display area 1610, a message send icon 1615, a connection status area 1620 and an exit icon 1625.

Figure 17A:
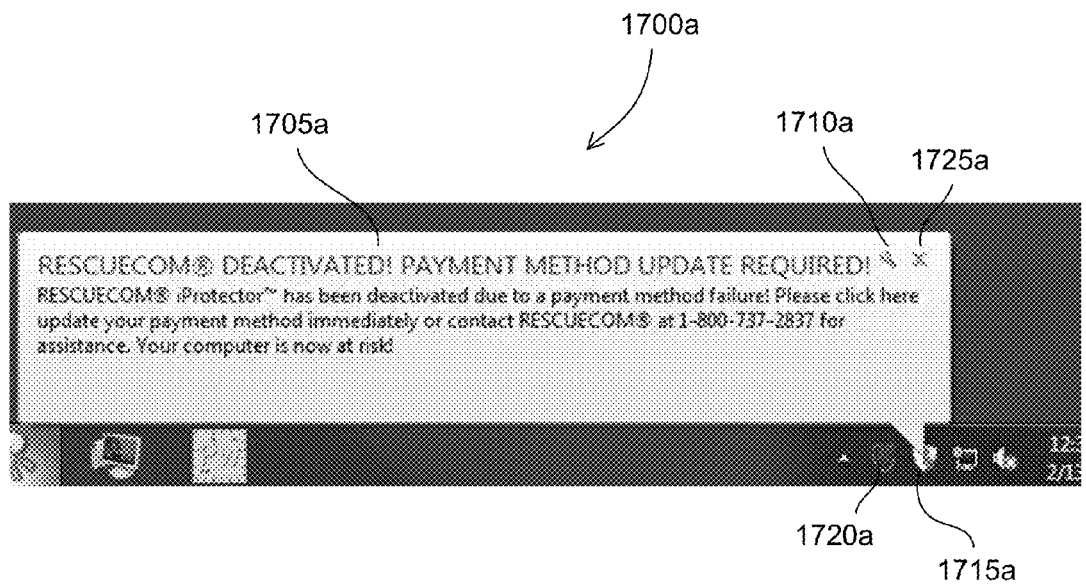
FIGS. 17A and 17B depict example status displays related to a client account.
Figure 17B:
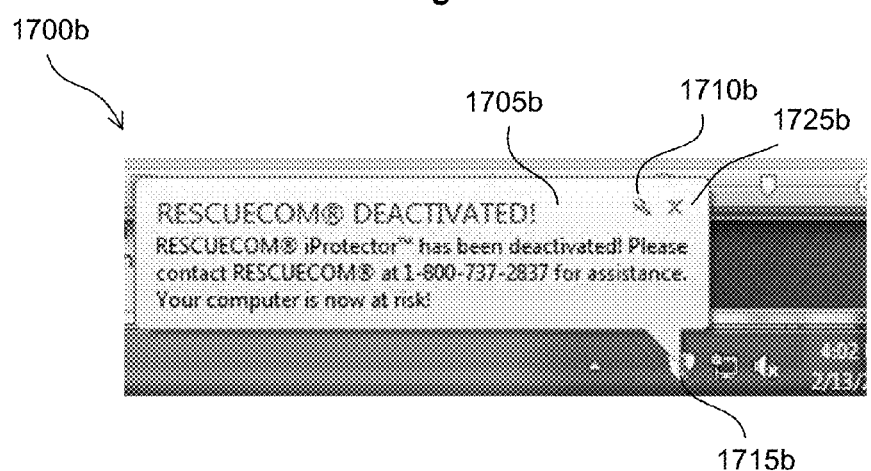

Turning to FIGS. 17A and 17B, example status displays related to a client account 1700*a*, 1700*b* are depicted. Any one of the processors 107, 115, 122, 134, 149, 164 may generate a display of either, or both, of the status displays 1700*a*, 1700*b* on a corresponding display device per, for example, block 255 of the method 200 of FIG. 2 or block 335 of the method 300 of FIG. 3. The status display 1700*a* may include an information area 1705*a*, a repair icon 1710*a*, a status icon 1715*a*, an information icon 1720*a* and an exit icon 1725*a*. The status display 1700*b* may include an information area 1705*b*, a repair icon 1710*b*, a status icon 1715*b* and an exit icon 1725*b*.

Figure 18A:
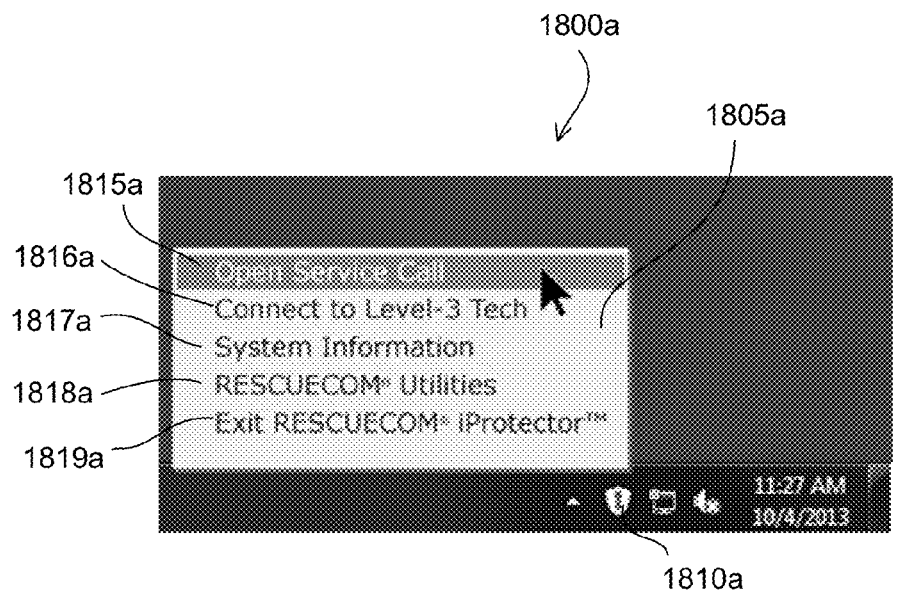
FIGS. 18A and 18B depict example user interfaces for establishing a dialog between a provider and a client.
Figure 18B:
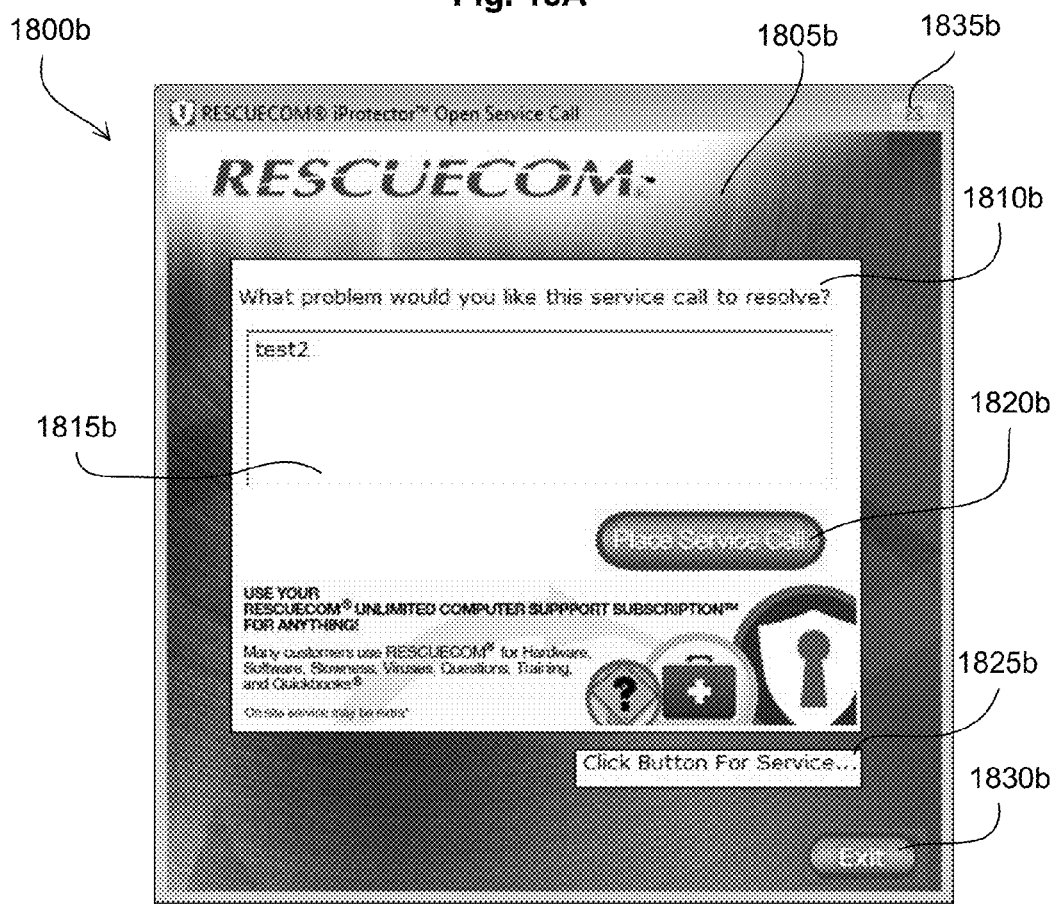

With reference to FIGS. 18A and 18B, example user interfaces for establishing a dialog between a provider and a client 1800*a*, 1800*b*. Processor 107 may generate a display of the user interface 1805*a* in response to, for example, a user (e.g., a client) selecting the initiation icon 1810*a*. Processor 107 may generate a display of the user interface 1800*b* in response to, for example, a user (e.g., client) selecting the open service call icon 1815*a*. The user interface 1805*a* may further include a connect to level-3 technician icon 1816*a*, a system information icon 1817*a* a utilities icon 1818*a* and an exit icon 1819*a*. The user interface 1800*b* may include an information banner 1805*b*, a what problem would you like this service call to resolve display 1810*b*, a service desired entry area 1815*b*, a click button for service display 1825*b*, a place service call icon 1820*b*, an exit icon 1830*b* and a cancel icon 1835*b*.

Figure 19:
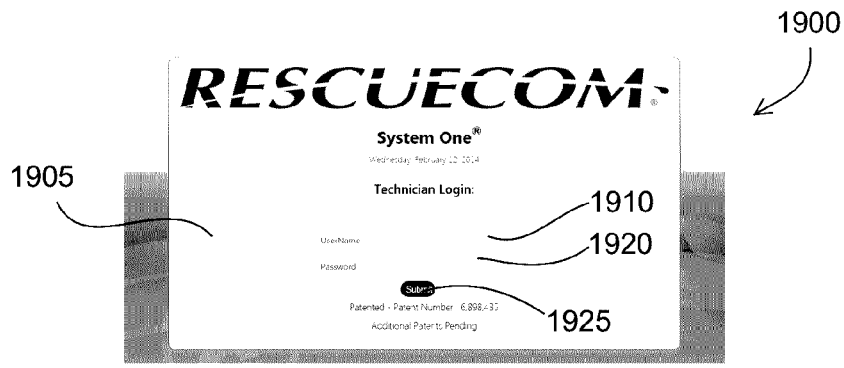
FIG. 19 depicts an example user login interface.

Turning to FIG. 19, an example user (e.g., technician) login interface 1900 is depicted. Processor 149, executing the module 151, may generate a display of the user interface 1900 on, for example, a display 147. The user interface 1900 may include an information area 1905, a user name entry area 1910, a password entry area 1920 and a logon icon 1925.

Figure 20:
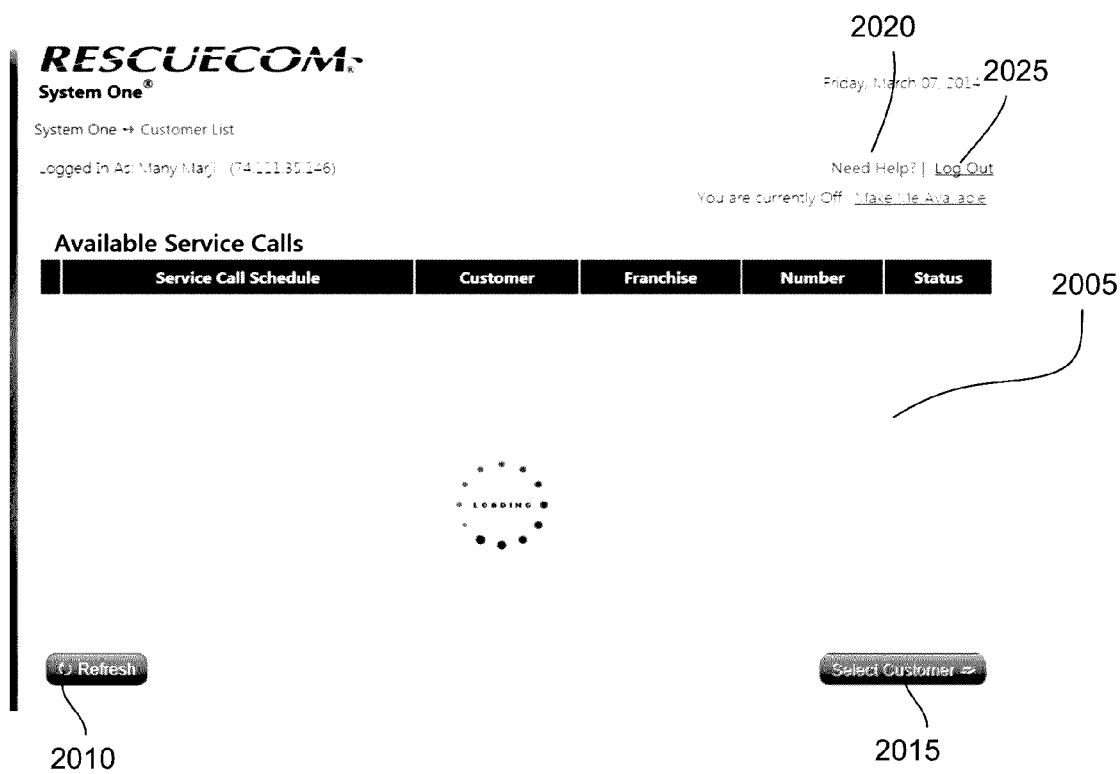
FIGS. 20-22 depict various example user interfaces related to clients that have initiated a request for provider assistance.
Figure 21A:
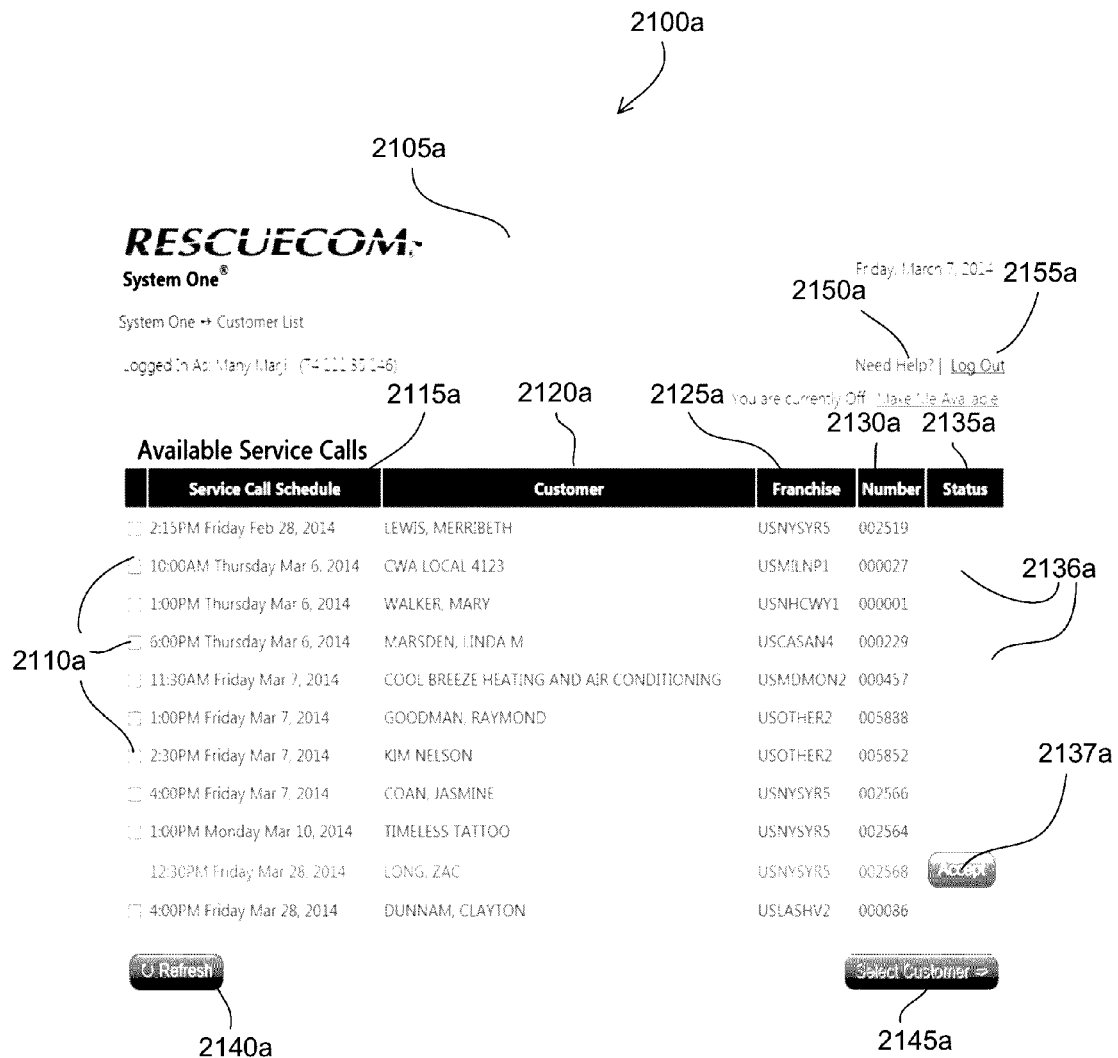
Figure 21B:
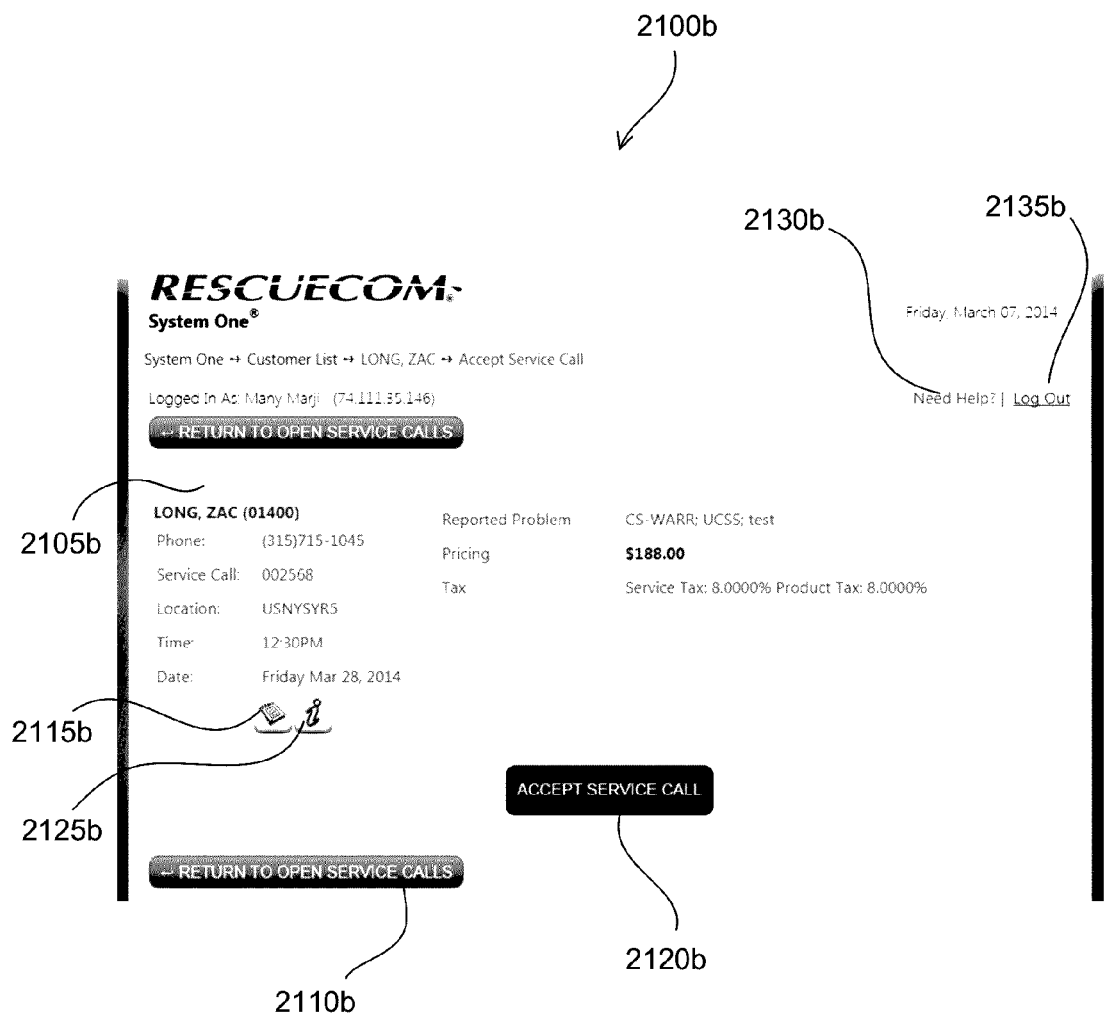
Figure 22:
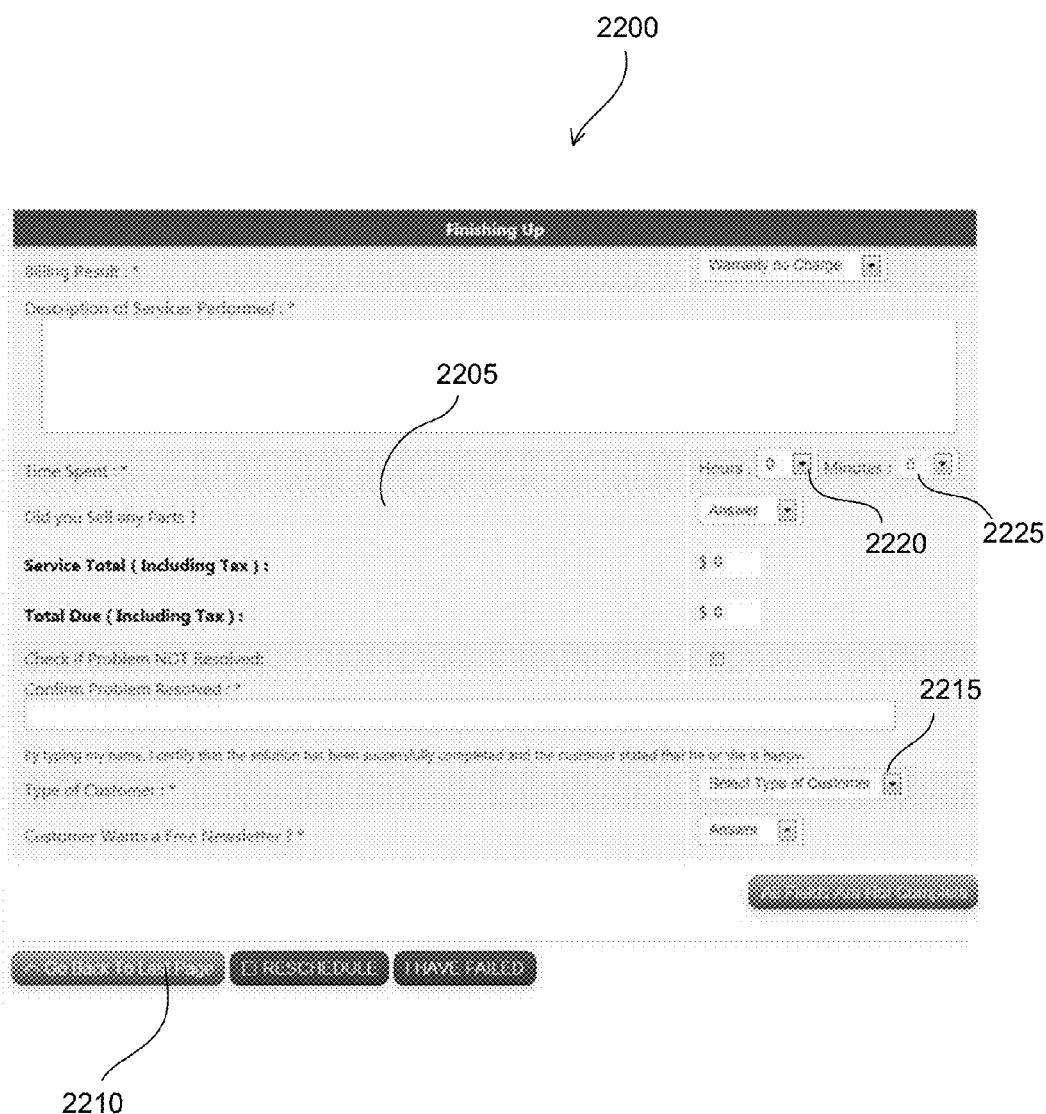
Figure 23A:
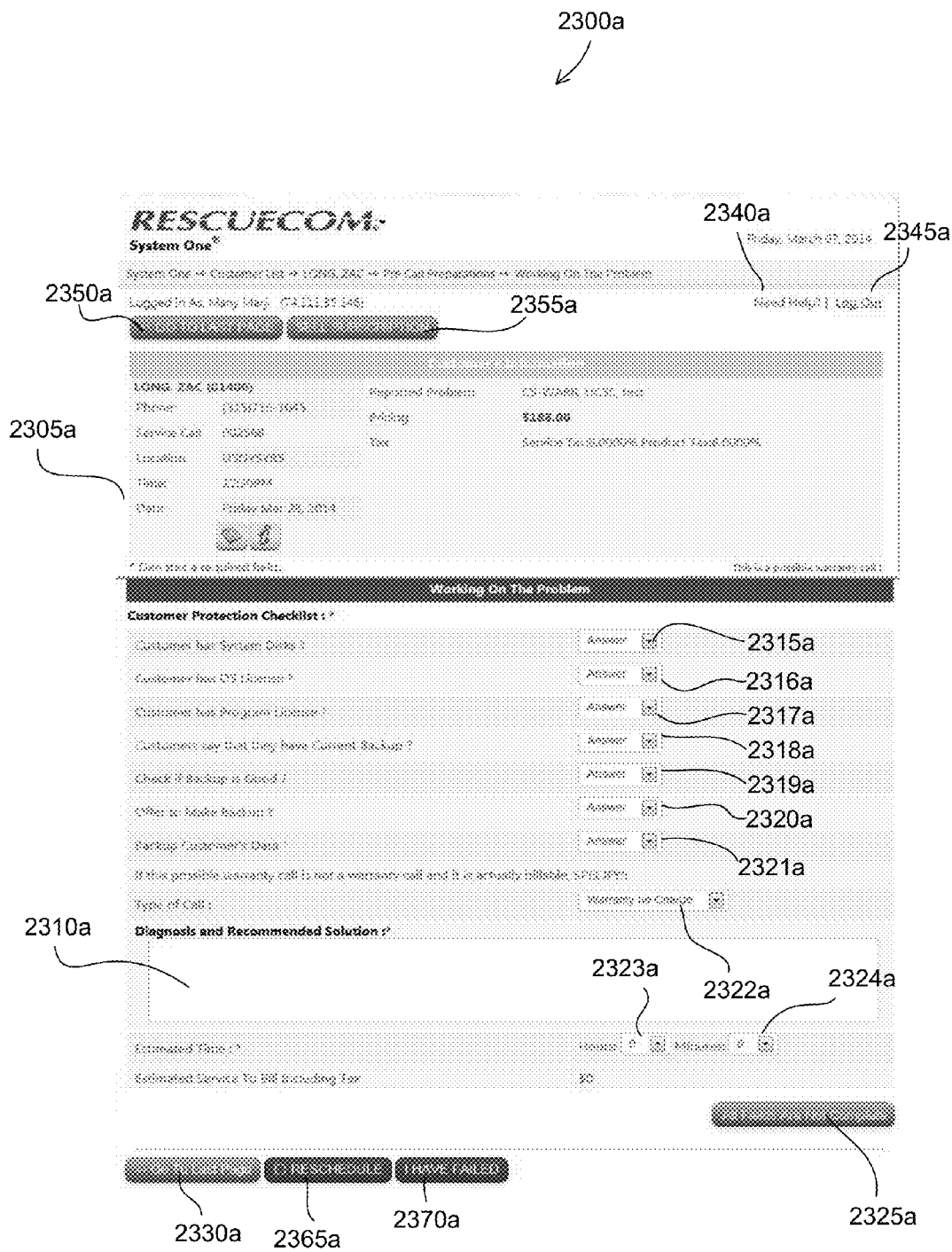
Figure 23B:
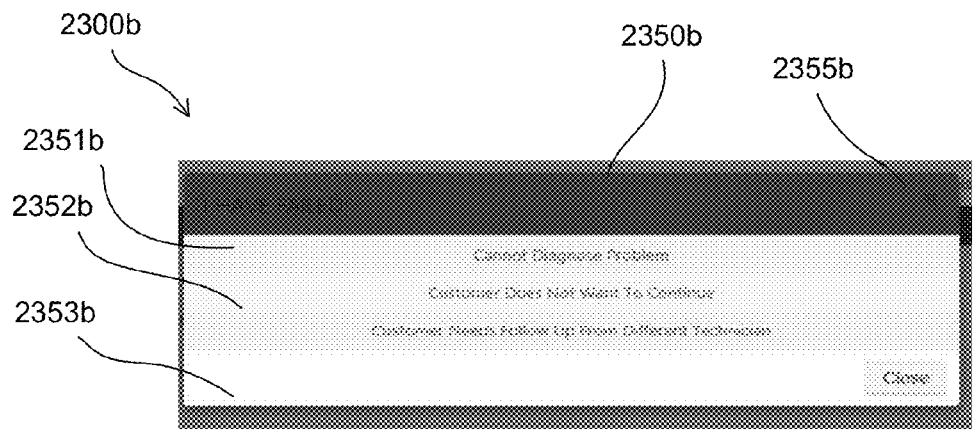
Figure 23C:
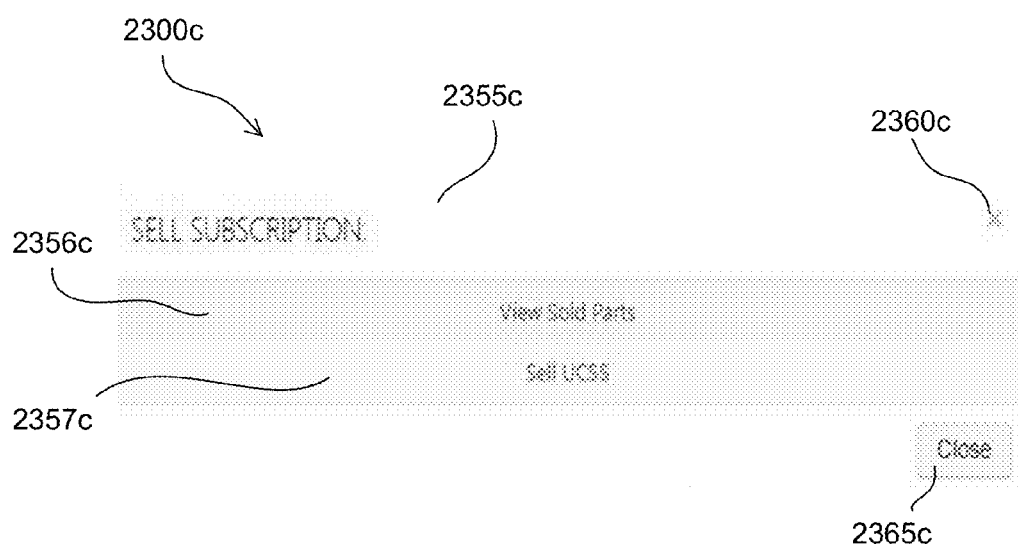
Figure 23D:
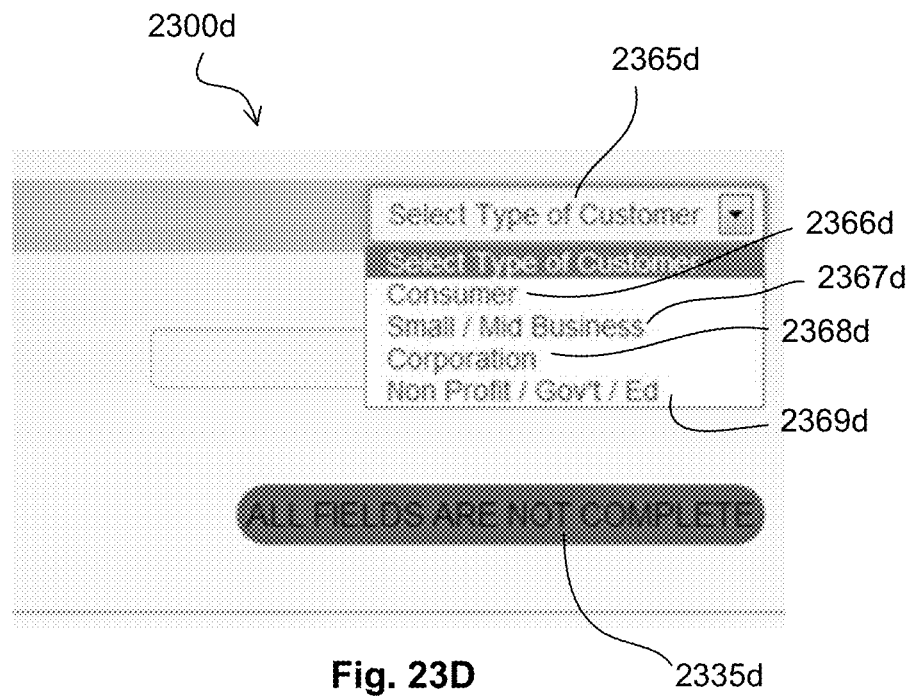
Figure 23E:
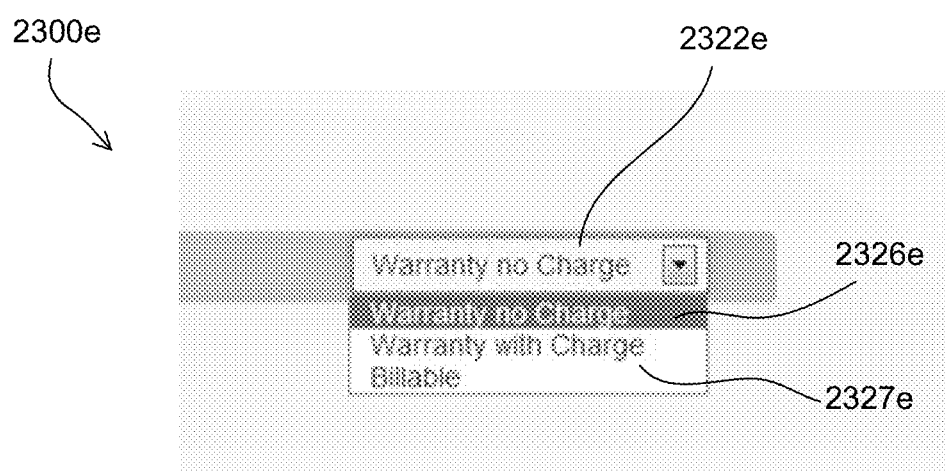
Figure 24:
Figure 25:
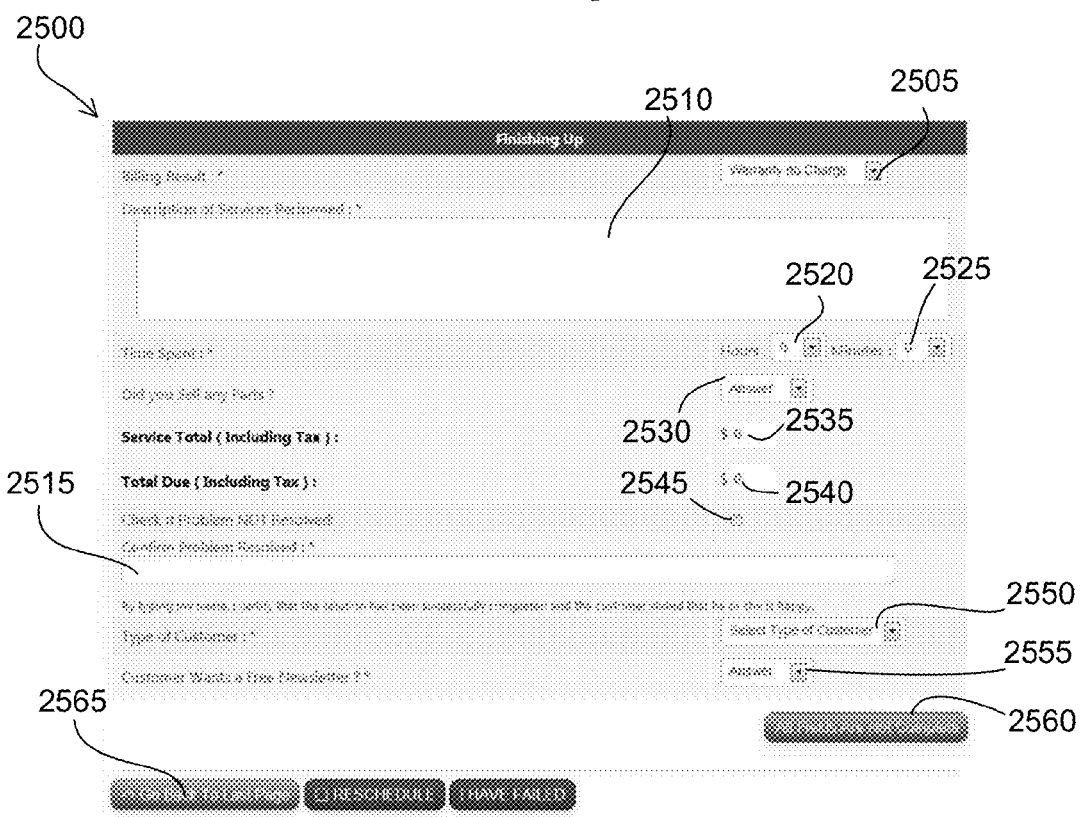
Figure 26:
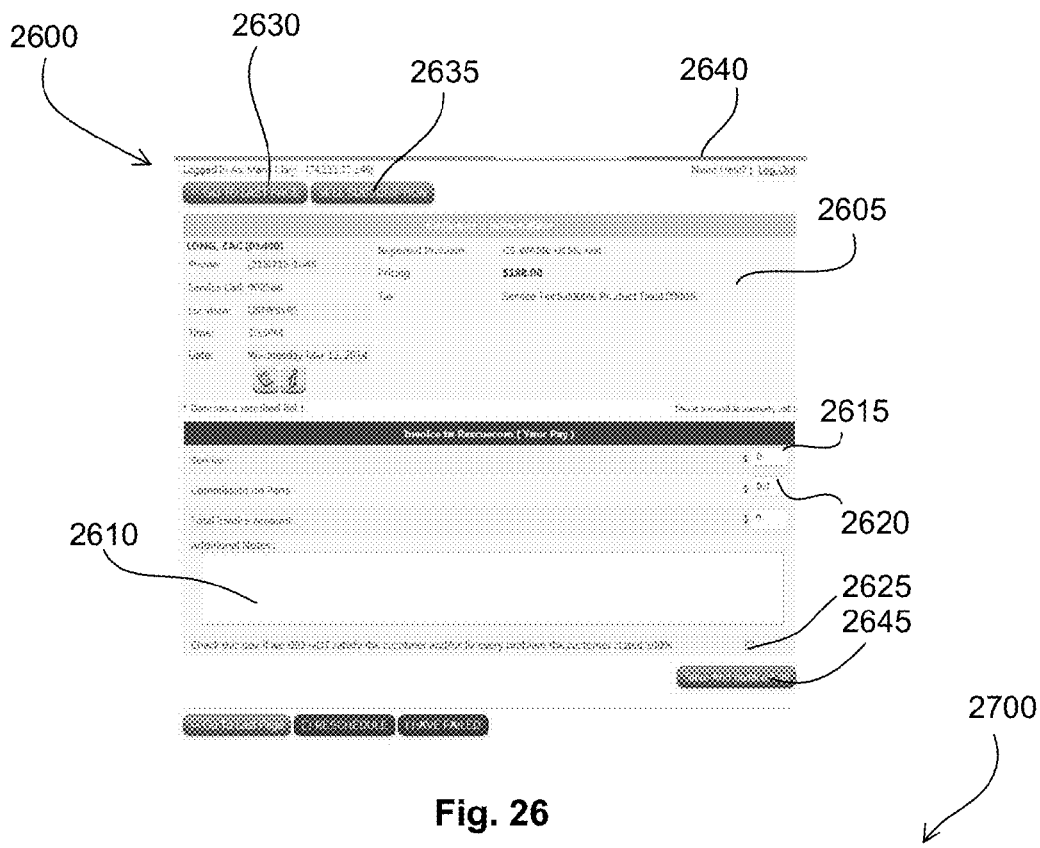
Figure 27:
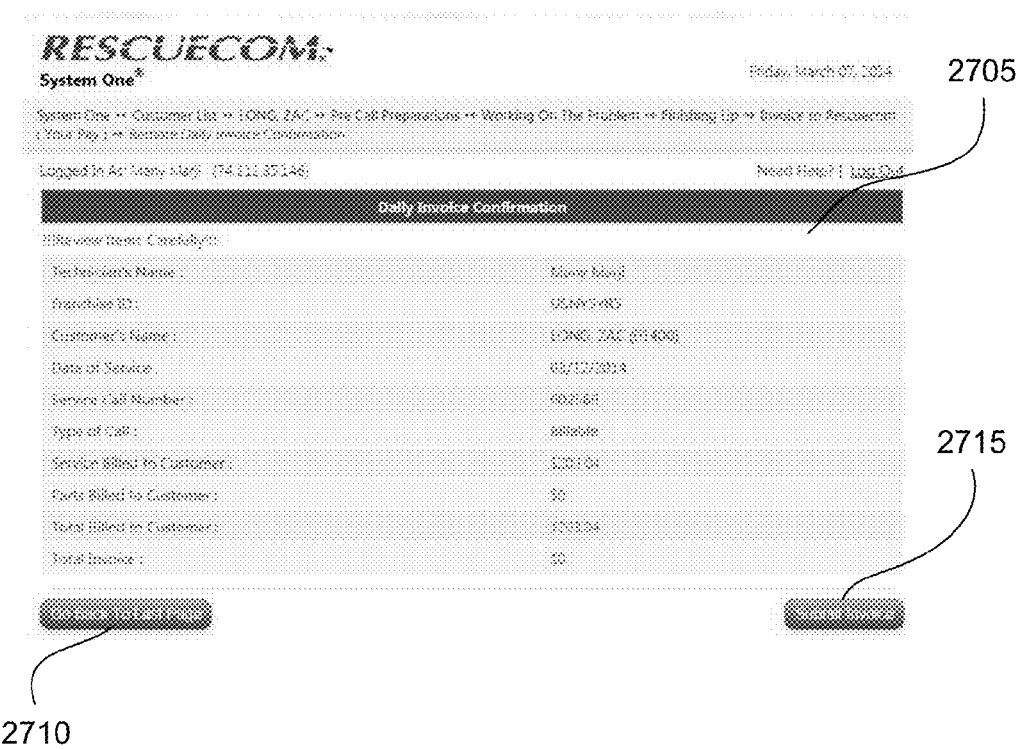
Figure 28:
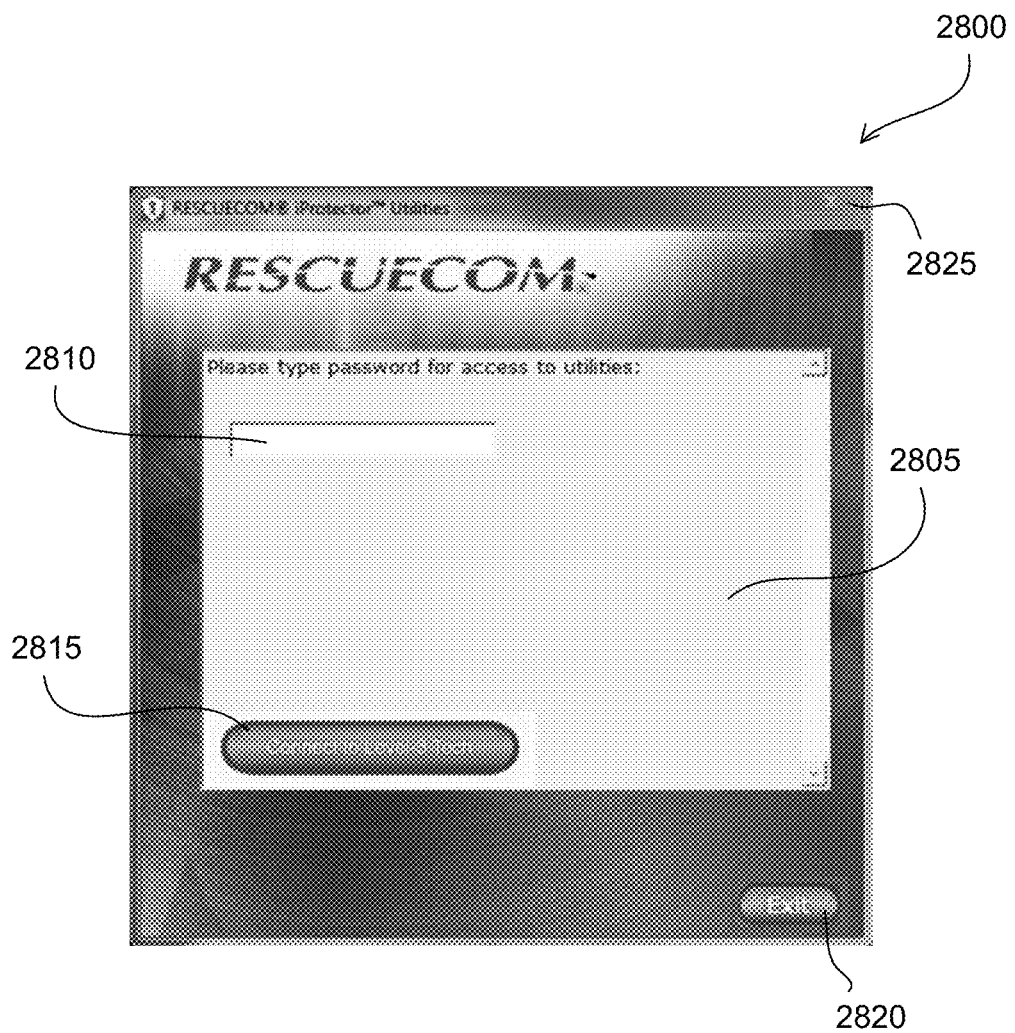
FIGS. 28-31 depict various example utilities user interfaces.
Figure 29:
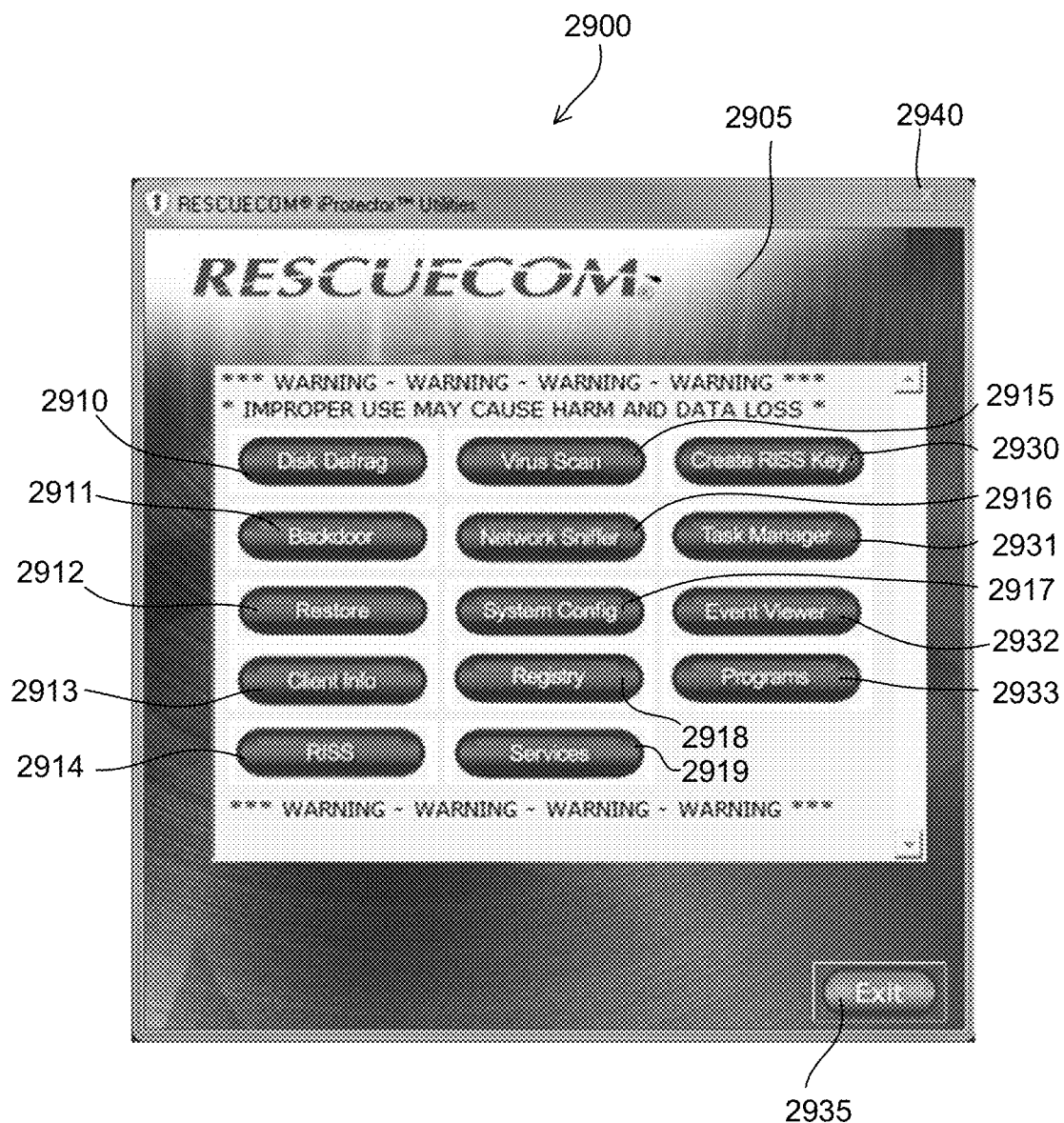

With reference to FIGS. 20-22, various example user interfaces related to clients that have initiated a request for provider assistance 2000, 2100*a*, 2100*b*, 2200 are depicted. The processor 149, executing the module 151, may generate a display of the user interface 2000 in response to a user (e.g., technician) selecting, for example, the logon icon 1925 of the user interface 1900. Subsequent to generating the display of the user interface 2000, the processor 149, further executing the module 151, may automatically generate a display of the user interface 2100*a* in response to the processor 149 retrieving customer data from, for example, the customer database 110 of FIG. 1. The user interface 2000 may include a general information area 2005, a customer information area 2005, a refresh icon 2010, a select customer icon 2015, a need help icon 2020 and a logout icon 2025. The user interface 2100*a* may include a plurality of customer selection boxes 2110*a* associated with clients that have initiated a desire to obtain service, a service call scheduled header 2115*a*, a customer header 2120*a*, a geographic location (or franchise) header 2125*a*, a service call number header 2130*a*, a status header 2135*a*, a client accept icon 2137*a*, a refresh icon 2140*a*, a select customer icon 2145*a*, a need help icon 2150*a* and a logout icon 2155*a*.

Processor 149, further executing the module 151, may generate a display of the user interface 2100*b* in response to, for example, a user (e.g., technician) selecting one of the customer selection boxes 2110*a* and subsequently selecting the select customer icon 2145*a*. The user interface 2100*b* may include a general client information display area 2105*b*, a client notes icon 2115*b*, a detail client information icon 2125*b*, a return to open service calls icon 2110*b*, a need help icon 2130*b*, a log out icon 2135 and an accept service call icon 2120*b*.

Processor 149, yet further executing the module 151, may generate a display of the user interface 2200 in response to, for example, a user (e.g., technician) selecting the accept service call icon 2120*b*. The user interface 2200 may include a selected customer information display area 2205, a description of services performed entry area 2210, a warranty no charge selection menu 2215, a number of hours selection menu 2220 and a number of minutes selection menu 2225.

With reference to FIGS. 23A-23H and 24-27, various example user interfaces related to documenting a provider (e.g., technician) dialog with a client 2300*a*-2300*h*, 2400, 2500, 2600, 2700 are depicted. Processor 149, executing the module 151, may generate a display of user interface 2300*a* in response to, for example, a user (e.g., technician) selecting one of the customer selection boxes 2110 and subsequently selecting the select customer icon 2145. The user interface 2300*a* may include a selected customer information display area 2305*a*, a description of services performed entry area 2310*a*, a customer has system disks selection menu 2315*a*, a customer has OS license selection menu 2316*a*, a customer has program license selection menu 2317*a*, a customers say that they have current backup selection menu 2318*a*, a check if backup is good selection menu icon 2319*a*, an offer to make backup selection menu 2320*a*, a backup customer's data selection menu 2321*a*, a warranty no charge selection menu 2322*a*, an hour selection menu 2323*a*, a minute selection menu 2324*a*, an estimated service to bill including tax display 2325*a*, a go to last page icon 2330a, an all fields are not complete icon 2335a, a need help icon 2340a, a logout icon 2345a, a send service call to customer service icon 2350a, an order/view parts icon 2355a, a go back to customers list icon 2360a, a reschedule client service call icon 2365a and an I have failed to correct client device problem icon 2370a.

Processor 149 may generate a display of the user interface 2300b in response to, for example, a user (e.g., a technician) selecting the I have failed icon 2370a. The user interface 2300b may include an I have failed display 2350b, a cannot diagnose problem icon 2351b, a customer does not want to continue icon 2352b, a customer needs follow up from different technician icon 2553b and an exit icon 2355b.

Processor 149 may generate a display of the user interface 2300c in response to, for example, a user (e.g., a technician) selecting the order/view parts icon 2355a. The user interface 2300c may include an order/view parts display 2355c, a view sold parts icon 2356c, a sell UCSS icon 2357c and a go back to customers list icon 2360c.

Processor 149 may generate a display of the user interface 2300d in response to, for example, a user (e.g., technician) selecting the select type of customer selection menu 2365d, 2550. The select type of customer selection menu 2365d may include a customer item 2366d, a small/mid business item 2367d, a corporation item 2368d, a nonprofit/Gov't/Ed item 2369d. The user interface 2300d may further include an all fields not complete icon 2335d.

Processor 149 may generate a display of the user interface 2300e in response to, for example, a user (e.g., a technician) selecting a warranty no charge selection menu 2322a, 2322e. The warranty no charge selection menu 2322a, 2322e may include a warranty no charge item 2326e and a warranty with charge billable item 2327e.

Processor 149 may generate a display of the user interface 2300f in response to, for example, a technician selecting a reschedule client service call icon 2365. The user interface 2300f may include an information display area 2305f, a customer information display area 2310f, a call reschedule information display area 2315f, a reason for reschedule information entry area 2320f, a reschedule data entry area 2325f, reschedule time selection menus 2330f, 2335f, 2340f, a go back to service call icon 2350f, an all fields not completed icon 2355f, a need help icon 2360f and a log out icon 2365f.

Processor 149 may generate a display of the user interface 2300g in response to, for example, a technician entering all necessary information within user interface 2300f. The user interface 2300g may include an information display area 2305g, a client information display area 2310g, a you are about to reschedule the following call information display area 2315g, a reason for rescheduling the call information entry area 2320g, a choose different date/time icon 2350g, a confirm reschedule of service call icon 2355g, a need help icon 2360g and a log out icon 2365g.

Processor 149 may generate a display of the user interface 2400 in response to, for example, a user (e.g., a technician) selecting an all fields are not complete icon 2325a. The user interface 2400 may include a selected customer information area 2405, a send call to customer service icon 2410, a go back to customers list icon 2415, a service call detail information area 2420 and a go back to call icon 2425.

Processor 149 may generate a display of user interface 2500 in response to, for example, a user (e.g., technician) selecting one of the customer selection boxes 2110 and subsequently selecting the select customer icon 2145. The user interface 2500 may include an information area 2505, a description of services performed entry area 2510, a confirm problem resolved entry area 2515, an hours selection menu 2520, a minutes selection menu 2525, a did you sell any parts selection menu 2530, a service total including tax display 2535, a total due including tax 2540, a check if problem not resolved box 2545, a select type of customer selection menu 2550, a customer wants a free newsletter selection menu 2555, a return to open service calls icon 2565 and an all fields are not complete icon 2560.

Processor 149 may generate a display of user interface 2600 in response to, for example, a user (e.g., technician) selecting an all fields are not complete icon 2560. The user interface 2600 may include a selected customer information area 2605, an additional notes entry area 2610, a service dollar amount entry area 2615, an estimation of parts dollar amount entry area 2620, a check here if you did not actual fix every problem the customer stated 100% box 2625, a save and invoice call, a send to customer service icon 2630, a view parts icon 2635, a don't save icon 2640 and a save and invoice call icon 2645.

Processor 149 may generate a display of user interface 2700 in response to, for example, a user (e.g., a technician) selecting a save and invoice call icon 2645. The user interface 2700 may include an invoice detail information area 2705, a go back to service call icon 2715 and a submit invoice icon 2710. Processor 107 may store a record on the service call within, for example, customer database 110 in response to a user (e.g., a technician) selecting a submit invoice icon 2710. Processor 134 may generate a display of invoice detail information area 2705 on a display 132 in response to, for example, a user (e.g., a technician) selecting a submit invoice icon 2710.

Turning to FIGS. 28-31, various example utilities user interfaces 2800, 2900, 3000, 3100 are depicted. Any one of processors 107, 115, 122, 134, 149 may generate a display of user interface 2800 in response to, for example, a user (e.g., a client, a technician or a central operations center staff person) selecting a utilities icon 1818a. The user interface 2800 may include an information area 2805, a password entry area 2810, a connect to level-3 technician icon 2815, an exit icon 2820 and a cancel icon 2825.

When an associated device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.) is currently operating in normal mode, any one of processors 107, 115, 122, 134, 149 may generate a display of user interface 2900 in response to, for example, a user (e.g., a client, a technician or a central operations center staff person) selecting a utilities icon 1818a, or in response to, for example, a user (e.g., a client, a technician or a central operations center staff person) entering a password in the password entry area 2810 and selecting enter key on a keyboard (e.g., keyboard 114, 121, 133, 148). The user interface 2900 may include an information area 2905, a disk defrag icon 2910, a backdoor icon 2911, a restore icon 2912, a client info icon 2913, a RISS icon 2914, a virus scan icon 2915, a network sniffer icon 2916, a system configuration icon 2917, a registry icon 2918, a services icon 2919, a create RISS key icon 2930, a task manager icon 2931, an event viewer icon 2932, a programs icon 2933, an exit icon 2935 and a cancel icon 2940.

When an associated device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.) is currently operating in safe mode, any one of processors 107, 115, 122, 134, 149 may generate a display of user interface 3100 in response to, for example, a user (e.g., a client, a technician or a central operations center staff person) selecting a utilities icon 1818*a*, or in response to, for example, a user (e.g., a client, a technician or a central operations center staff person) entering a password in the password entry area 2810 and selecting enter key on a keyboard (e.g., keyboard 114, 121, 133, 148). The user interface 3100 may include an information area 2905, a disk defrag icon 3110, an exit backdoor icon 3111, a restore icon 3112, a client info icon 3113, a RISS icon 3114, a virus scan icon 3115, a network sniffer icon 3116, a system configuration icon 3117, a registry icon 3118, a services icon 3119, a create RISS key icon 3130, a task manager icon 3131, an event viewer icon 3132, a programs icon 3133, an exit icon 3135 and a cancel icon 3140.

Figure 30:
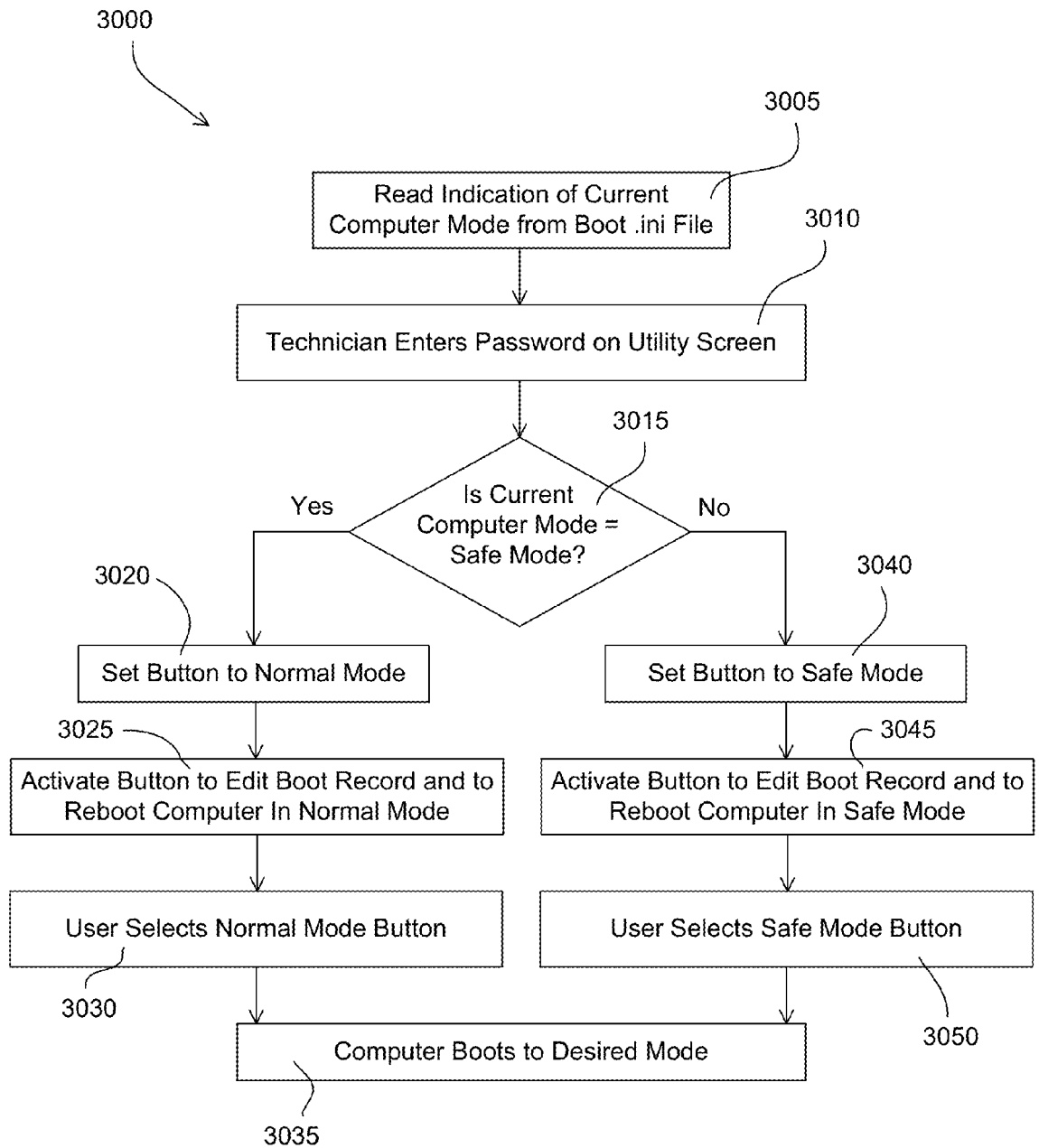
Figure 31:
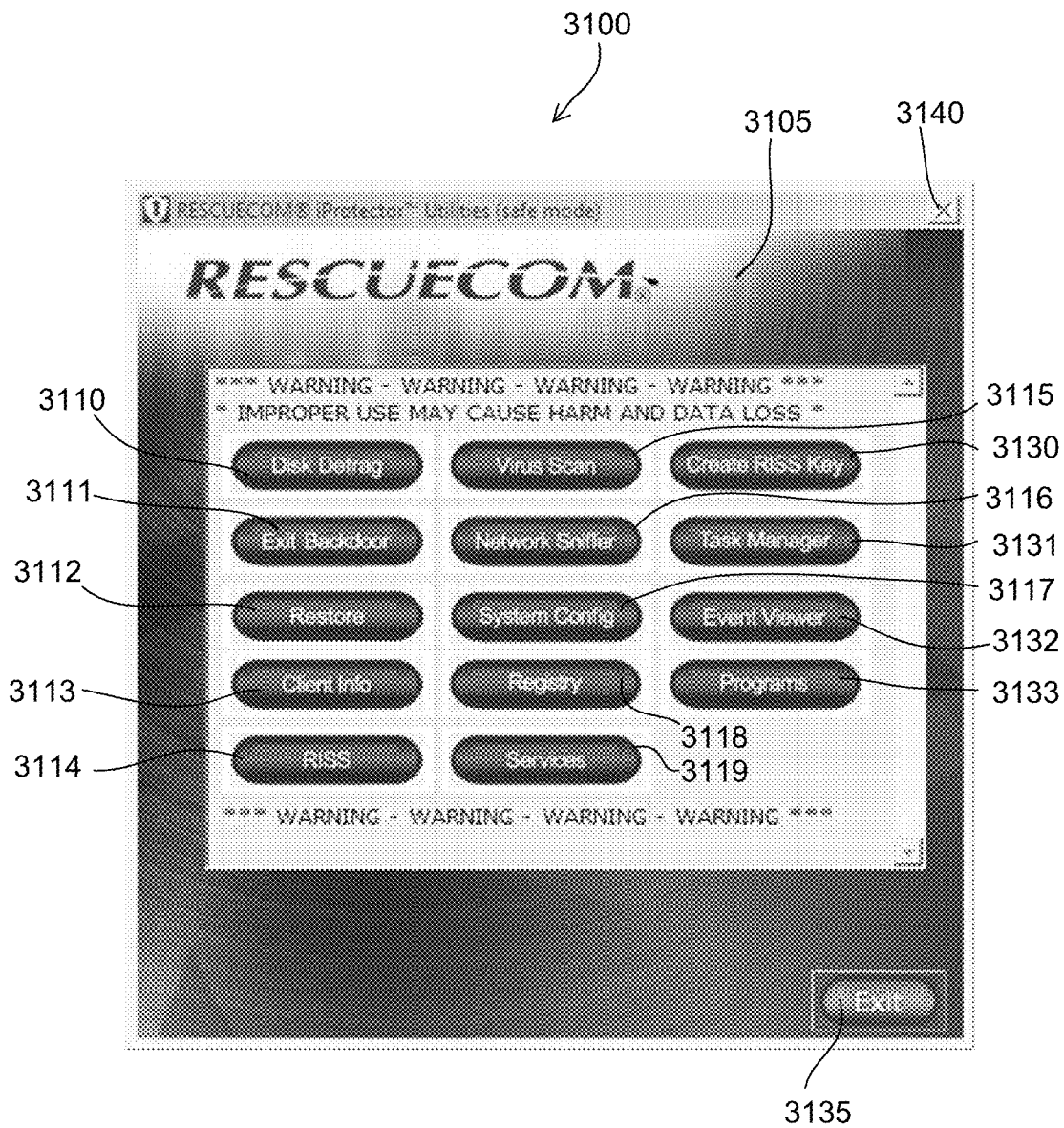
Figure 32A:
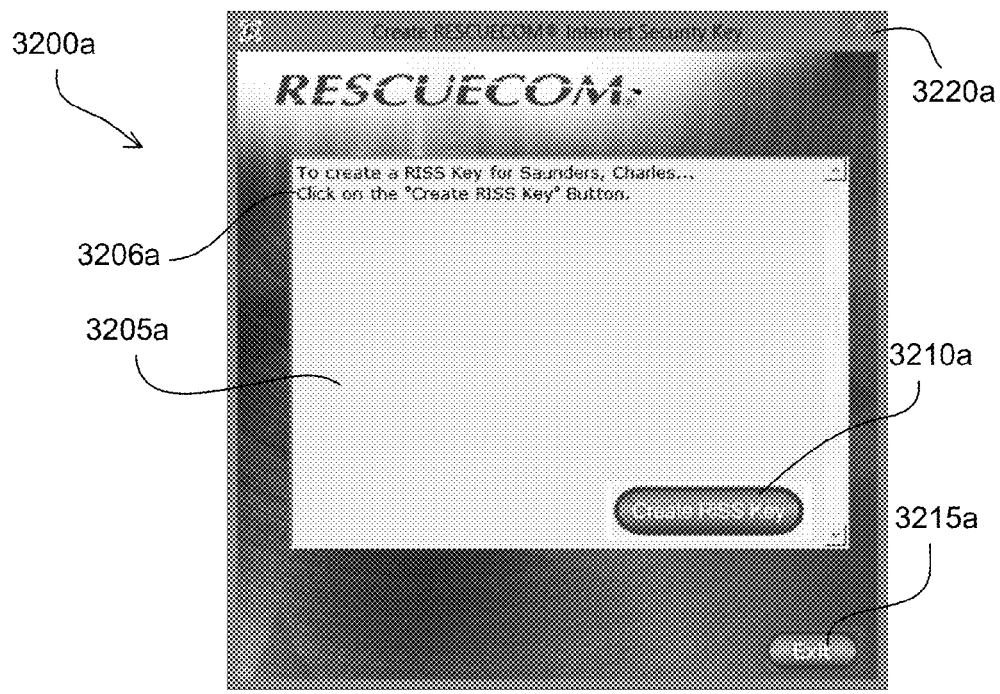
FIGS. 32A-32E and 33 depict various example security suite user interfaces.
Figure 32B:
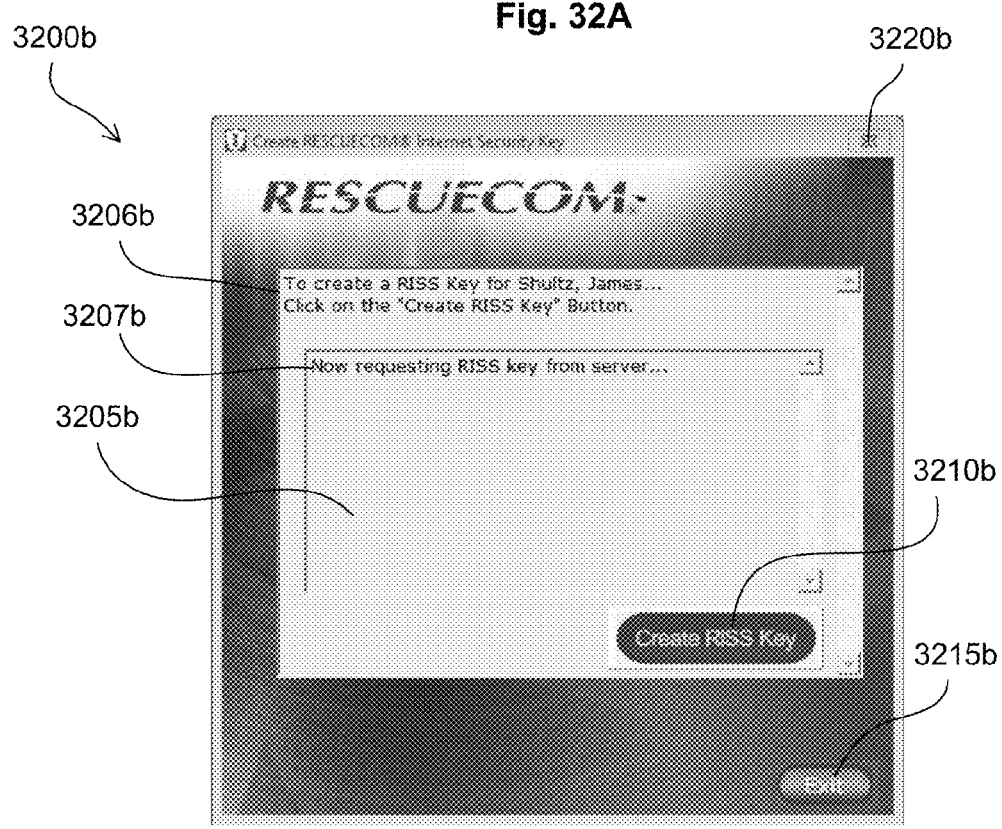
Figure 32C:
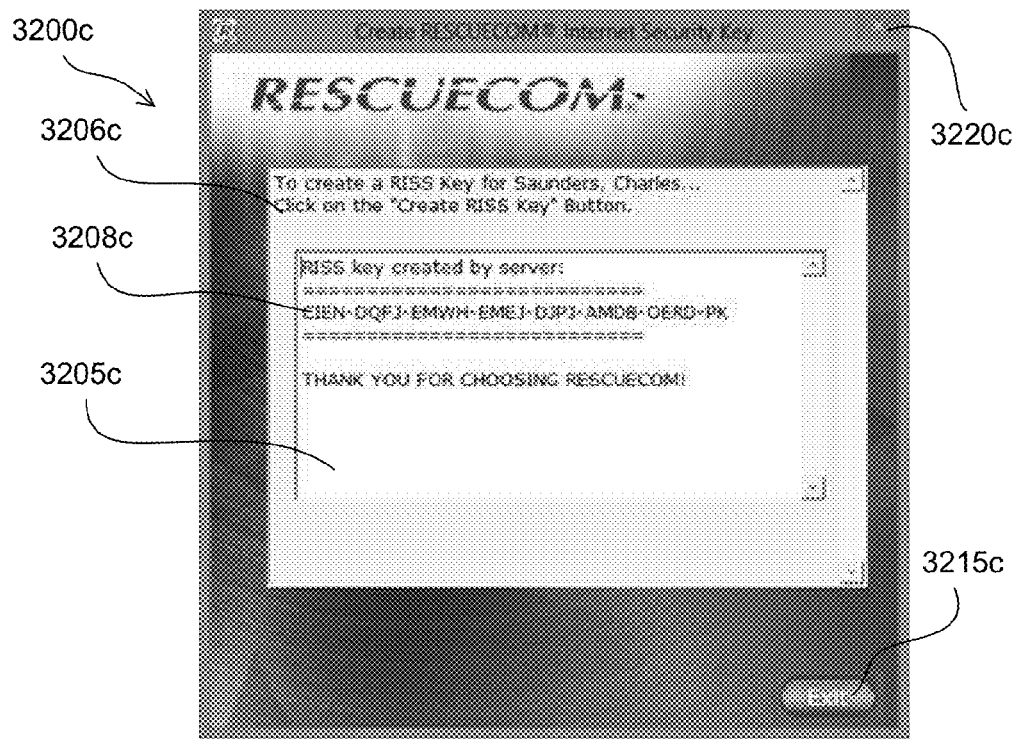
Figure 32D:
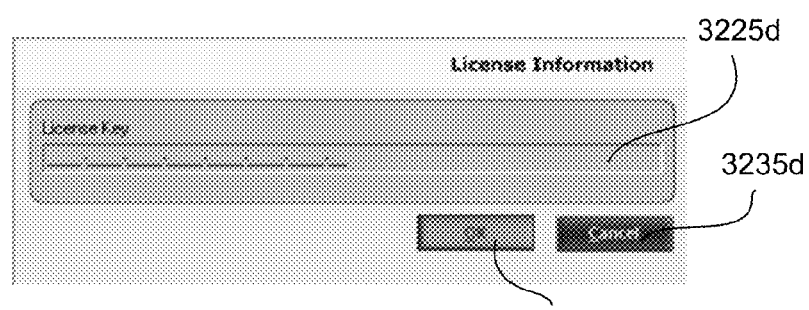
Figure 32E:
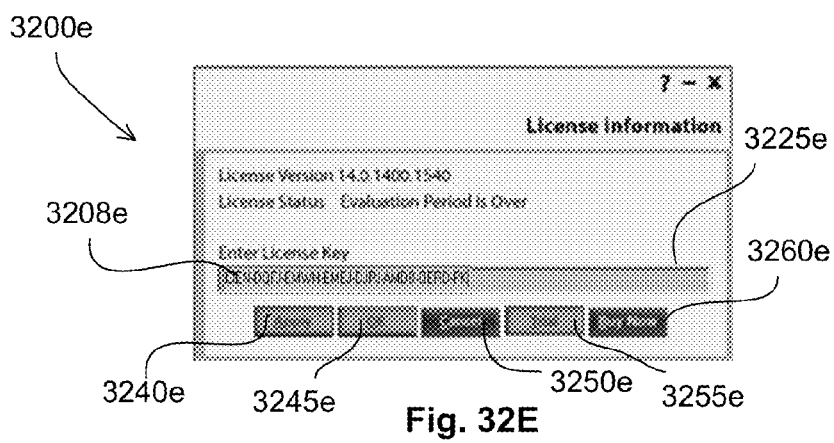
Figure 33:
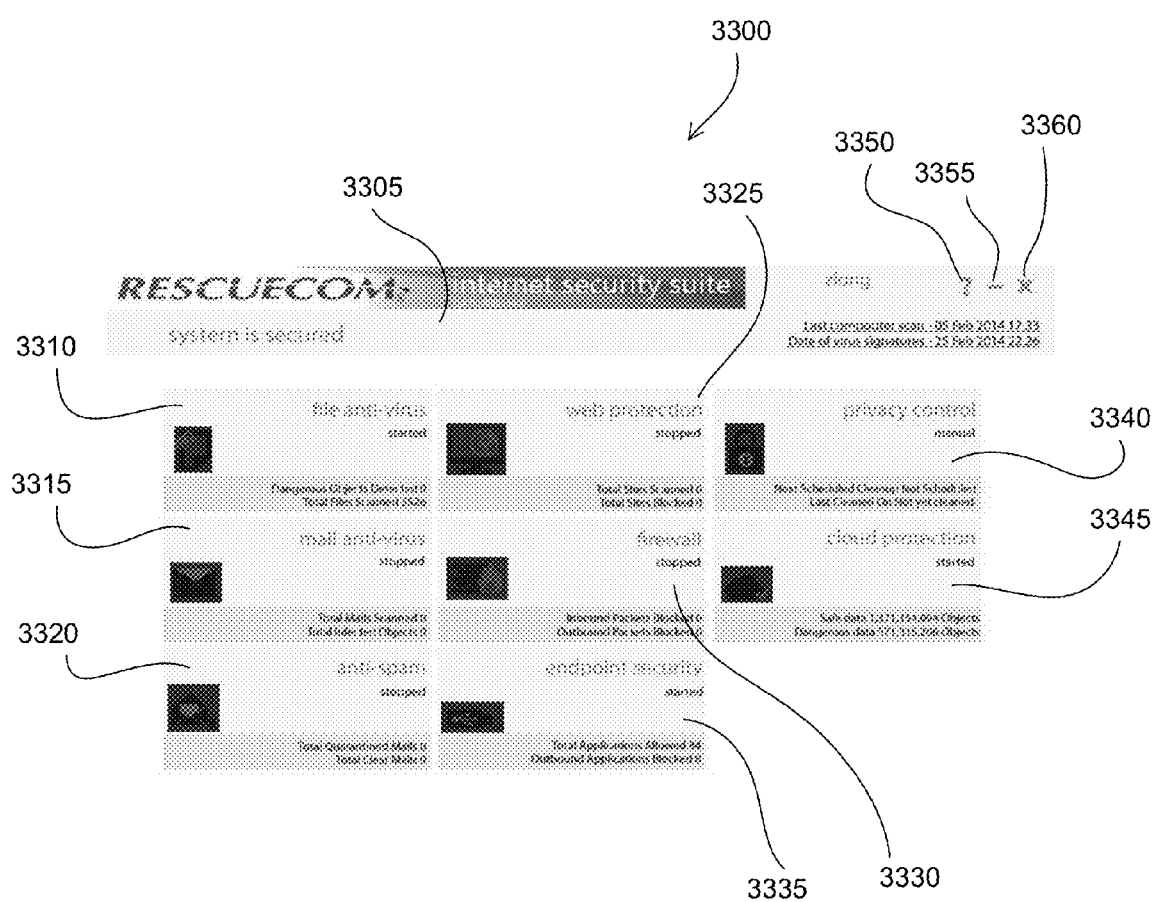

Processor 107, executing module 109, may implement method 3000 of FIG. 30 in response to a user (e.g., a client, a technician or a central operations center staff person) selecting a backdoor icon 2911, or an exit backdoor icon 3111, depending in which state (e.g., normal mode or safe mode, respectively) the associated device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.) is currently operating. Generally, the processor 107 may switch the associated device from normal mode to safe mode and back to normal mode by selecting a single icon 2911, 3111. As can be seen by viewing FIGS. 29 and 31, processor 107 may change an identification of the icon 2911 from "backdoor" to icon 3111 "exit backdoor" and back to icon 2911 "backdoor," respectively, when the processor 107 implements the method 3000. Processor 107 may read an indication of a current operating mode of a device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.), for example, from a device boot.ini file (block 3005). Optionally, the processor 107 may prompt a user (e.g., a client or technician) to enter a password (block 3010). The processor 107 may determine in which mode (e.g., normal mode or safe mode) of operation the device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.) is currently operating (block 3015). Alternatively, processor 107, implementing a portion of the method 3000, may reboot the device into the mode (e.g., safe mode or normal mode) opposite the current operating mode (e.g., normal mode or safe mode) (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.) in response to a user entering a password (e.g., reboot911) in lieu of requiring a user to select either the backdoor icon or the exit backdoor icon. For example, in circumstances where a client device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.) cannot be connected to a remote server (e.g., remote server 116) (i.e., the client device is in "airplane mode"), the processor 107 may reboot the client device into the mode (e.g., safe mode or normal mode) opposite the current operating mode (e.g., normal mode or safe mode) (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.) in response to a user entering a password (e.g., reboot911). The client device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.) may not connect to the remote server (e.g., remote server 116) because, for example, the client device is not connected to the internet, a client device network card is faulty, a communication error exists between the client device and the remote server, etc.

Processor 107 may execute a disk defrag application in response to, for example, a user (e.g., a client or a technician) selecting the disk defrag icon 2910, 3110. Processor 107 may implement the method 3000 in response to, for example, a user (e.g., a client or a technician) selecting the backdoor icon 2911 or the exit backdoor icon 3111. Processor 107 may execute a data restoration application in response to, for example, a user (e.g., a client or a technician) selecting the restore icon 2912, 3112. Processor 107 may execute a security application in response to, for example, a user (e.g., a client or a technician) selecting the RISS icon 2914, 3114. Processor 107 may execute a virus scan application in response to, for example, a user (e.g., a client or a technician) selecting the virus scan icon 2915, 3115. Processor 107 may execute a network sniffer application in response to, for example, a user (e.g., a client or a technician) selecting the network sniffer icon 2916, 3116. Processor 107 may execute a system configuration application in response to, for example, a user (e.g., a client or a technician) selecting the system configuration icon 2917, 3117. Processor 107 may execute a registry application in response to, for example, a user (e.g., a client or a technician) selecting the registry icon 2918, 3118. Processor 107 may execute a services application in response to, for example, a user (e.g., a client or a technician) selecting the services icon 2919, 3119. Processor 107 may execute a task manager application in response to, for example, a user (e.g., a client or a technician) selecting the task manager icon 2931, 3131. Processor 107 may execute an event viewer application in response to, for example, a user (e.g., a client or a technician) selecting the event viewer icon 2932, 3132. Processor 107 may execute a programs application in response to, for example, a user (e.g., a client or a technician) selecting the programs icon 2933, 3133. Processor 107 may exit the utilities user interface 2900, 3100 in response to, for example, a user (e.g., a client or a technician) selecting the exit icon 2935, 3135.

If the processor 107 determines that the device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.) is currently operating in safe mode (block 3015), the processor 107 may set the normal mode icon 3111 to, for example, "exit backdoor" (block 3020). The processor 107 may activate the normal mode icon 3111 and may edit a boot record of the device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.) to reboot the device in normal mode when a user (e.g., client or technician) selects the normal mode icon 3111 (block 3025). A user (e.g., a client or technician) may select the normal mode icon 3111 (block 3030). The processor 107 may reboot the device (e.g., desktop computer 131, laptop computer 138, tablet computer 139 or telephone 140) to normal mode in response to the user selecting the normal mode icon 3111 (block 3035).

If the processor 107 determines that the device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.) is currently operating in normal mode (block 3015), the processor 107 may set the safe mode icon 2911 to, for example, "backdoor" (block 3040). The processor 107 may activate the safe mode icon 2911 and may edit a boot record of the device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.) to reboot the device in safe mode when a user (e.g., client or technician) selects the safe mode icon 2911 (block 3025). A user (e.g., a client or technician) may select the safe mode icon 2911 (block 3030). The processor 107 may reboot the device (e.g., desktop computer 131, laptop computer 138, tablet computer 139, telephone 140 of FIG. 1, a computer, a printer, a mobile telephone, a television, a computer gaming device, a DVD player, a cable television device, a computer router, a computer network, a home security system, a data storage device, a stereo system, a theater system, an appliance, a piece of equipment, etc.) to safe mode in response to the user selecting the safe mode icon 2911 (block 3035).

With reference to FIGS. 32A-32E and 33, various example security suite user interfaces 3200a-2300e and 3300 are depicted. Processor 134 may generate a display of user interface 3200a in response to, for example, a user (e.g., a technician) selecting a create RISS key icon 2930, 3130. The user interface 3200a may include an information area 3205a having, for example, an instructional information display 3206a, a create RISS key icon 3210a, an exit icon 3215a and a cancel icon 3220a.

Processor 134 may generate a display of user interface 3200b in response to, for example, a user (e.g., a technician) selecting a create RISS key icon 3210a. The user interface 3200b may include an instructional information display 3206b, a create RISS key icon 3210b, an exit icon 3215b, a cancel icon 3220b and an information area 3205b having, for example, an information display 3207b. Subsequent to the processor 134 generating the display of the user interface 3200b, the processor 134 may automatically retrieve RISS data. The processor 134 may automatically generate a display of the user interface 3200c based on the retrieved RISS data. The user interface 3200c may include an instructional information display 3206c, a create RISS key icon 3210c, an exit icon 3215c, a cancel icon 3220c and an information area 3205b having, for example, a RISS key data 3208b display. Subsequent to the processor 134 generating the display of the user interface 3200c, the processor 134 may automatically generate a display of the user interface 3200d. The processor 134 may automatically populate the license key entry area 3225d with the RISS key data 3208b. The user interface 3200d may further include an OK icon 3230d and a cancel icon 3235d.

Processor 134 may generate a display of the user interface 3200e in response to, for example, a user (e.g., a technician) selecting the OK icon 3230d. The user interface 3200e may include a license key display area 3225e, a licensing key data 3208e display, an apply icon 3240e, an OK icon 3245e, a cancel icon 3250e, a trial icon 3250e and a buy now icon 3260e.

Processor 134 may generate a display of the user interface 3300 on a display (e.g., display 147) in response to, for example, a user (i.e., a technician) selecting an apply icon 3240e and/or an OK icon 3245e. Alternatively, processor 107 may generate a display of the user interface 3300 on a display (e.g., display 132) in response to, for example, a user (i.e., a client) selecting a buy now icon 3260e. In any event, the user interface 3300 may include an information area 3305, a file anti-virus icon 3310, a mail anti-virus icon 3315, an anti-spam icon 3320, a web protection icon 3325, a firewall icon 3330, an endpoint security icon 3335, a privacy control icon 3340, a cloud protection icon 3345, a help icon 3350, a minimize icon 3355 and an exit icon 3360. Processor 107 may execute a file anti-virus application in response to, for example, a user (e.g., a client or a technician) selecting the file anti-virus icon 3310. Processor 107 may execute a mail anti-virus application in response to, for example, a user (e.g., a client or a technician) selecting the mail anti-virus icon 3315. Processor 107 may execute an anti-spam application in response to, for example, a user (e.g., a client or a technician) selecting the anti-spam icon 3320. Processor 107 may execute a web protection application in response to, for example, a user (e.g., a client or a technician) selecting the web protection icon 3325. Processor 107 may execute a firewall application in response to, for example, a user (e.g., a client or a technician) selecting the firewall icon 3330. Processor 107 may execute an endpoint security application in response to, for example, a user (e.g., a client or a technician) selecting the endpoint security icon 3335. Processor 107 may execute a privacy control application in response to, for example, a user (e.g., a client or a technician) selecting the privacy control icon 3340. Processor 107 may execute a cloud protection application in response to, for example, a user (e.g., a client or a technician) selecting the cloud protection icon 3345. Processor 107 may execute a help application in response to, for example, a user (e.g., a client or a technician) selecting the help icon 3350. Processor 107 may minimize the display of the user interface 3300 in response to, for example, a user (e.g., a client or a technician) selecting the minimize icon 3355. Processor 107 may delete the display of the user interface 3300 in response to, for example, a user (e.g., a client or a technician) selecting the exit icon 3360.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed is:

1. A computer implement method to reboot a client device in a normal operating mode when the client device is currently operating in a safe operating mode and to reboot the client device to a safe operating mode when the client device is currently operating in a normal operating mode, the method comprising:
   receiving, at a processor of a provider computer located remote from the client device, client device operating mode data, wherein the client device operating mode data is indicative of a current operating mode of the client device;
   determining, using the processor, whether the client device is currently operating in a safe operating mode or a normal operating mode based on the client device operating mode data;
   receiving, at the processor, password data, wherein the password data is representative of user information indicative of whether the user is authorized to reboot the client device in the normal operating mode when the client device is currently operating in the safe operating mode or to reboot the client device to the safe operating mode when the client device is currently operating in the normal operating mode; and
   causing, using the processor, the client device to reboot to safe mode when the client device is determined to be currently operating in normal operating mode or causing the client device to reboot to normal operating mode when the client device is determined to be currently operating in safe operating mode in response to receiving the password data.

2. The method of claim 1, wherein a password is entered by a user via a user interface device.

3. The method of claim 2, wherein the user interface device is connected to a computing device that is remote from the client device.

4. The method of claim 3, further comprising:
   transmitting, using the processor, the password data, from the computing device that is remote from the client device, to the client device; and
   causing, using a processor of the client device, the client device to reboot to safe mode when the client device is determined to be currently operating in normal operating mode or causing the client device to reboot to normal operating mode when the client device is determined to be currently operating in safe operating mode in response to receiving the password data.

5. The method of claim 1, wherein the client device operating mode data is based on a boot.ini file or an EG boot.ini file stored on a memory of the client device.

6. The method of claim 1, wherein at least a portion of the password data is representative of: alphabetical letter, at least one number or at least one ASCI character.

7. A computer system to reboot a client device in a normal operating mode when the client device is currently operating in a safe operating mode and to reboot the client device in a safe operating mode when the client device is currently operating in a normal operating mode, the computer system comprising:
   at least one processor and at least one memory of a provider computer located remote from the client device;
   a client device operating mode determination module, stored on the at least one memory, that, when executed by the at least one processor, causes the at least one processor to determine, based on client device operating mode data, whether the client computer is currently operating in a safe operating mode or a normal operating mode;
   a password data receiving module, stored on the at least one memory, that, when executed by the at least one processor, causes the at least one processor to receive password data, wherein the password data is representative of user information indicative of whether the user is authorized to reboot the client device in the normal operating mode when the client device is currently operating in the safe operating mode or to reboot the client device to the safe operating mode when the client device is currently operating in the normal operating mode; and
   a mode reboot module, stored on the at least one memory, that, when executed by the at least one processor, causes the at least one processor to reboot the client device to safe mode when the client device is determined to be currently operating in normal operating mode or causes the processor to reboot the client device to normal operating mode when the client device is determined to be currently operating in safe operating mode in response to receiving the password data.

8. The computer system of claim 7, wherein a password is entered by a user via a user interface device.

9. The computer system of claim 8, wherein the user interface device is connected to the client device.

10. The computer system of claim 7, wherein determining whether the client computer is currently operating in safe mode or normal mode is performed by a processor of the client device executing a mode determination module stored on a memory of the client device.

11. The computer system of claim 7, further comprising:
    a mode data transmission module, stored on the at least one memory, that, when executed by the at least one processor, causes the at least one processor to transmit client device mode operating data from the client device to a computing device that is located remote from the client device; and
    wherein determining whether the client computer is currently operating in safe mode or normal mode is performed by a processor of the computing device that is located remote from the client device executing a mode determination module stored on a memory of the computing device that is located remote from the client device.

12. The computer system of claim 11, further comprising:
a mode display module, stored on the at least one memory, that, when executed by the at least one processor, causes the at least one processor to display, on a display device of the computing device that is located remote from the client device, an indication whether the client device is currently operating in the safe operating mode or the normal operating mode.

13. The computer system of claim 7, wherein the client device is communicatively coupled to a remote computer via a communication network that includes an internet segment and at least a portion of at least one of the client device operating mode determination module, the password data receiving module or the mode reboot module is executed by a processor of the remote computer.

14. A non-transitory computer-readable medium having instructions stored thereon that, when executed by a processor of a provider computer located remote from a client device, cause the processor to reboot the client device to a normal operating mode from a safe operating mode and to reboot the client device to a safe operating mode from a normal operating mode, the non-transitory computer-readable medium comprising:
a client device operating mode determination module that, when executed by the processor, causes the processor to determine, based on client device operating mode data, whether the client computer is currently operating in a safe operating mode or a normal operating mode;
a password data receiving module that, when executed by the processor, causes the processor to receive password data, wherein the password data is representative of user information indicative of whether the user is authorized to reboot the client device in the normal operating mode when the client device is currently operating in the safe operating mode or to reboot the client device to the safe operating mode when the client device is currently operating in the normal operating mode; and
a mode reboot module that, when executed by the processor, causes the processor to reboot the client device to safe mode when the client device is determined to be currently operating in normal operating mode or causes the processor to reboot the client device to normal operating mode when the client device is determined to be currently operating in safe operating mode in response to receiving the password data.

15. The non-transitory computer-readable medium of claim 14, wherein the client device is communicatively coupled to a remote computer via a communication network that includes an internet segment and at least a portion of at least one of the client device operating mode determination module, the password data receiving module or the mode reboot module is executed by a processor of the remote computer.

16. The non-transitory computer-readable medium of claim 15, wherein a password is entered by a user via a user interface device connected to the remote computer.

17. The non-transitory computer-readable medium of claim 14, wherein determining whether the client device is currently operating in the safe operation mode or the normal operating mode is performed by a processor of the client device executing the client device operating mode determination module.

18. The non-transitory computer-readable medium of claim 14, further comprising:
a mode display module that, when executed by the processor, causes the processor to display, on a display device of the computing device that is located remote from the client device, an indication whether the client device is currently operating in the safe operating mode or the normal operating mode.

19. The non-transitory computer-readable medium of claim 18, further comprising:
a mode data transmission module that, when executed by the processor, causes the processor to transmit client device mode operating data from the client device to a computing device that is located remote from the client device; and
wherein determining whether the client computer is currently operating in safe mode or normal mode is performed by a processor of the computing device that is located remote from the client device executing a mode determination module stored on a memory of the computing device that is located remote from the client device.

20. The non-transitory computer-readable medium of claim 14, wherein a password is entered by a user via a user interface device connected to the client device.

* * * * *